US012530526B2

(12) United States Patent
Geramifard et al.

(10) Patent No.: US 12,530,526 B2
(45) Date of Patent: Jan. 20, 2026

(54) METHODS OF UTILIZING REINFORCEMENT LEARNING FOR ENHANCED TEXT SUGGESTIONS, AND SYSTEMS AND DEVICES THEREFOR

(71) Applicant: Meta Platforms Technologies, LLC, Menlo Park, CA (US)

(72) Inventors: Alborz Geramifard, Menlo Park, CA (US); Rohan Chitnis, Millbrae, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 19/048,837

(22) Filed: Feb. 7, 2025

(65) Prior Publication Data

US 2025/0259002 A1    Aug. 14, 2025

Related U.S. Application Data

(60) Provisional application No. 63/551,937, filed on Feb. 9, 2024.

(51) Int. Cl.
| | | |
|---|---|---|
| *G06F 40/274* | (2020.01) | |
| *G06F 3/01* | (2006.01) | |
| *G06F 3/04842* | (2022.01) | |
| *G06F 3/0487* | (2013.01) | |

(52) U.S. Cl.
CPC ............ *G06F 40/274* (2020.01); *G06F 3/011* (2013.01); *G06F 3/015* (2013.01); *G06F 3/017* (2013.01); *G06F 3/04842* (2013.01); *G06F 3/0487* (2013.01)

(58) Field of Classification Search
CPC ...... G06F 3/011; G06F 3/015; G06F 3/04842; G06F 3/0487
See application file for complete search history.

(56) References Cited

U.S. PATENT DOCUMENTS

| | | | | |
|---|---|---|---|---|
| 9,411,426 | B2 * | 8/2016 | Chatterjee | ............... A63F 13/00 |
| 10,168,766 | B2 * | 1/2019 | Lucero | ..................... G06F 3/048 |
| 11,327,636 | B2 * | 5/2022 | Pruitt | ...................... G06F 1/324 |
| 2014/0375567 | A1 * | 12/2014 | Chatterjee | ............... A63F 13/00 |
| | | | | 345/168 |
| 2017/0046178 | A1 * | 2/2017 | Singh | ............... G06Q 10/06398 |
| 2019/0370548 | A1 * | 12/2019 | Singh | ...................... G06T 11/00 |
| 2021/0055841 | A1 * | 2/2021 | Pruitt | ...................... G06F 3/013 |

(Continued)

*Primary Examiner* — Patrick F Marinelli
(74) *Attorney, Agent, or Firm* — Morgan, Lewis & Bockius LLP

(57) ABSTRACT

Techniques and apparatuses for enhanced text suggestions are described. An example method includes detecting a user gesture performed by a user of the computing system based on data from one or more neuromuscular sensors and identifying a set of text characters corresponding to the user gesture. The method further includes causing display of the set of text terms in a user interface and determining whether a cognitive load of the user meets one or more criteria. The method also includes providing a text suggestion to the user based on the set of text characters in accordance with a determination that the cognitive load of the user meets the one or more criteria, and forgoing providing the text suggestion to the user based on the set of text characters, in accordance with a determination that the cognitive load of the user does not meet the one or more criteria.

20 Claims, 22 Drawing Sheets

(56) References Cited

U.S. PATENT DOCUMENTS

| | | | |
|---|---|---|---|
| 2023/0325002 A1* | 10/2023 | Bicking | G06F 3/017 |
| | | | 715/863 |
| 2024/0257812 A1* | 8/2024 | Ihlefeld | G06F 3/011 |
| 2024/0273793 A1* | 8/2024 | DeCharms | G06F 40/197 |
| 2025/0217030 A1* | 7/2025 | He | G06F 3/04815 |
| 2025/0217572 A1* | 7/2025 | DeCharms | G10L 13/0335 |
| 2025/0259002 A1* | 8/2025 | Geramifard | G06F 40/274 |

* cited by examiner

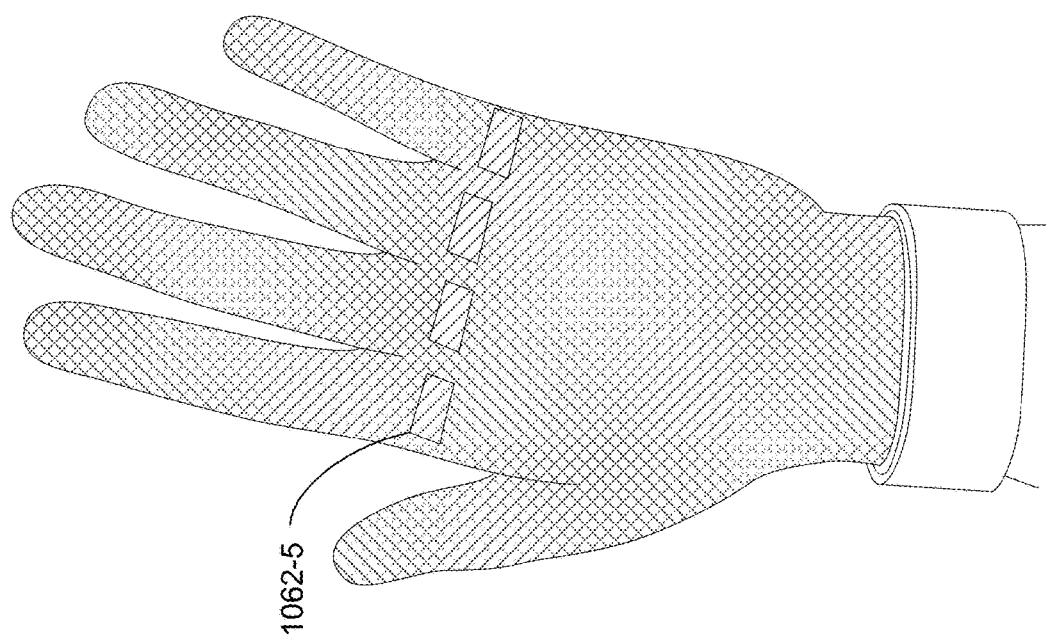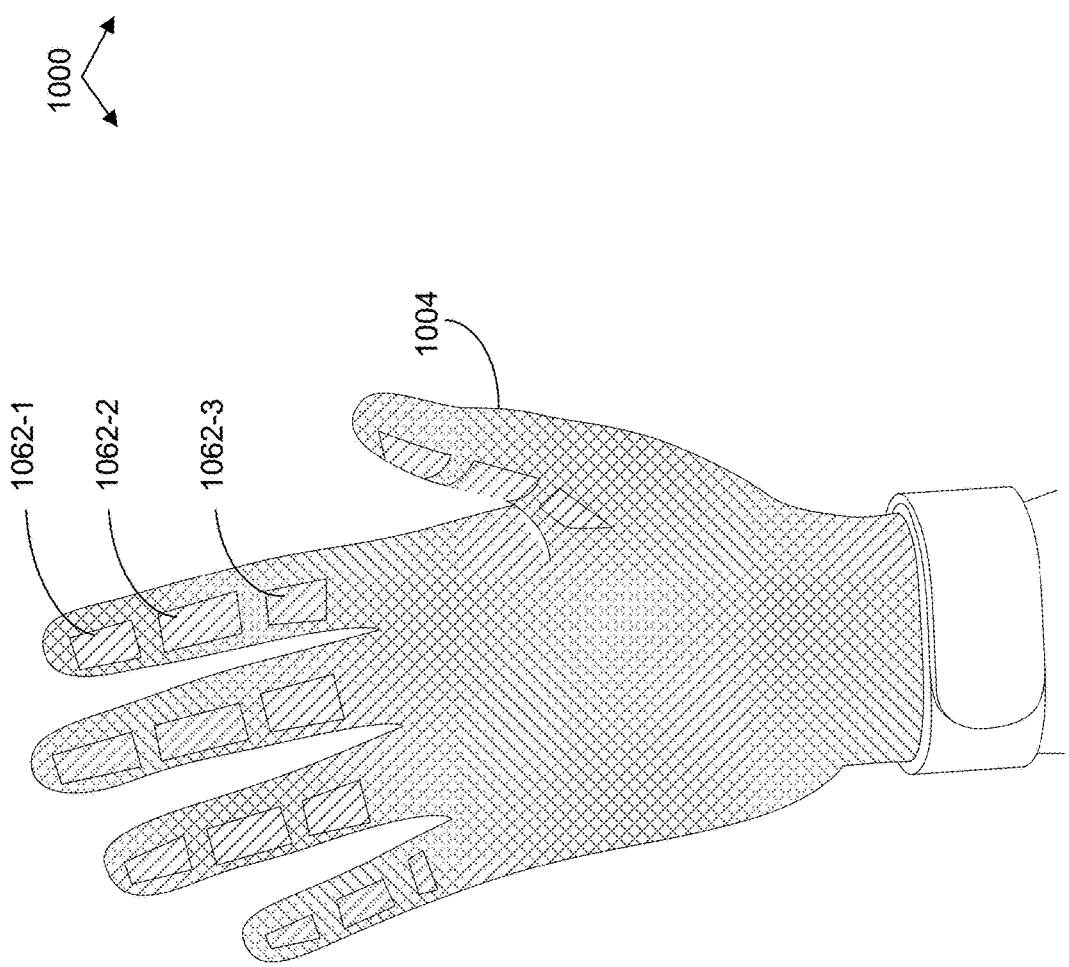

METHODS OF UTILIZING REINFORCEMENT LEARNING FOR ENHANCED TEXT SUGGESTIONS, AND SYSTEMS AND DEVICES THEREFOR

PRIORITY

This application claims priority to U.S. Provisional Patent Application No. 63/551,937, entitled "Methods of Utilizing Reinforcement Learning for Enhanced Text Suggestions, and Systems and Devices Therefor" filed Feb. 9, 2024, which is hereby incorporated by reference in its entirety.

TECHNICAL FIELD

The present disclosure relates generally to providing text suggestions (e.g., text corrections and/or completions) to a user based on reinforcement learning, including, but not limited to, techniques and apparatuses for detecting writing via sensors of wearable electronic devices and providing the text suggestions based on an estimated cognitive load of the user.

BACKGROUND

Automatic correction is a function that automatically makes or suggests corrections for mistakes in spelling or grammar made while writing (e.g., typing on a keyboard). Automatic completion is a function that automatically makes or suggests the rest of a word or phrase that a user is writing. Large language models (LLMs) have been useful components in autocorrection and autocompletion. Conventional LLM systems determine whether to show such completions and corrections to a user based on a confidence value of the model. These systems have limited expressivity with one dimension (the confidence value).

Therefore, these systems may make completion/corrections too often or not often enough for a particular user, which causes the systems to reduce the particular user's writing speed (e.g., adjusted word per minute (aWPM)) and/or reduce the particular user's satisfaction with the systems. This makes for an inefficient user-machine interface and can lead to user frustration.

SUMMARY

The present disclosure describes, among other things, systems and methods of using reinforcement learning to provide personalized suggestions (e.g., completions/corrections) to users. The systems and methods described herein take into account user context and/or cognitive load of the user to make suggestions at appropriate times during the user's writing. As described in more detail below, taking into account user context improves the quality of suggestions, and taking into account cognitive load can improve the timing of suggestions, which can increase text input speed (e.g., user writing speed) and can also reduce user frustration.

In accordance with some embodiments, a method of text suggestions includes: (i) detecting a user gesture associated with a user task, the user gesture performed by a user of the computing system based on data from one or more neuromuscular sensors; (ii) identifying a set of text characters corresponding to the user gesture; (iii) causing display, via a display device, of the set of text terms in a user interface; (iv) estimating, based on context information, a cognitive load of the user corresponding to performing the user task at the computing system; (v) determining whether the estimated cognitive load meets one or more predefined criteria; (vi) in accordance with a determination that the estimated cognitive load meets the one or more predefined criteria, providing a text suggestion to the user based on the set of text characters; and (vii) in accordance with a determination that the estimated cognitive load does not meet the one or more predefined criteria, forgoing providing the text suggestion to the user based on the set of text characters. In some embodiments, the neuromuscular sensors include one or more electromyography (EMG) sensors, mechanomyography sensors, and/or sonomyography sensors. Techniques for processing neuromuscular signals are described in commonly owned U.S. Patent Publication No. US 2020/0310539, which is incorporated by reference herein for all purposes, including, for example, the techniques shown and described with reference to FIGS. 29-30 in the incorporated publication, which can be applied in one example to process neuromuscular signals to allow for detecting the in-air hand gestures described herein.

In accordance with some embodiments, a computing system is provided, such as a wearable device, a server system, a personal computer system, or other electronic device. The computing system includes control circuitry and memory storing one or more sets of instructions. The one or more sets of instructions include instructions for performing any of the methods described herein (e.g., the method 300 that is described in detail below).

In accordance with some embodiments, a non-transitory computer-readable storage medium is provided. The non-transitory computer-readable storage medium stores one or more sets of instructions for execution by a computing system (e.g., a wrist-wearable device or a head-mounted device or an intermediary device such as a smart phone or desktop or laptop computer that can be configured to coordinate operations at the wrist-wearable device and the head-mounted device). The one or more sets of instructions include instructions for performing any of the methods described herein (e.g., the method 300 that is described in detail below).

Thus, methods, apparatuses, devices, and systems are disclosed for providing text suggestions. Such methods, apparatuses, devices, and systems may complement or replace conventional methods for providing text suggestions.

The features and advantages described in the specification are not necessarily all inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and therefore are not to necessarily to be considered limiting, for the description can admit to other effective features as the person of skill in the art will appreciate upon reading this disclosure.

FIGS. 6A, 6B-1, 6B-2, and 6C illustrate example AR systems in accordance with some embodiments.

FIGS. 8A-8C illustrate example wearable gloves in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 1A:
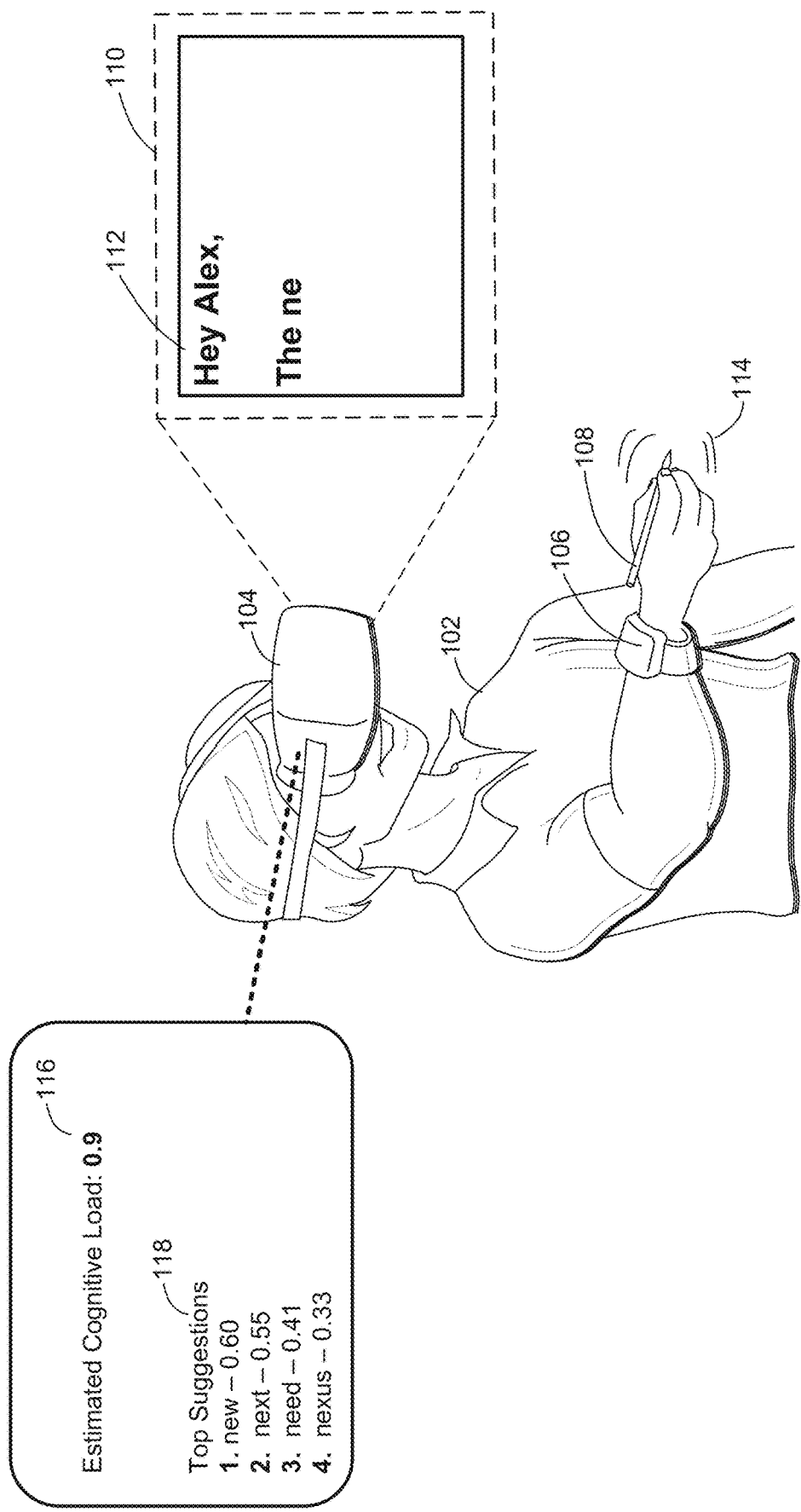
FIGS. 1A-1E illustrate an example scenario of a system providing text suggestions in accordance with some embodiments.

The present disclosure describes systems and methods for providing suggestions, completions, and corrections while a user is providing inputs (e.g., typing, writing, or otherwise gesturing). As described herein, a cognitive load of the user (e.g., for the input task) can be estimated and the estimation can be used to identify when to provide the suggestions, completions, and/or corrections. The cognitive load of the user may be estimated based on context information for the user and/or context information regarding the user's inputs. Using estimated cognitive load to identify when to provide suggestions, completions, and/or corrections can improve the man-machine interface, improve input speed, and/or reduce user frustration.

Embodiments of this disclosure can include or be implemented in conjunction with various types or embodiments of AR systems. Artificial-reality (AR), as described herein, is any superimposed functionality and/or sensory-detectable presentation provided by an artificial-reality system within a user's physical surroundings. Such artificial-realities can include and/or represent virtual reality (VR), augmented reality, mixed artificial-reality (MAR), or some combination and/or variation of one of these. For example, a user can perform a swiping in-air hand gesture to cause a song to be skipped by a song-providing API providing playback at, for example, a home speaker. An AR environment, as described herein, includes, but is not limited to, VR environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

A hand gesture, as described herein, can include an in-air gesture, a surface-contact gesture, and or other gestures that can be detected and determined based on movements of a single hand (e.g., a one-handed gesture performed with a user's hand that is detected by one or more sensors of a wearable device (e.g., electromyography (EMG) and/or inertial measurement units (IMUs) of a wrist-wearable device) and/or detected via image data captured by an imaging device of a wearable device (e.g., a camera of a head-wearable device)) or a combination of the user's hands. "In-air" means, in some embodiments, that the user hand does not contact a surface, object, or portion of an electronic device; in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single- or double-finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, time-of-flight sensors, sensors of an inertial measurement unit, etc.) detected by a wearable device worn by the user and/or other electronic devices in the user's possession (e.g., smartphones, laptops, imaging devices, intermediary devices, and/or other devices described herein).

FIGS. 1A-1E illustrate an example scenario of a system providing text suggestions in accordance with some embodiments. FIG. 1A shows a user 102 wearing a head-wearable device 104 and a wrist-wearable device 106. In some embodiments, the head-wearable device 104 is an augmented-reality device (e.g., the AR device 800 or the VR device 810, FIG. 6C). The wrist-wearable device 106 may be a smartwatch or other type of wearable device (e.g., the wrist-wearable device 700, FIG. 5A). The user 102 in FIG. 1A is holding a stylus 108 and performing a user gesture 114. In some embodiments, the stylus 108 includes one or more sensors (e.g., is an electronic stylus). For example, the stylus 108 may include one or more of the sensors described below with respect to FIG. 5B. In some embodiments, the user gesture 114 is detected by one or more of the head-wearable device 104 (e.g., via image sensors), the wrist-wearable device 106 (e.g., via neuromuscular sensors), and the stylus 108 (e.g., via accelerators). FIG. 1A further shows a scene 110 that includes a message 112 that is displayed by the head-wearable device 104. In some embodiments, the scene 110 corresponds to a VR scene. In some embodiments, the scene 110 corresponds to an augmented reality scene (e.g., with virtual objects overlaid with real world objects). In some embodiments, the message 112 corresponds to a messenger application (e.g., executing on the head-wearable device 104 and/or the wrist-wearable device 106). In accordance with some embodiments, the message 112 includes text ("Hey Alex, The ne") corresponding to gestures previously performed by the user 102. For example, the user 102 had previously typed or written the text shown in FIG. 1A.

FIG. 1A also shows an estimated cognitive load 116 (equal to 0.9 in FIG. 1A) and top suggestions 118 (e.g., provided by a machine-learning component based on the text of message 112). Each of the top suggestions 118 in FIG. 1A has a corresponding confidence value (e.g., the first suggestion of "new" has a corresponding confidence value of 0.6). The top suggestions 118 correspond to completing a word that starts with "ne." In some embodiments, suggestions (e.g., the top suggestions 118) are based on context information (e.g., information about the user 102, such as previous messages, calendar information, contact information, and/or location information). In some embodiments, the confidence value is based on existing text (e.g., the text of the message 112) and context information. In some embodiments, the suggestions are obtained as the top results (e.g., the results having the highest corresponding confidence scores) from a machine-learning model (e.g., an LLM). The top suggestions 118 are calculated by the head-wearable device 104 as indicated by the dotted line in FIG. 1A. In some embodiments, the top suggestions 118 are calculated by a different device or system component (e.g., the wrist-wearable device 106 or a companion device). The top suggestions 118 are not shown to the user 102 (e.g., in accordance with a determination that the estimated cognitive load 116 of the user 102 is above a threshold).

Figure 1B:
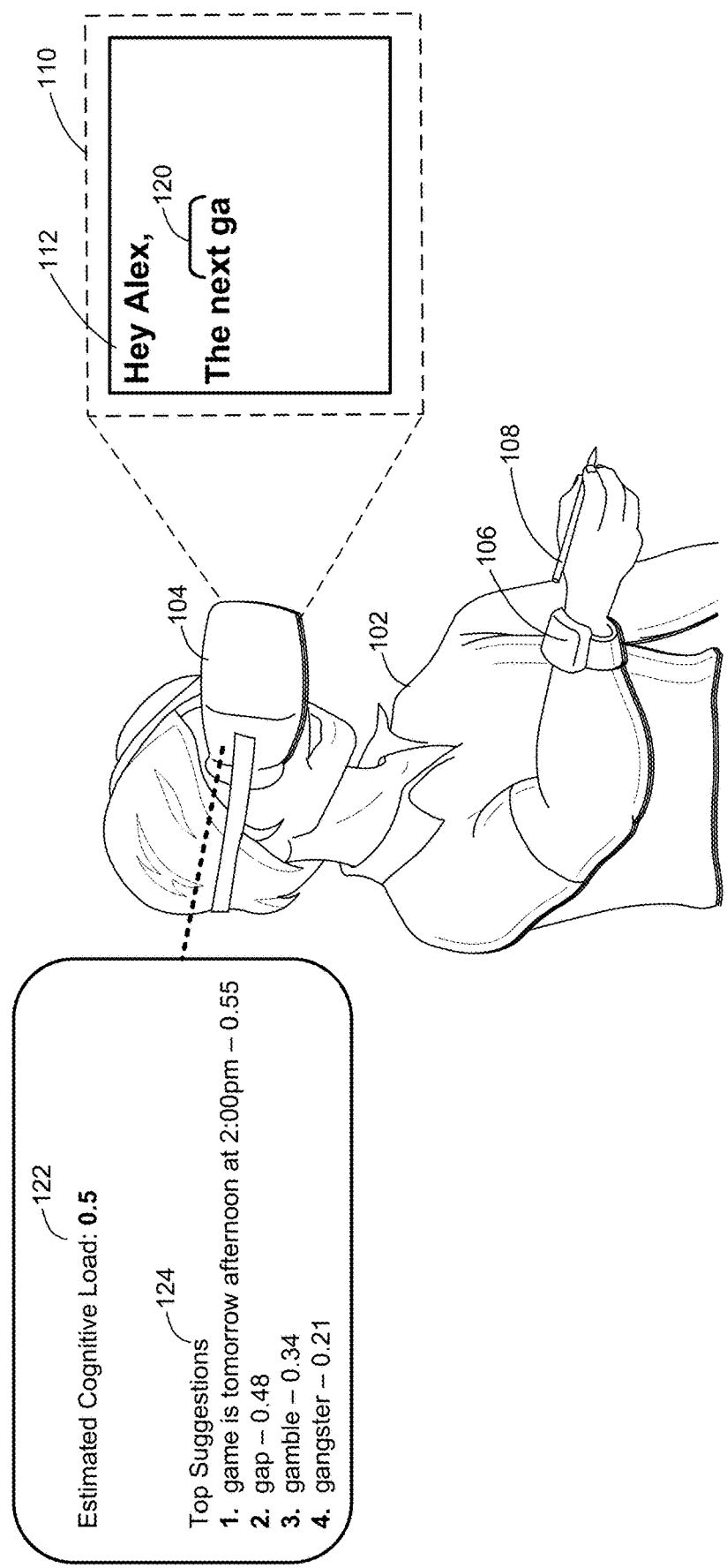

FIG. 1B illustrates a transition from FIG. 1A in response to the user gesture 114. In the example of FIGS. 1A and 1B, the user gesture 114 corresponds to text 120 (e.g., "xt ga"). FIG. 1B shows the message 112 updated to include the text 120 in response to the user gesture 114. FIG. 1B further shows an estimated cognitive load 122 of 0.5 and top suggestions 124. The cognitive load 122 of 0.5 in FIG. 1B indicates that the user 102 has a lower estimated cognitive load in FIG. 1B as compared to FIG. 1A. Each of the top suggestions 124 in FIG. 1B has a corresponding confidence value (e.g., the first suggestion of "game is tomorrow afternoon at 2:00 pm" has a corresponding confidence value of 0.55). The top suggestions 124 correspond to completing a word that starts with "ga". The first suggestion further includes a phrase following the suggested word of "game" (e.g., "is tomorrow afternoon at 2:00 pm"). In some embodiments, the suggested phrase is based on calendar information for the user 102 (e.g., a scheduled game with Alex). The top suggestions 124 are calculated by the head-wearable device 104 as indicated by the dotted line in FIG. 1B. In some embodiments, the top suggestions 124 are calculated by a different device.

Figure 1C:
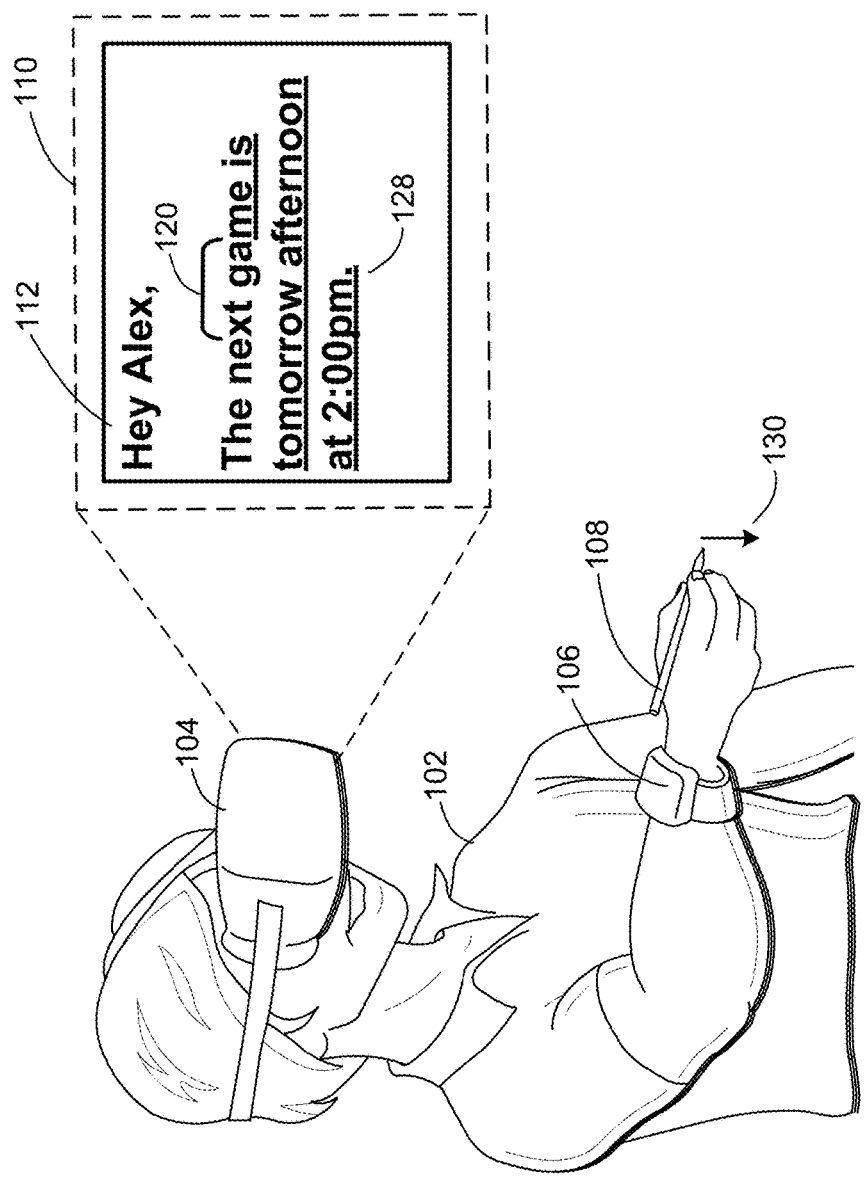

FIG. 1C illustrates a transition from FIG. 1B (e.g., in accordance with a determination that an estimated cognitive load of the user meets one or more criteria and/or a determination that a confidence value of a suggestion meets one or more criteria). In FIG. 1C a suggestion 128 is displayed in the scene 110. The suggestion 128 corresponds to the first suggestion in FIG. 1B. In some embodiments, the suggestion 128 is displayed via the head-wearable device 104. In some embodiments, the head-wearable device 104 determines (or otherwise obtains) a set of top potential suggestions (e.g., the top suggestions 124) and presents one of the top potential suggestions to the user 102. In some embodiments, the suggestion 128 is received by the head-wearable device 104 from another device (e.g., the wrist-wearable device 106). For example, another device may obtain a set of top potential suggestions from a machine-learning component and then select one of the potential suggestions and send it to the head-wearable device 104 for display to the user. In some embodiments, more than one suggestion is presented to the user 102 (e.g., a pop-up or menu is presented with two or more suggestions). In some embodiments, in accordance with a determination that the estimated cognitive load is below a preset threshold (e.g., below a threshold of 0.51), a suggestion is provided for the user. In some embodiments, in accordance with a determination that the estimated cognitive load is above a preset threshold (e.g., above a threshold of 0.51), no suggestion is provided to the user (e.g., regardless of confidence value). In some embodiments, presenting a suggestion (e.g., the suggestion 128) includes activating one or more sensors (e.g., in order to detect a subsequent suggestion acceptance gesture). In some embodiments, activating a sensor includes operating the sensor in a higher power mode and/or processing data collected by the sensor. In some embodiments, a suggestion (e.g., the suggestion 128) is presented in accordance with a user request (e.g., a user request for a suggestion). For example, the user 102 may perform a gesture (or issue a voice command) that is mapped to a function to provide a suggestion.

In some embodiments, the suggestion 128 is visually distinguished from the text 120 (e.g., the suggestion 128 is in a different font, color, or style than the text 120). In some embodiments, the suggestion 128 is presented with underlining, italics, and/or other highlighting. In some embodiments, the suggestion 128 is presented with an indication of how to accept the suggestion 128 (e.g., indication of a command/gesture for accepting the suggestion that is presented with the message 112). For example, a swipe gesture (e.g., a swipe-down gesture or swipe-right gesture) may be mapped to a command for accepting suggestions. In this example, an indication of the swipe gesture may be presented to the user 102 (e.g., a message such as "swipe down to accept suggestion" may be displayed). In some embodiments, a suggestion is displayed with a message/document, but is not added/stored to the message/document unless accepted. FIG. 1C further shows the user 102 performing a gesture 130 (e.g., a swipe-down gesture). In some embodiments, the gesture 130 is a first type of gesture, and the first type of gesture is mapped to a suggestion-acceptance function. In some embodiments, the first type of gesture is mapped to the suggestion-acceptance function while a suggestion is displayed (and is mapped to other functions when no suggestions are displayed).

Figure 1D:
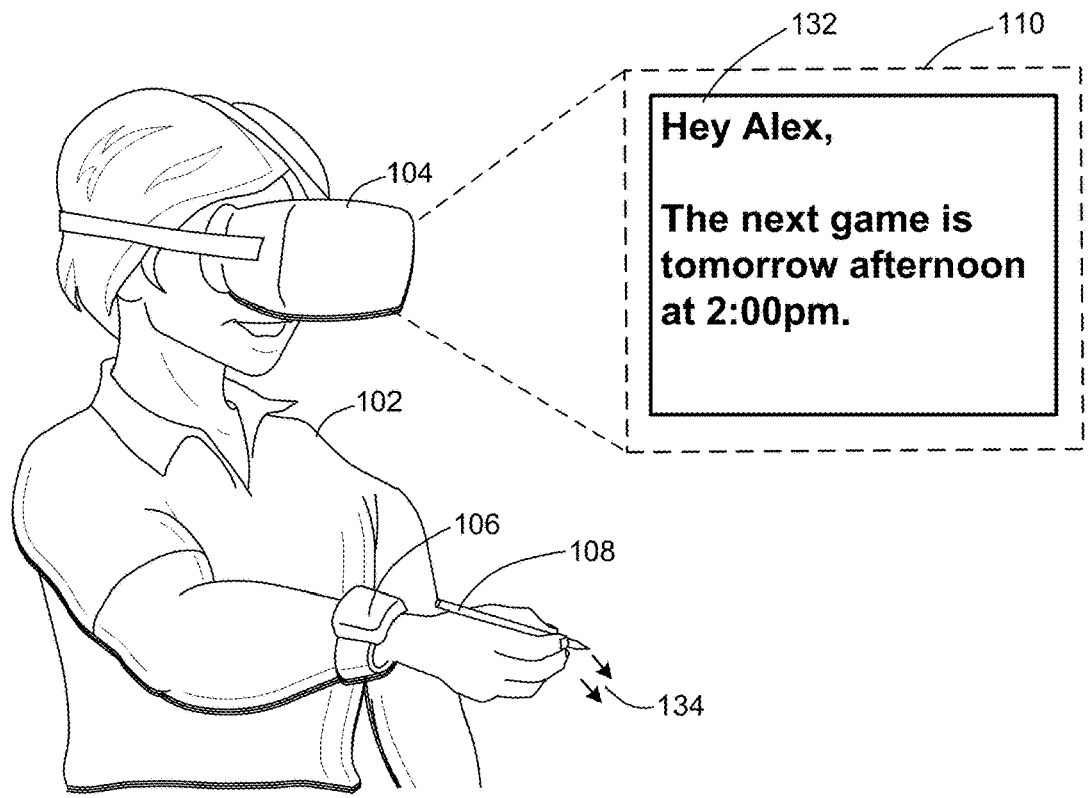

FIG. 1D illustrates a transition from FIG. 1C in response to the user gesture 130 (e.g., accepting the suggestion 128). In FIG. 1D, the scene 110 shows a message 132 that includes the suggestion 128 (e.g., the suggestion 128 has been added to the message 112). In some embodiments, an accepted suggestion is stored to the message/document with the user-entered text (e.g., the text 120). In some embodiments, an accepted suggestion is not visually distinguished from user-entered text (e.g., any highlighting or differences in color or style are removed when the suggestion is accepted). In some embodiments, accepting a suggestion causes the system (e.g., a system that includes the head-wearable device 104 and the wrist-wearable device 106) to transition modes (e.g., from an editing mode to a display mode).

FIG. 1D further shows the user 102 performing a gesture 134 (e.g., a double-tap gesture). In some embodiments, the gesture 134 is a second type of gesture, and the second type of gesture is mapped to a message-send function. In some embodiments, the second type of gesture is mapped to the message-send function while a message application is active (and is mapped to other functions when other applications are active). In some embodiments, the second type of gesture is mapped to the message-send function while a message editing mode and/or message display mode is active.

Figure 1E:
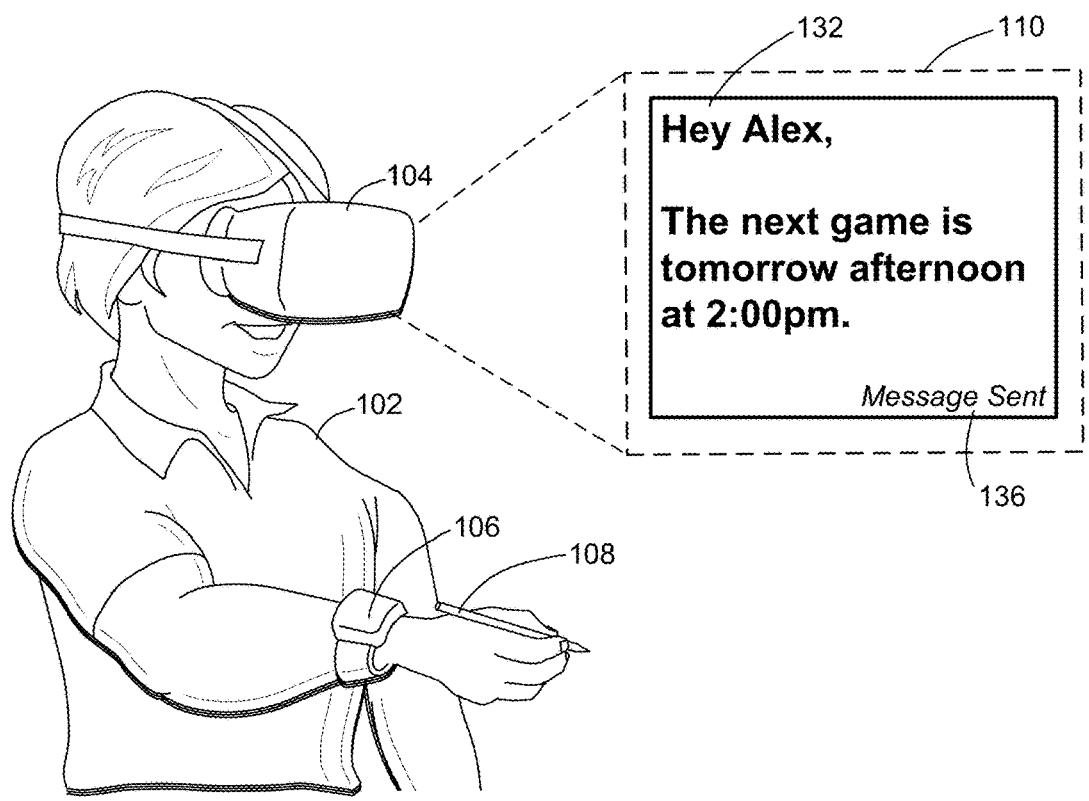

FIG. 1E illustrates a transition from FIG. 1D in response to the user gesture 134 (e.g., requesting the message 132 be sent). In FIG. 1E, the scene 110 shows the message 132 and a notification 136 that the message 132 has been sent (e.g., to a recipient named "Alex" in the user's contact list). In some embodiments, in accordance with sending the message 132, the message 132 is no longer displayed. In some embodiments, in accordance with sending the message 132, the message 132 is displayed in a different user interface and/or in a different manner than before the message 132 is sent. In some embodiments, a second type of gesture is mapped to the message send function, a third type of gesture is mapped to a message-save function, a fourth type of gesture is mapped to an undo/delete function, and/or a fifth type of gesture is mapped to a new-suggestion function. In some embodiments, different gesture mappings are available to the user in accordance with sending the message 132. For example, a mode of the system changes in accordance with sending the message (e.g., from a message-drafting mode to a message-display mode) and different gesture mappings are used with each mode.

Although FIGS. 1A-1E illustrate the user 102 holding the stylus 108, in some other embodiments the user 102 performs the gestures described above without using a stylus or other hand-held device (e.g., the user performs the gestures without holding anything). For example, the user 102 may perform the user gesture 114 as though holding an imaginary pencil or may perform the user gesture 114 as though writing with a finger (e.g., the index finger).

Figure 2A:
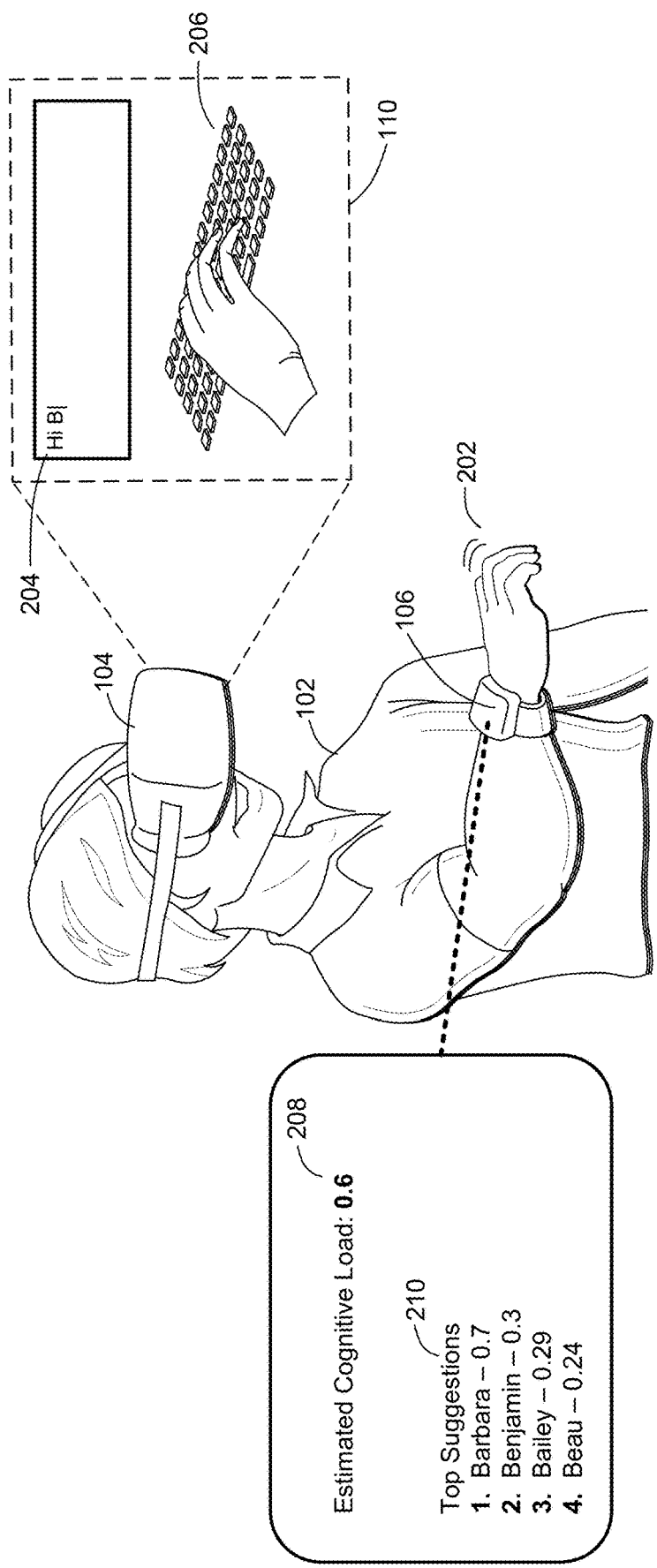
FIGS. 2A-2F illustrate another example scenario of a system providing text suggestions in accordance with some embodiments.

FIGS. 2A-2F illustrate another example scenario of a system providing text suggestions in accordance with some embodiments. FIG. 2A illustrates the user 102 wearing the head-wearable device 104 and the wrist-wearable device 106. The user 102 in FIG. 2A is performing a gesture 202 (e.g., a typing gesture). In some embodiments, the gesture 202 is performed as an in-air gesture, while in other embodiments, the gesture 202 is performed on a surface (e.g., a countertop or wall). In some embodiments, the user gesture 202 is detected by the head-wearable device 104 (e.g., via image sensors) and/or the wrist-wearable device 106 (e.g., via neuromuscular sensors). FIG. 2A further shows the scene 110 that includes a message 204 and a virtual keyboard 206 that is displayed by the head-wearable device 104. In some embodiments, the message 204 corresponds to a messenger application (e.g., executing on the head-wearable device 104 and/or the wrist-wearable device 106). In accordance with some embodiments, the message 204 includes text ("Hi B") corresponding to gestures previously performed by the user 102. For example, the user 102 had previously typed, written, or spoken the text shown in FIG. 2A.

FIG. 2A also shows an estimated cognitive load 208 (equal to 0.6 in FIG. 2A) and top suggestions 210 (e.g., provided by a machine-learning component based on the text of message 204). Each of the top suggestions 210 in FIG. 2A has a corresponding confidence value (e.g., the first suggestion of "Barbara" has a corresponding confidence value of 0.7). The top suggestions 210 correspond to completing a word that starts with "B." In some embodiments, suggestions (e.g., the top suggestions 210) are based on context information (e.g., information about the user 102, such as previous messages, calendar information, contact information, and/or location information). In some embodiments, the top suggestions 210 are identified based on names in a contact list of the user 102. In some embodiments, the confidence value is based on existing text (e.g., the text of the message 204) and context information. In some embodiments, the suggestions are obtained as the top results (e.g., the results having the highest corresponding confidence scores) from a machine-learning model (e.g., an LLM). The top suggestions 210 are calculated by the wrist-wearable device 106 as indicated by the dotted line in FIG. 2A. In some embodiments, the top suggestions 210 are calculated by a different device or system component (e.g., the head-wearable device 104 or a companion device).

Figure 2B:
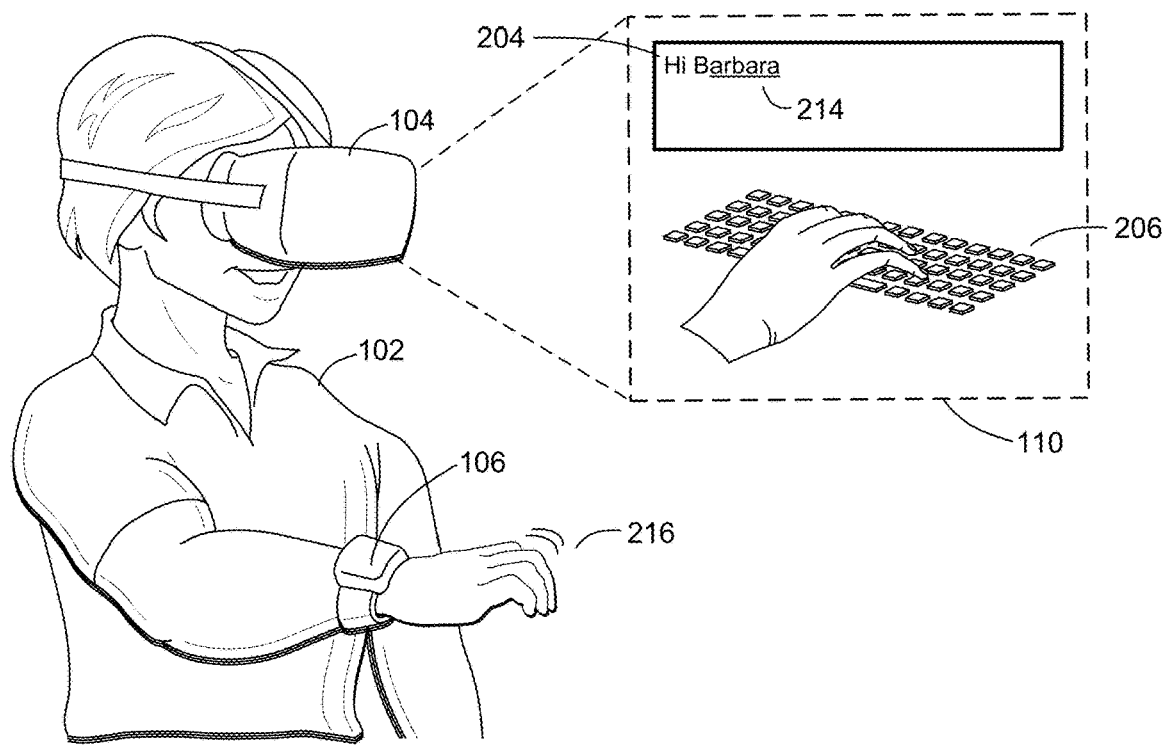

FIG. 2B illustrates a transition from FIG. 2A (e.g., in accordance with a determination that an estimated cognitive load of the user meets one or more criteria and/or a determination that a confidence value of a suggestion meets one or more criteria). In FIG. 2B a suggestion 214 is displayed in the message 204 in the scene 110. The suggestion 214 corresponds to the first suggestion in FIG. 2A. In some embodiments, the suggestion 214 is displayed via the head-wearable device 104. In some embodiments, the suggestion 214 is received by the head-wearable device 104 from another device (e.g., the wrist-wearable device 106). For example, another device may obtain a set of top potential suggestions from a machine-learning component and then select one of the potential suggestions and send it to the head-wearable device 104 for display to the user. FIG. 2B further shows the user 102 performing a gesture 216 (e.g., a typing gesture).

Figure 2C:
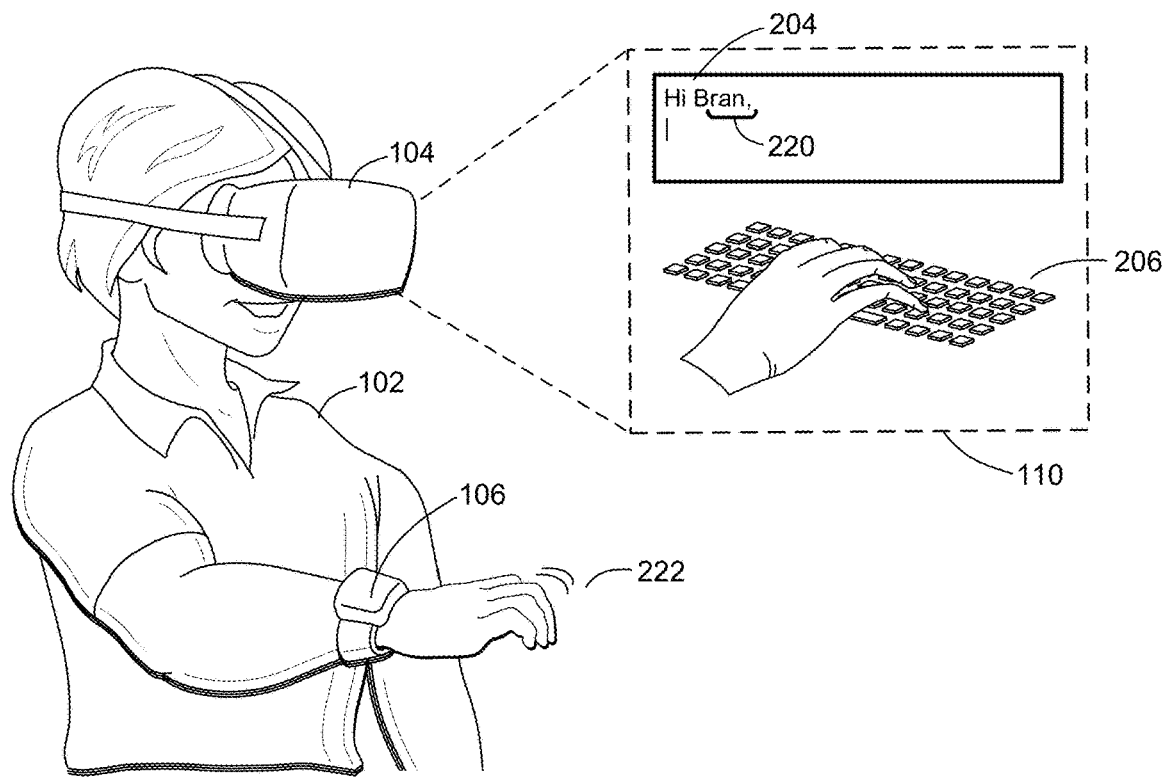

FIG. 2C illustrates a transition from FIG. 2B in response to the user gesture 216. In the example of FIGS. 2B and 2C, the user gesture 216 corresponds to text 220 (e.g., "ran,"). FIG. 2C shows the message 204 updated to include the text 220 in response to the user gesture 216. In some embodiments, in accordance with the user 102 performing a gesture that is not mapped to accepting the suggestion 214, the suggestion 214 is considered to be rejected (and ceases to be displayed). In some embodiments, the suggestion 214 ceases to be displayed in accordance with the user 102 entering new text (e.g., via a typing gesture, writing gesture, or voice command). In some embodiments, a suggestion being rejected (e.g., the suggestion 214) causes negative feedback (e.g., a negative reward) to be provided to a machine-learning component that provided the suggestion (e.g., a component configured for reinforcement learning). FIG. 2C further shows the user 102 performing a gesture 222 (e.g., a typing gesture).

Figure 2D:
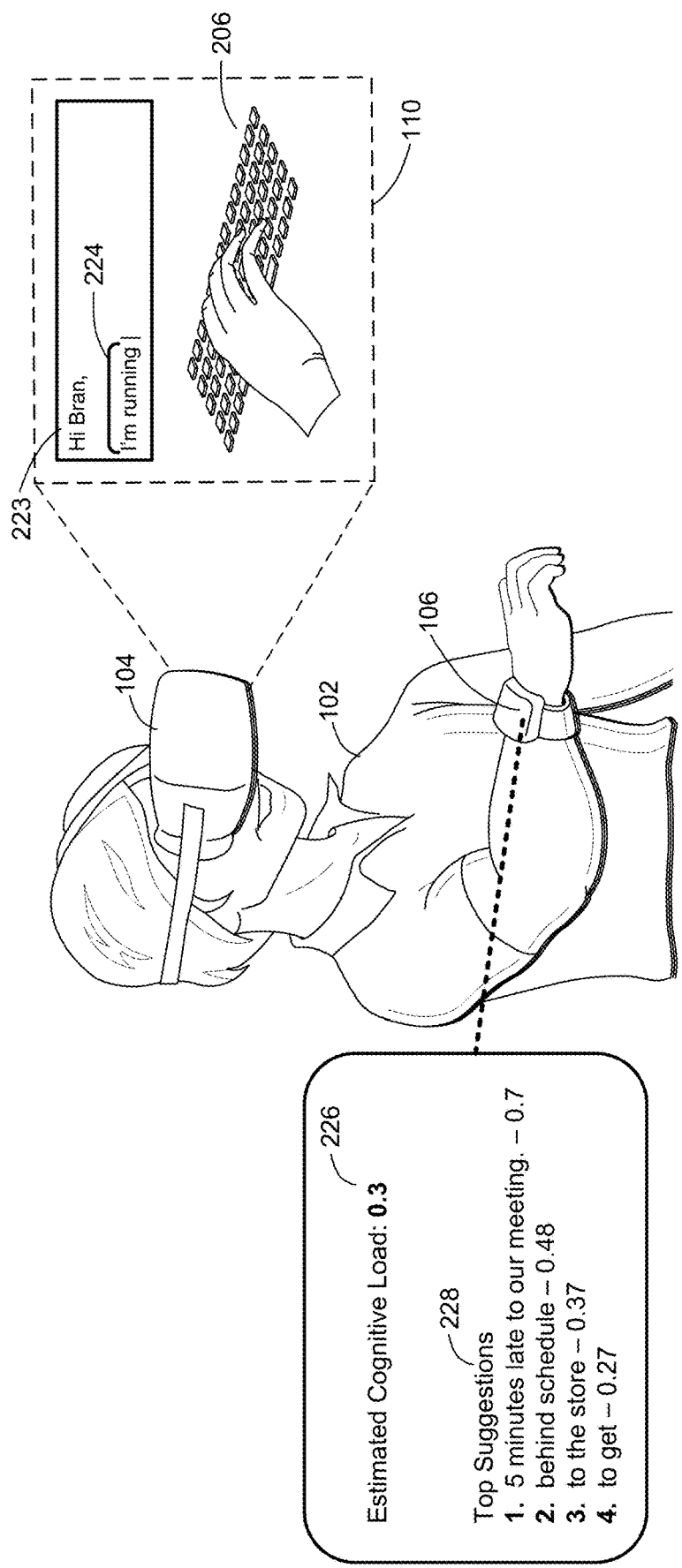

FIG. 2D illustrates a transition from FIG. 2C in response to the user gesture 222. In the example of FIGS. 2C and 2D, the user gesture 222 corresponds to text 224 (e.g., "I'm running"). FIG. 2D shows the message 223 updated to include the text 224 in response to the user gesture 222. FIG. 2D further shows an estimated cognitive load 226 of 0.3 and top suggestions 228. Each of the top suggestions 228 in FIG. 2D has a corresponding confidence value (e.g., the first suggestion of "5 minutes late to our meeting." has a corresponding confidence value of 0.7). The top suggestions 228 correspond to completing a phrase that starts with "I'm running." In some embodiments, the suggested phrases are based on context information of the user 102 (e.g., calendar information, location information, and/or inventory information). The top suggestions 228 are calculated by the wrist-wearable device 106 as indicated by the dotted line in FIG. 2D. In some embodiments, the top suggestions 228 are calculated by a different device.

Figure 2E:
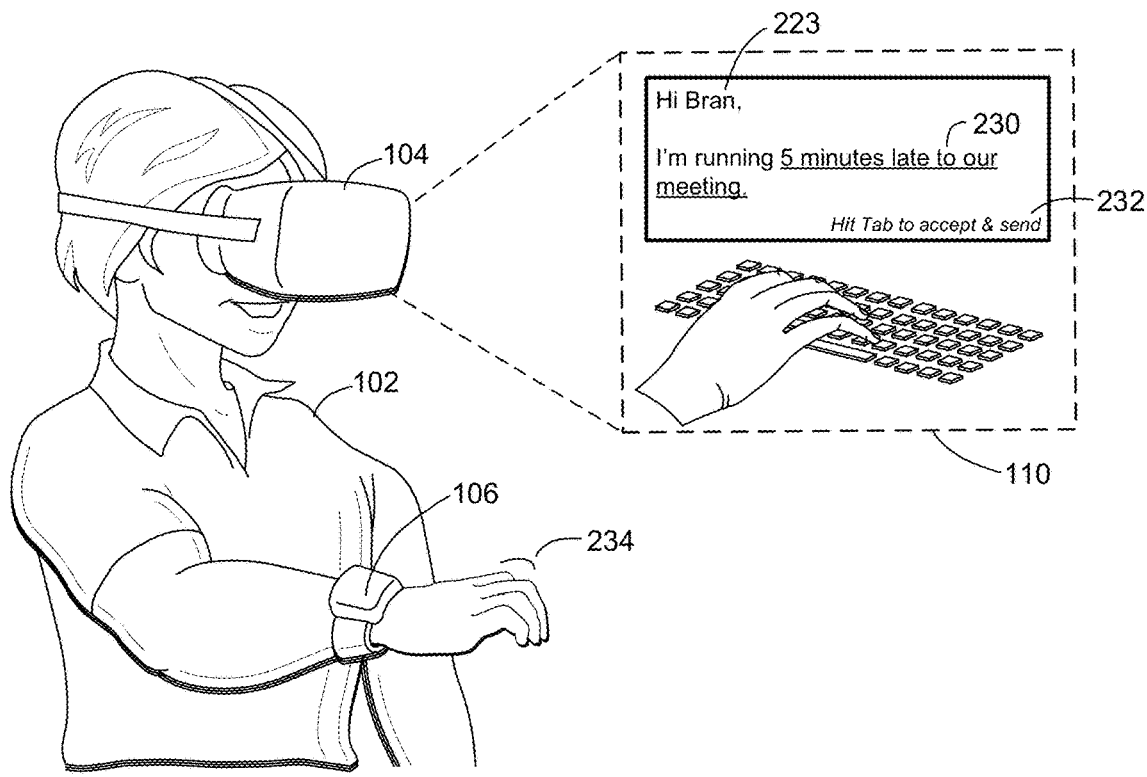

FIG. 2E illustrates a transition from FIG. 2D (e.g., in accordance with a determination that an estimated cognitive load of the user meets one or more criteria and/or a determination that a confidence value of a suggestion meets one or more criteria). In FIG. 2E a suggestion 230 is displayed in the message 223 in the scene 110. The suggestion 230 corresponds to the first suggestion in FIG. 2D. In some embodiments, the suggestion 230 is displayed via the head-wearable device 104. In some embodiments, the suggestion 230 is received by the head-wearable device 104 from another device (e.g., the wrist-wearable device 106). For example, another device may obtain a set of top potential suggestions from a machine-learning component and then select one of the potential suggestions and send it to the head-wearable device 104 for display to the user. In some embodiments, a suggestion (e.g., the suggestion 230) is automatically inserted into (e.g., stored to) a message/document (e.g., the message 223) in accordance with a confidence level of the suggestion being above a certain threshold (e.g., indicating greater than 90%, 95%, or 99% confidence).

The message 223 in FIG. 2E is displayed with a notification 232 indicating that the user 102 may trigger a virtual Tab key to accept the suggestion and send the message (e.g., send the message to a contact of the user 102 named "Bran"). In some embodiments, the scene 110 includes a notification indicating a gesture that the user may perform to accept the suggestion without sending the message (e.g., in addition to, or alternatively to, providing the notification 232). FIG. 2E further shows the user 102 performing a gesture 234 (e.g., a tap gesture).

Figure 2F:
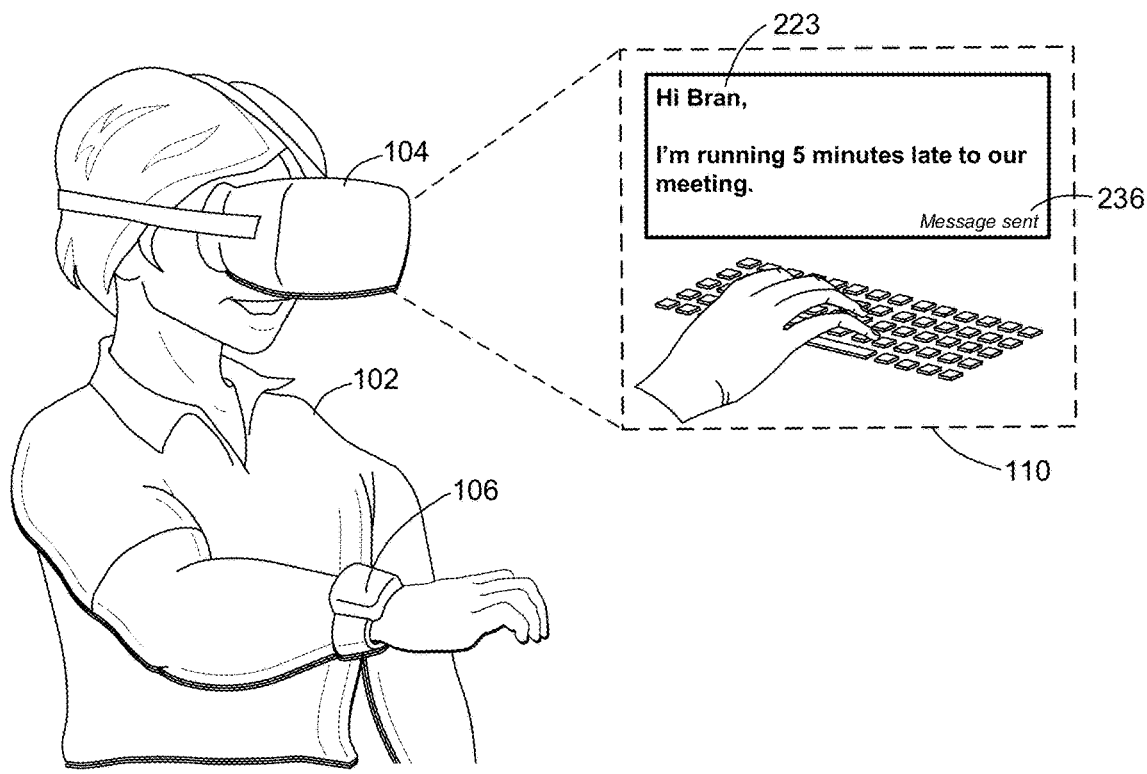

FIG. 2F illustrates a transition from FIG. 2E in response to the user gesture 234 (e.g., requesting the suggestion be accepted and the message 223 be sent). In FIG. 2F, the scene 110 shows the message 223 and a notification 236 that the message 223 has been sent (e.g., to a recipient named "Bran" in the user's contact list). In some embodiments, in accordance with sending the message 223, the message 223 is no longer displayed. In some embodiments, in accordance with sending the message 223, the message 223 is displayed in a different user interface and/or in a different manner than before the message 223 is sent. In some embodiments, a messenger application is closed or minimized in accordance with the message 223 being sent. In some embodiments, different gesture mappings are available to the user in accordance with sending the message 223. For example, a mode of the system changes in accordance with sending the message (e.g., from a message-drafting mode to a message-display mode) and different gesture mappings are used with each mode. In some embodiments, a conversation between the user 102 and the recipient "Bran" is displayed in accordance with the message 232 being sent.

Although FIGS. 1A-1E and 2A-2F illustrate the user 102 wearing the head-wearable device 104 and the wrist-wearable device 106, in some other embodiments, the user 102 is using other types of devices. For example, the user 102 may use only the wrist-wearable device 106 (e.g., alone or in conjunction with a separate display device). In some embodiments, the user 102 uses a different type of wearable device than shown in FIGS. 1A-1E (e.g., a ring and/or a wearable garment such as a glove or sleeve). For example, the user 102 may use a wearable garment in addition to, or alternatively to, wearing the wrist-wearable device 106. Other examples of wearable devices include rings, anklets, armbands, neckbands, headbands, and smart clothing (e.g., clothing with integrated sensors and electronics). In some embodiments, the gestures described above with respect to FIGS. 1A-1E and 2A-2F are detected via sensors of the head-wearable device 104 (e.g., image sensors), the wrist-wearable device 106 (e.g., neuromuscular sensors), and/or the stylus 108 (e.g., force sensors and/or accelerometers).

Although FIGS. 1A-1E and 2A-2F illustrate examples of suggestions corresponding to text completion, in some embodiments, suggestions correspond to text corrections. For example, in response to a user writing/typing the term "runing" a suggestion is provided to replace the term "runing" with the word "running." In some embodiments, a text correction is automatically applied in accordance with a confidence score for the text correction being above a certain threshold (e.g., indicating greater than 90%, 95%, or 99% confidence). In some embodiments, text correction suggestions are indicated by emphasis/highlighting applied to the term to be replaced by the correction. In some embodiments, text correction suggestions are presented adjacent to the term to be replaced. In some embodiments, a text correction suggestion is displayed in place of the term to be replaced (e.g., with a different emphasis, highlighting, and/or style than other text in the message/document to indicate that it is a suggestion). In some embodiments, the system learns user preferences (e.g., a preference for using a slang term or a particular spelling) based on whether the user accepts or reject/ignores the suggestions.

Although FIGS. 1A-1E and 2A-2F illustrate examples in which explicit values are calculated for estimated cognitive loads, in some embodiments estimating cognitive loads does not include calculating explicit values. In some embodiments, cognitive loads are estimated in a qualitative manner. For example, a cognitive load may be estimated based on a user's history of accepting or not accepting suggestions. In some embodiments, a machine learning model determines whether an estimated cognitive load meets one or more criteria without calculating and/or outputting a cognitive load value.

Figure 3:
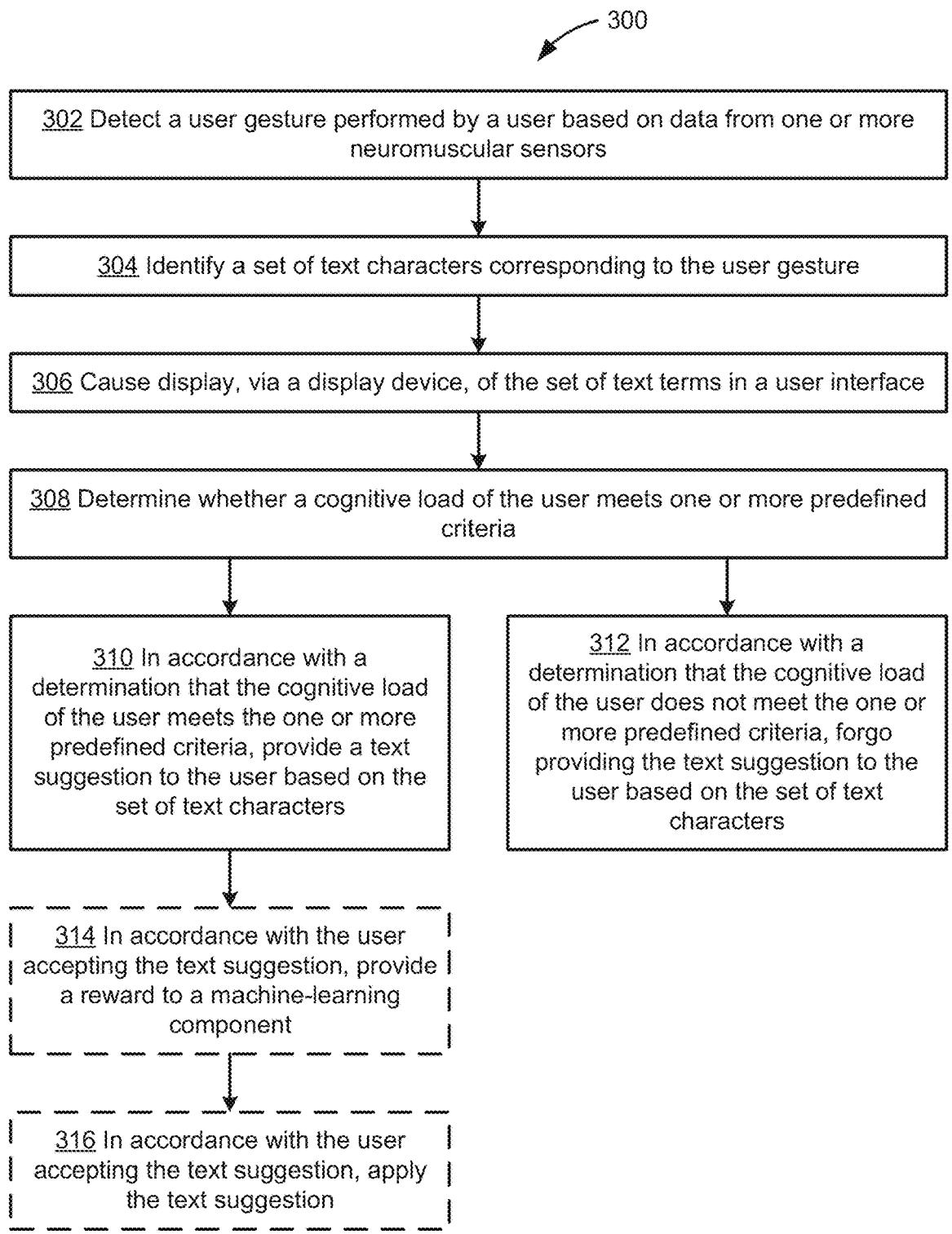
FIG. 3 shows a flow chart for an example method of providing text suggestions in accordance with some embodiments.

FIG. 3 shows a flow chart for a method 300 of providing text suggestions in accordance with some embodiments. The method 300 is performed at a computing system (e.g., a wearable device, a mobile device, and/or intermediary device) having one or more processors and memory. In some embodiments, the memory stores one or more programs configured for execution by the one or more processors. At least some of the operations shown in FIG. 3 correspond to instructions stored in a computer memory or computer-readable storage medium (e.g., the memory 780, the memory 850A, and/or the memory 850B). In some embodiments, the computing system is, or includes, a wearable device, such as the wrist-wearable device 106 or the head-wearable device 104. In some embodiments, the computing system is, or includes, an intermediary device such as a smartphone, a tablet, or other electronic device.

Figure 5A:
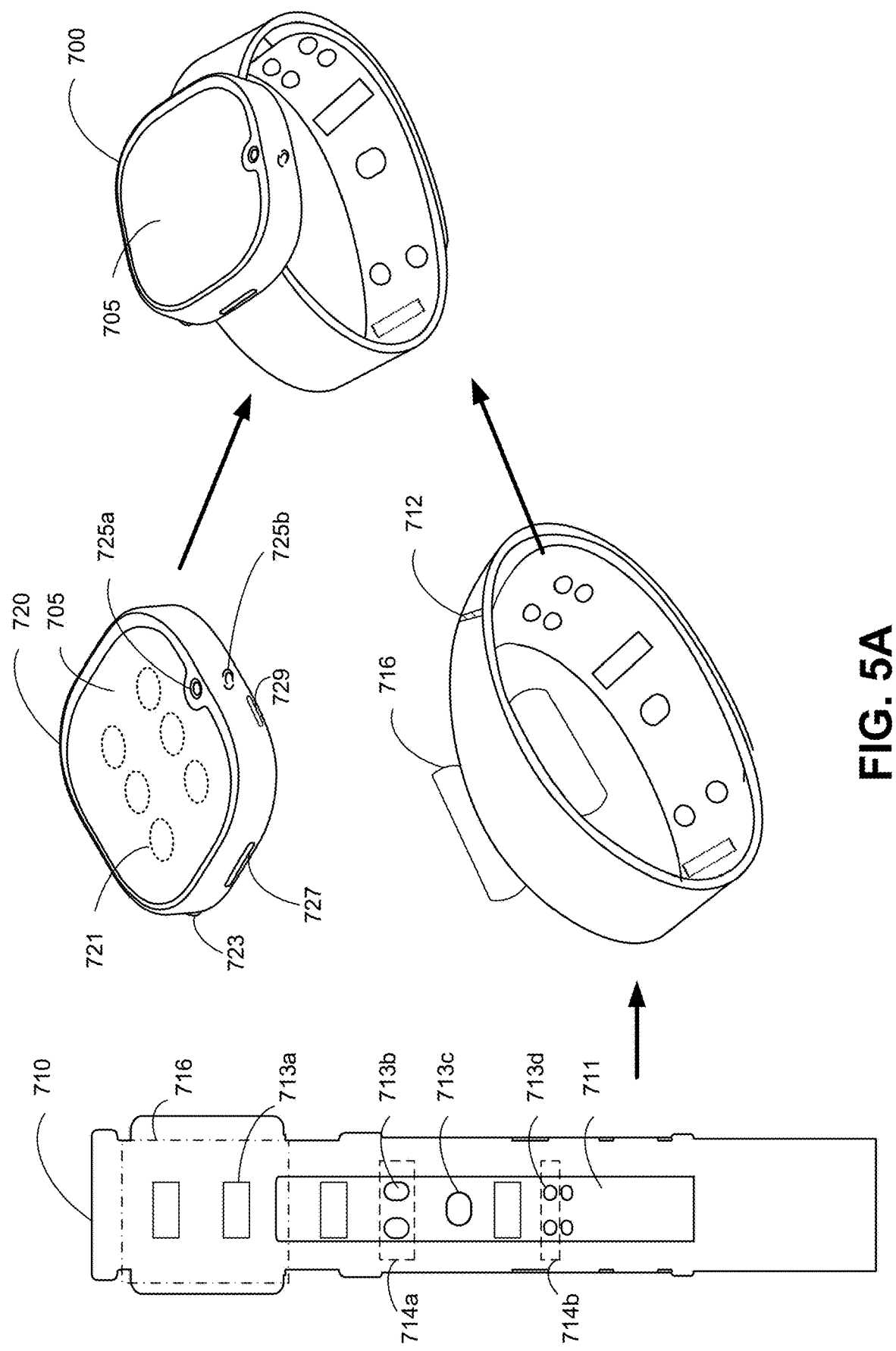
FIGS. 5A-5B illustrate an example wrist-wearable device in accordance with some embodiments.
Figure 5B:
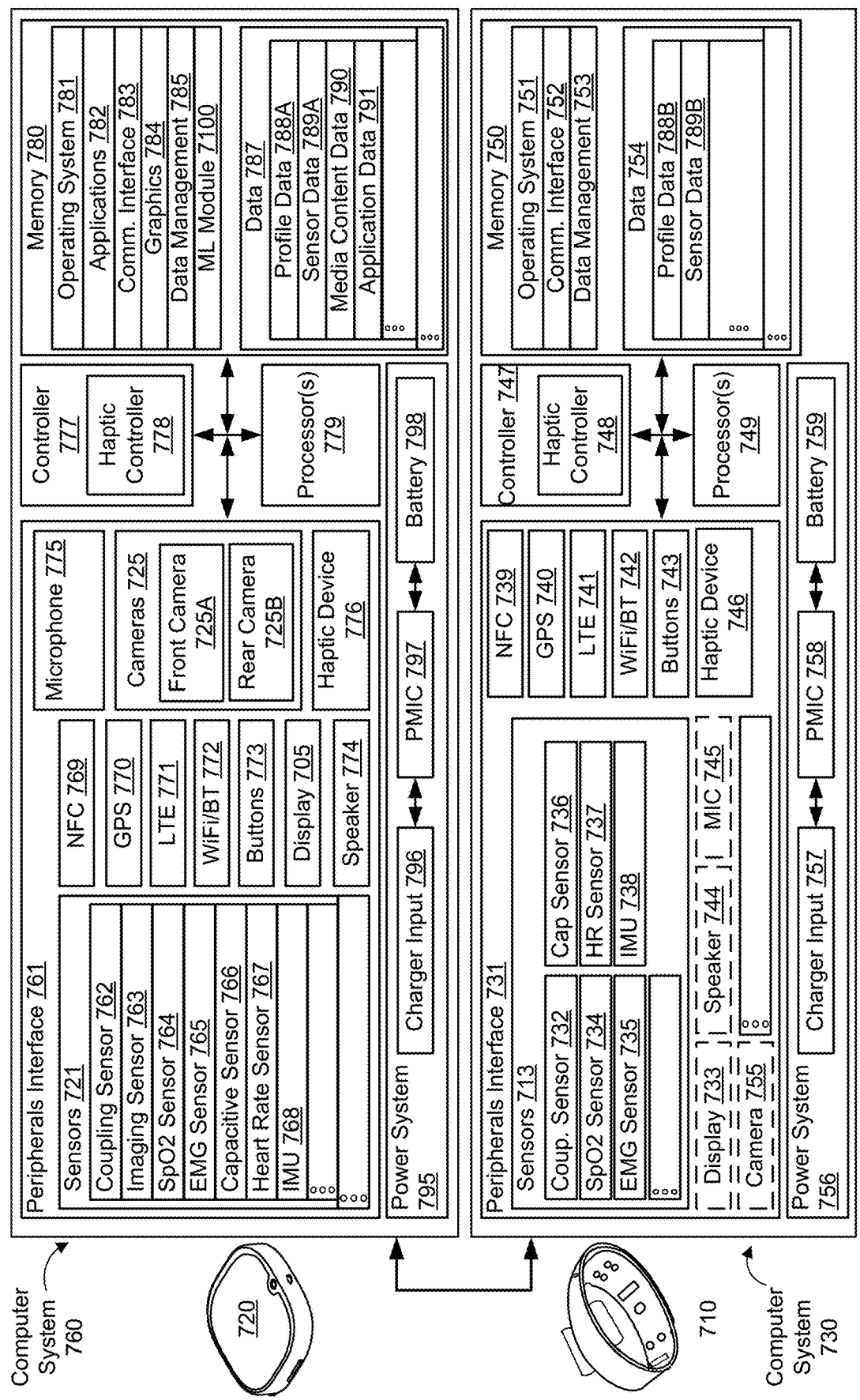

The computing system detects (302) a user gesture (e.g., the user gesture 114 in FIG. 1A) performed by a user based on data from one or more neuromuscular sensors (e.g., the EMG sensor 765 in FIG. 5B). In some embodiments, the user gesture is detected by a wearable device (e.g., the wrist-wearable device 106). In some embodiments, the user gesture comprises a handwriting motion (e.g., with a stylus, pencil, or empty hand).

The computing system identifies (304) a set of text characters corresponding to the user gesture (e.g., the text 120 in FIG. 1B). In some embodiments, the set of text characters is identified based on a mapping between neuromuscular data and text characters. In some embodiments, the set of text characters is appended to a set of pre-existing text in a document (e.g., the text 120 is appended to the text of the message 112 in FIG. 1B).

The computing system causes display (306), via a display device, of the set of text terms in a user interface (e.g., the text 120 is displayed in the message 112 in FIG. 1B). In some embodiments, the set of text terms is provided in a manner that is distinct from how the set of text terms was gestured (e.g., the user writes in shorthand and/or cursive and the text appears in print characters).

The computing system determines (308) whether a cognitive load of the user (e.g., the estimated cognitive load 122 in FIG. 1B) meets one or more predefined criteria. In some embodiments, a cognitive load threshold is set based on explicit/implicit user preferences (e.g., preferences of the user performing the gesture and/or similar users). In some embodiments, the cognitive load is estimated based on context information for the user and/or context information regarding the set of text characters.

In accordance with a determination that the cognitive load of the user meets the one or more predefined criteria, the computing system provides (310) a text suggestion (e.g., the suggestion 128) to the user based on the set of text characters. In some embodiments, the one or more predefined criteria are based on one or more user preferences of the user. In some embodiments, the text suggestion is visually distinguished from the set of text characters (e.g., a different color, size, font, and/or with different emphasis). In some embodiments, the text suggestion is generated based on the set of text characters, a set of preexisting characters, and/or information about the user (e.g., context information). In some embodiments, the text suggestion is provided by a machine-learning component. In some embodiments, the machine-learning component is trained based on the data from the one or more neuromuscular sensors. In some embodiments, a set of suggestions, including the text suggestion, is obtained from the machine-learning component.

In accordance with a determination that the cognitive load of the user does not meet the one or more predefined criteria, the computing system forgoes providing (312) the text suggestion to the user based on the set of text characters. For example, in the example of FIGS. 1A and 1B, a suggestion is not provided based on the text in FIG. 1A in accordance with the estimated cognitive load 116 not meeting one or more predefined criteria. In some embodiments, the computing system (e.g., an ML model of the computing system) determines whether or not the cognitive load of the user meets the one or more predefined criteria without deterministically calculating a value for the cognitive load. For example, an ML model may be trained to provide an inference regarding whether to provide a suggestion. The inference is related to whether or not the cognitive load of the user meets the one or more predefined criteria, but does not include a value for the cognitive load.

In some embodiments, in accordance with the user accepting the text suggestion, the computing system provides (314) a reward to a machine-learning component. In some embodiments, in accordance with the user accepting the text suggestion, the computing system provides a positive reward. In some embodiments, in accordance with the user declining/ignoring the text suggestion, the computing system provides a negative reward. In some embodiments, the machine-learning component provides suggestions and estimates the cognitive load and, in response to receiving the reward, the machine-learning component updates one or more weights. In some embodiments, the reward is proportional to a length of the text suggestion.

In some embodiments, in accordance with the user accepting the text suggestion, the computing system applies (316) the text suggestion. For example, FIG. 1D shows the suggestion 128 being accepted in response to the user gesture 130 in FIG. 1C. In some embodiments, in accordance with a determination that the user input does not correspond to the command to accept the text suggestion, the computing system ceases to display the text suggestion (and optionally provides negative feedback to a machine-learning component). In some embodiments, applying the text suggestion includes executing a function of the computing system in accordance with the text suggestion (e.g., sending the corresponding message to a recipient).

It should be understood that the particular order in which the operations in FIG. 3 have been described is merely an example and is not intended to indicate that the described order is the only order in which the operations could be performed. One of ordinary skill in the art would recognize various ways to reorder the operations described herein. Having thus described example scenarios and processes, attention will now be turned to example devices and systems.

Example Systems

AR systems may be implemented in a variety of different form factors and configurations. Some artificial-reality systems include a near-eye display (NED), which provides visibility into the real world (e.g., the augmented-reality system 800 in FIG. 6A) or that visually immerses a user in an artificial reality (e.g., the virtual-reality system 810 in FIG. 6B-1). While some artificial-reality devices are self-contained systems, other artificial-reality devices communicate and/or coordinate with external devices to provide an artificial-reality experience to a user. Examples of such external devices include handheld controllers, mobile devices, desktop computers, devices worn by a user (e.g., the wrist-wearable device 700 in FIG. 5A), devices worn by one or more other users, and/or any other suitable external system.

Figure 4A:
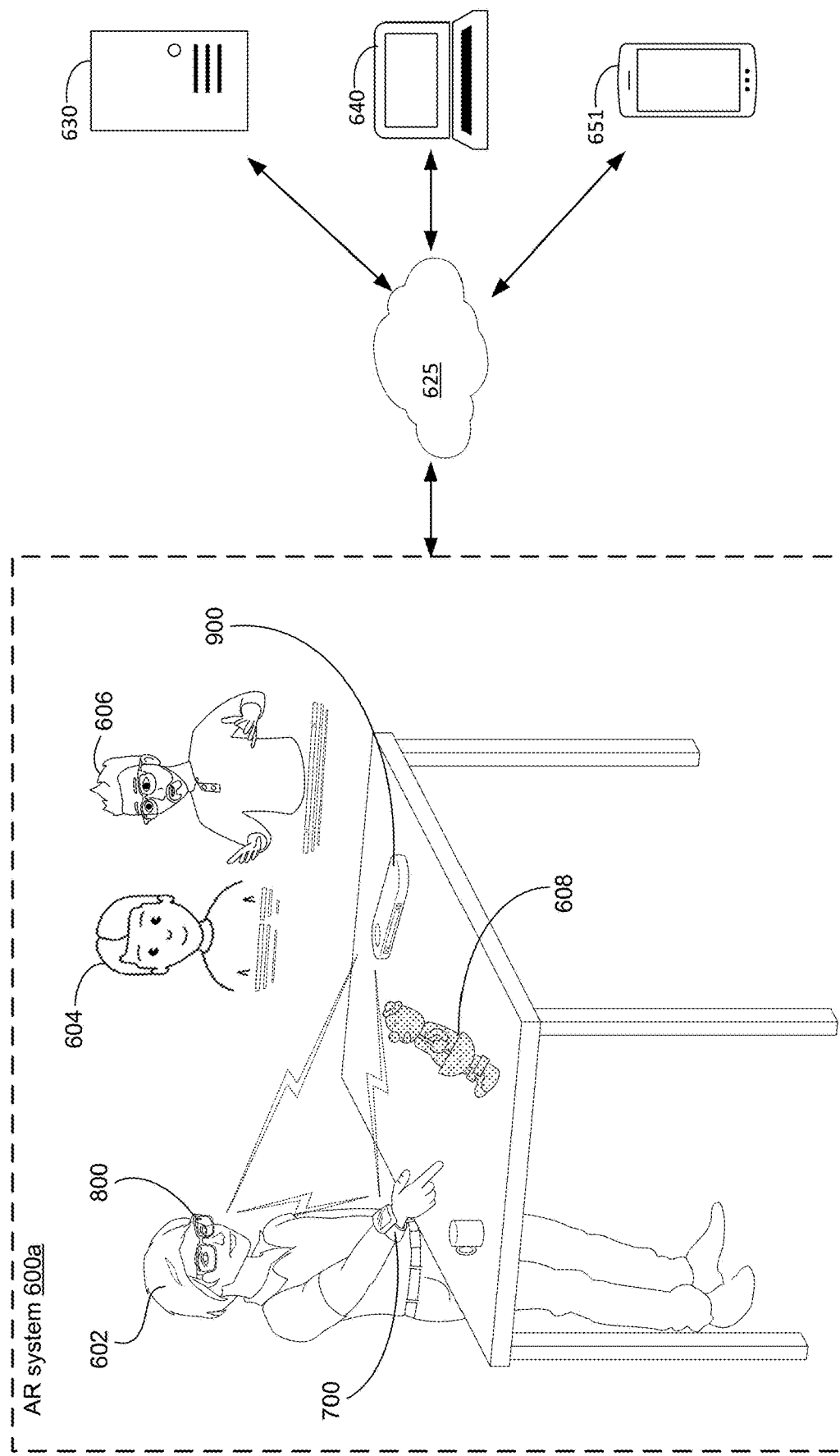
FIGS. 4A, 4B, 4C-1, 4C-2, 4D-1, and 4D-2 illustrate example artificial-reality (AR) systems in accordance with some embodiments.
Figure 4B:
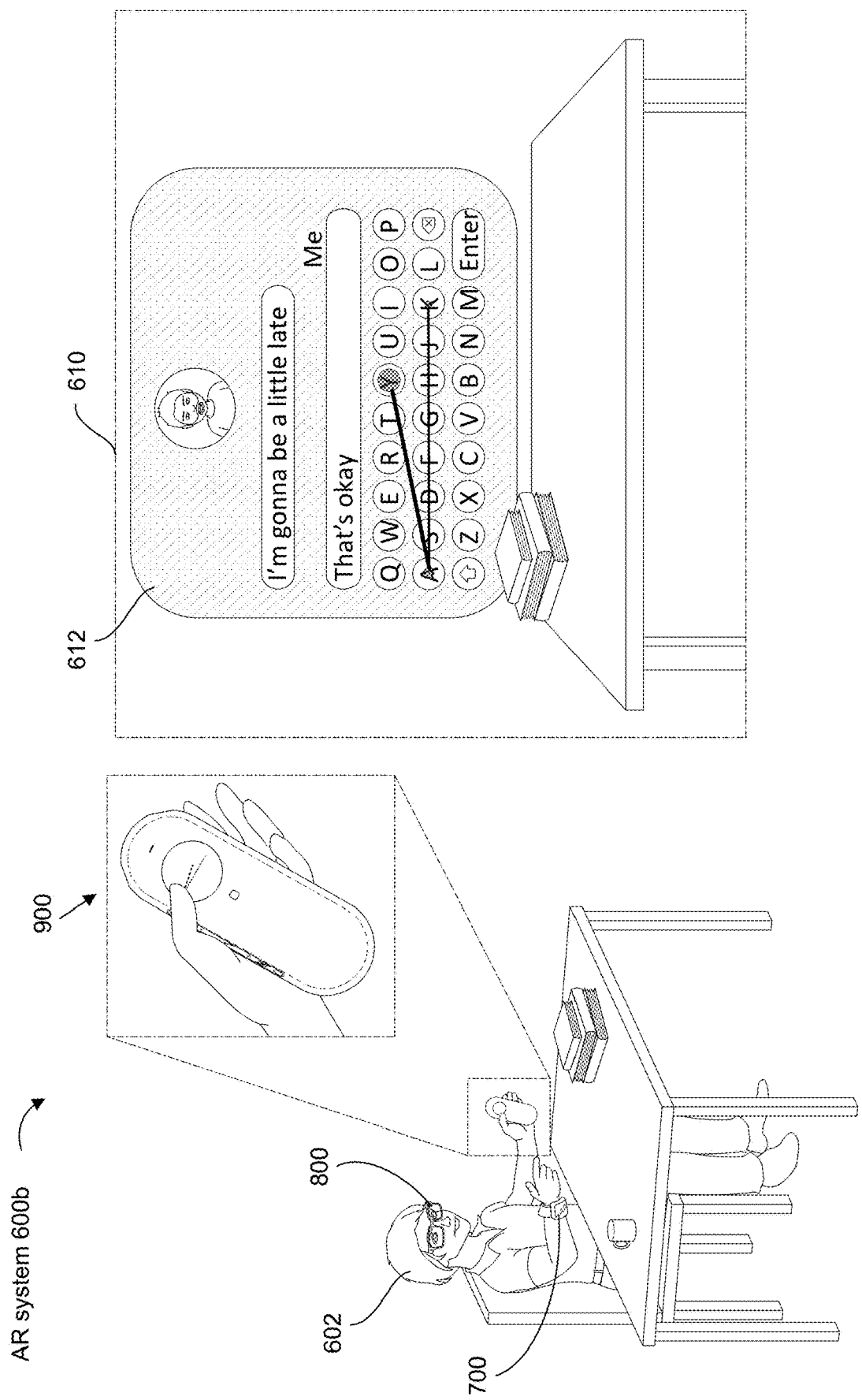
Figures 1, 4C:
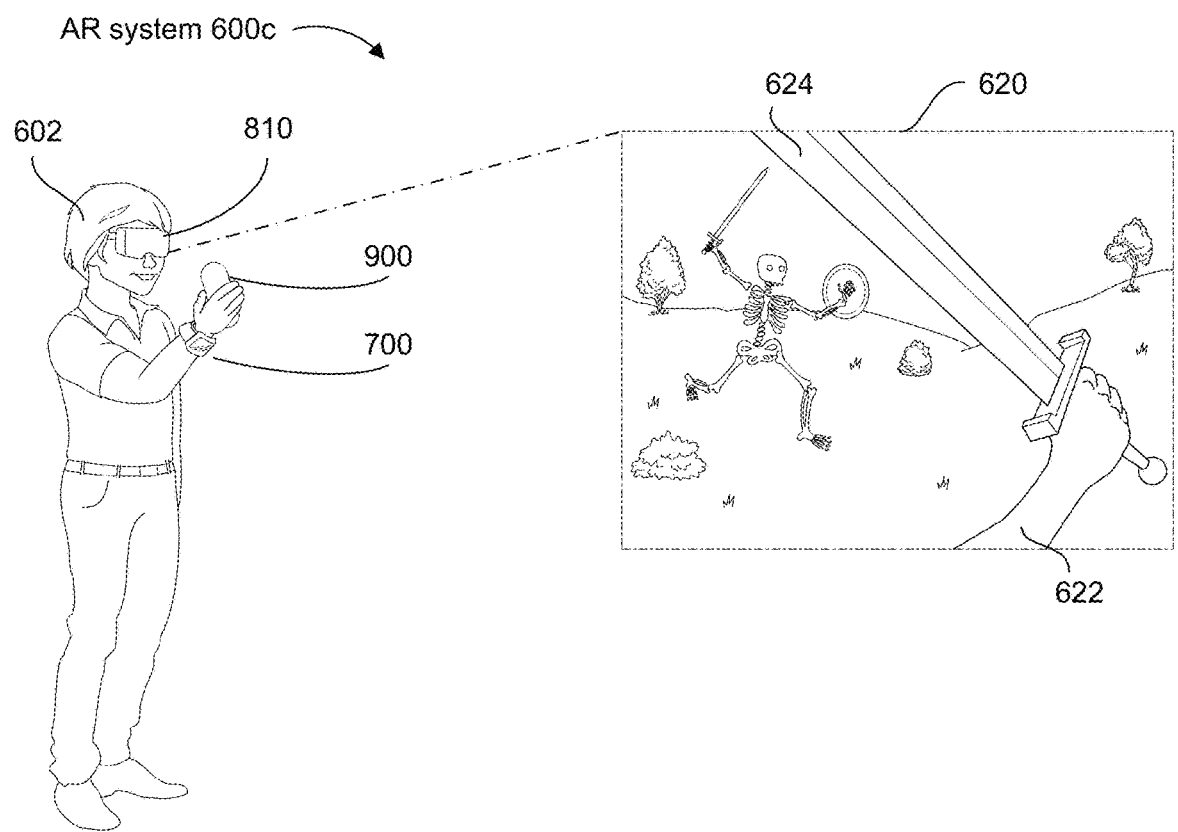
Figures 2, 4C:
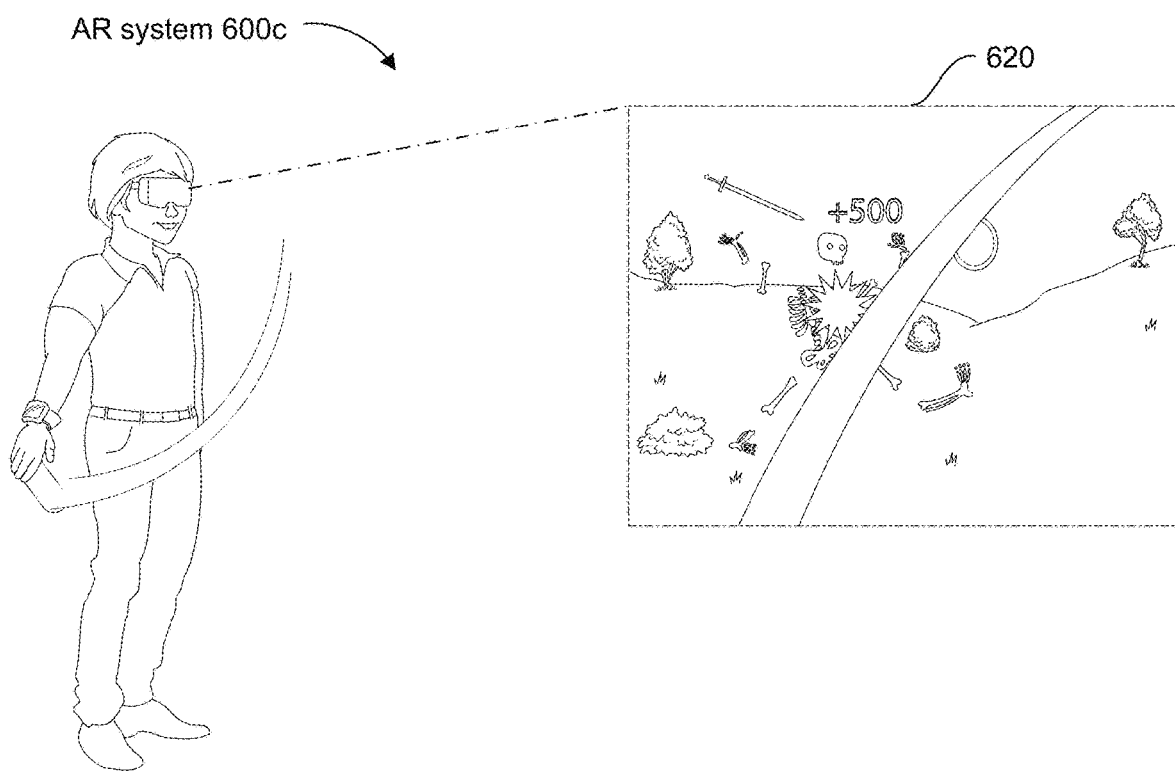
Figures 1, 4D:
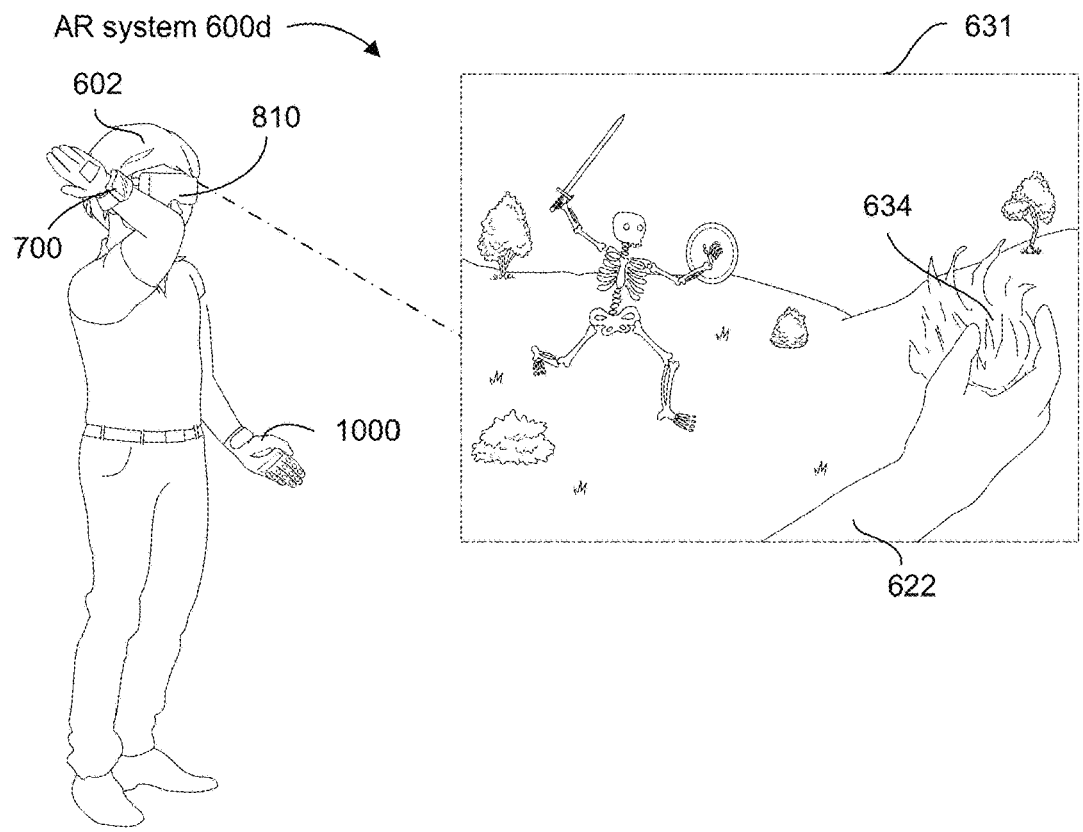
Figures 2, 4D:
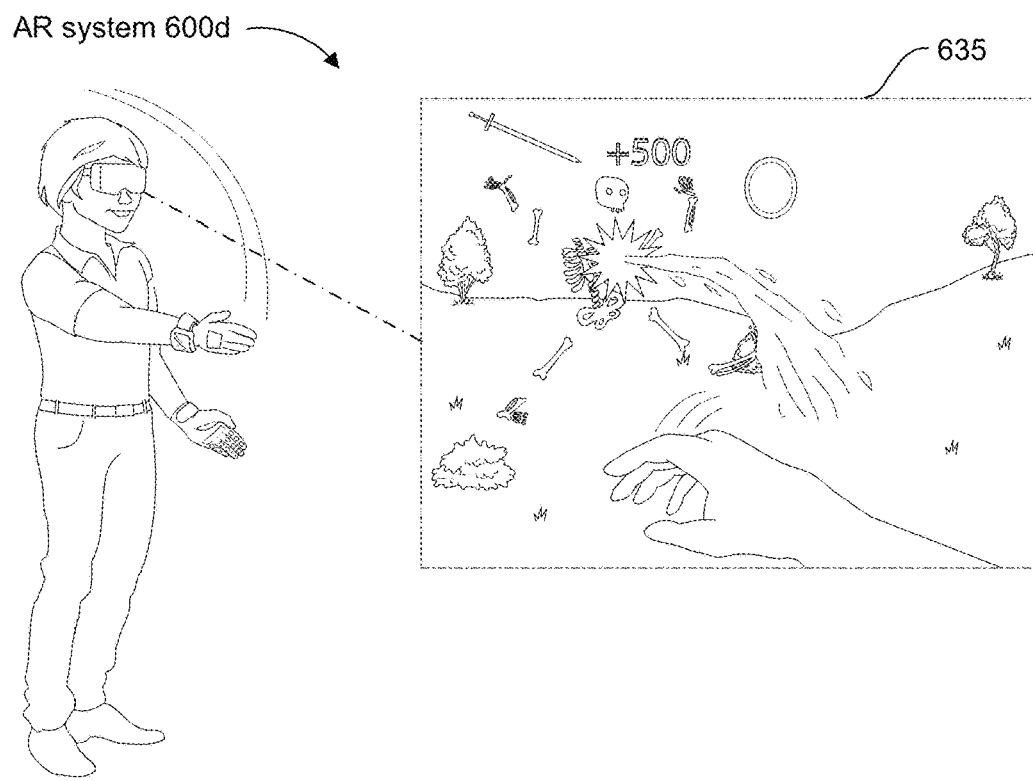

FIGS. 4A-4D illustrate example AR systems in accordance with some embodiments. FIG. 4A shows an AR system 600a and first example user interactions using a wrist-wearable device 700, a head-wearable device (e.g., AR system 800), and/or a handheld intermediary processing device (HIPD) 900. FIG. 4B shows an AR system 600b and second example user interactions using the wrist-wearable device 700, the AR system 800, and/or an HIPD 900. FIGS. 4C-1 and 4C-2 show an AR system 600c and third example user interactions using a wrist-wearable device 700, a head-wearable device (e.g., VR headset 810), and/or an HIPD 900. FIGS. 4D-1 and 4D-2 show a fourth AR system 600d and fourth example user interactions using a wrist-wearable device 700, VR headset 810, and/or device 1000 (e.g., wearable haptic gloves). The above-example AR systems (described in detail below) can include the various components and/or circuits described above and/or perform the various functions and/or operations described above with reference to FIGS. 1-3.

The wrist-wearable device 700 and its components are described below in reference to FIGS. 5A-5B; the head-wearable devices and their components are described below in reference to FIGS. 6A-6C; and the HIPD 900 and its components are described below in reference to FIGS. 7A-7B. Wearable gloves and their components are described below in reference to FIGS. 8A-8C. As shown in FIG. 4A, the wrist-wearable device 700, the head-wearable devices, and/or the HIPD 900 can communicatively couple via a network 625 (e.g., cellular, near field, Wi-Fi, personal area network, or wireless LAN). Additionally, the wrist-wearable device 700, the head-wearable devices, and/or the HIPD 900 can also communicatively couple with one or more servers 630, computers 640 (e.g., laptops, computers, etc.), mobile devices 651 (e.g., smartphones, tablets, etc.), and/or other electronic devices via the network 625 (e.g., cellular, near field, Wi-Fi, personal area network, and/or wireless local area network (LAN)) Similarly, the device 1000 can also communicatively couple with the wrist-wearable device 700, the head-wearable devices, the HIPD 900, the one or more servers 630, the computers 640, the mobile devices 651, and/or other electronic devices via the network 625.

Turning to FIG. 4A, a user 602 is shown wearing the wrist-wearable device 700 and the AR system 800 and having the HIPD 900 on their desk. The wrist-wearable device 700, the AR system 800, and the HIPD 900 facilitate user interaction with an AR environment. In particular, as shown by the AR system 600*a*, the wrist-wearable device 700, the AR system 800, and/or the HIPD 900 cause presentation of one or more avatars 604, digital representations of contacts 606, and virtual objects 608. As discussed below, the user 602 can interact with the one or more avatars 604, digital representations of the contacts 606, and virtual objects 608 via the wrist-wearable device 700, the AR system 800, and/or the HIPD 900.

The user 602 can use any of the wrist-wearable device 700, the AR system 800, and/or the HIPD 900 to provide user inputs. For example, the user 602 can perform one or more hand gestures that are detected by the wrist-wearable device 700 (e.g., using one or more EMG sensors and/or IMUs, described below in reference to FIGS. 5A-5B) and/or AR system 800 (e.g., using one or more image sensors or cameras, described below in reference to FIGS. 6A-6B) to provide a user input. Alternatively, or additionally, the user 602 can provide a user input via one or more touch surfaces of the wrist-wearable device 700, the AR system 800, and/or the HIPD 900, and/or voice commands captured by a microphone of the wrist-wearable device 700, the AR system 800, and/or the HIPD 900. In some embodiments, the wrist-wearable device 700, the AR system 800, and/or the HIPD 900 include a digital assistant to help the user in providing a user input (e.g., completing a sequence of operations, suggesting different operations or commands, providing reminders, or confirming a command). In some embodiments, the user 602 provides a user input via one or more facial gestures and/or facial expressions. For example, cameras of the wrist-wearable device 700, the AR system 800, and/or the HIPD 900 can track the user 602's eyes for navigating a user interface.

The wrist-wearable device 700, the AR system 800, and/or the HIPD 900 can operate alone or in conjunction to allow the user 602 to interact with the AR environment. In some embodiments, the HIPD 900 is configured to operate as a central hub or control center for the wrist-wearable device 700, the AR system 800, and/or another communicatively coupled device. For example, the user 602 can provide an input to interact with the AR environment at any of the wrist-wearable device 700, the AR system 800, and/or the HIPD 900, and the HIPD 900 can identify one or more back-end and front-end tasks to cause the performance of the requested interaction and distribute instructions to cause the performance of the one or more back-end and front-end tasks at the wrist-wearable device 700, the AR system 800, and/or the HIPD 900. In some embodiments, a back-end task is a background processing task that is not perceptible by the user (e.g., rendering content, decompression, or compression), and a front-end task is a user-facing task that is perceptible to the user (e.g., presenting information to the user or providing feedback to the user). As described below in reference to FIGS. 7A-7B, the HIPD 900 can perform the back-end tasks and provide the wrist-wearable device 700 and/or the AR system 800 operational data corresponding to the performed back-end tasks such that the wrist-wearable device 700 and/or the AR system 800 can perform the front-end tasks. In this way, the HIPD 900, which can have more computational resources and greater thermal headroom than the wrist-wearable device 700 and/or the AR system 800, performs computationally intensive tasks and reduces the computer resource utilization and/or power usage of the wrist-wearable device 700 and/or the AR system 800.

In the example shown by the AR system 600*a*, the HIPD 900 identifies one or more back-end tasks and front-end tasks associated with a user request to initiate an AR video call with one or more other users (represented by the avatar 604 and the digital representation of the contact 606) and distributes instructions to cause the performance of the one or more back-end tasks and front-end tasks. In particular, the HIPD 900 performs back-end tasks for processing and/or rendering image data (and other data) associated with the AR video call and provides operational data associated with the performed back-end tasks to the AR system 800 such that the AR system 800 performs front-end tasks for presenting the AR video call (e.g., presenting the avatar 604 and the digital representation of the contact 606).

In some embodiments, the HIPD 900 operates as a focal or anchor point for causing the presentation of information. This allows the user 602 to be generally aware of where information is presented. For example, as shown in the AR system 600*a*, the avatar 604 and the digital representation of the contact 606 are presented above the HIPD 900. In particular, the HIPD 900 and the AR system 800 operate in conjunction to determine a location for presenting the avatar 604 and the digital representation of the contact 606. In some embodiments, information can be presented at a predetermined distance from the HIPD 900 (e.g., within 5 meters). For example, as shown in the AR system 600*a*, virtual object 608 is presented on the desk some distance from the HIPD 900. Similar to the above example, the HIPD 900 and the AR system 800 can operate in conjunction to determine a location for presenting the virtual object 608. Alternatively, in some embodiments, presentation of information is not bound by the HIPD 900. More specifically, the avatar 604, the digital representation of the contact 606, and the virtual object 608 do not have to be presented within a predetermined distance of the HIPD 900.

User inputs provided at the wrist-wearable device 700, the AR system 800, and/or the HIPD 900 are coordinated such that the user can use any device to initiate, continue, and/or complete an operation. For example, the user 602 can provide a user input to the AR system 800 to cause the AR system 800 to present the virtual object 608 and, while the virtual object 608 is presented by the AR system 800, the user 602 can provide one or more hand gestures via the wrist-wearable device 700 to interact with and/or manipulate the virtual object 608.

FIG. 4B shows the user 602 wearing the wrist-wearable device 700 and the AR system 800 and holding the HIPD 900. In the AR system 600*b*, the wrist-wearable device 700, the AR system 800, and/or the HIPD 900 are used to receive and/or provide one or more messages to a contact of the user 602. In particular, the wrist-wearable device 700, the AR system 800, and/or the HIPD 900 detect and coordinate one or more user inputs to initiate a messaging application and prepare a response to a received message via the messaging application.

In some embodiments, the user 602 initiates, via a user input, an application on the wrist-wearable device 700, the AR system 800, and/or the HIPD 900 that causes the application to initiate on at least one device. For example, in the AR system 600*b* the user 602 performs a hand gesture associated with a command for initiating a messaging application (represented by messaging user interface 612); the wrist-wearable device 700 detects the hand gesture; and, based on a determination that the user 602 is wearing AR system 800, causes the AR system 800 to present a messaging user interface 612 of the messaging application. The AR system 800 can present the messaging user interface 612 to the user 602 via its display (e.g., as shown by user 602's field of view 610). In some embodiments, the application is initiated and run on the device (e.g., the wrist-wearable device 700, the AR system 800, and/or the HIPD 900) that detects the user input to initiate the application, and the device provides another device operational data to cause the presentation of the messaging application. For example, the wrist-wearable device 700 can detect the user input to initiate a messaging application, initiate and run the messaging application, and provide operational data to the AR system 800 and/or the HIPD 900 to cause presentation of the messaging application. Alternatively, the application can be initiated and run at a device other than the device that detected the user input. For example, the wrist-wearable device 700 can detect the hand gesture associated with initiating the messaging application and cause the HIPD 900 to run the messaging application and coordinate the presentation of the messaging application.

Further, the user 602 can provide a user input provided at the wrist-wearable device 700, the AR system 800, and/or the HIPD 900 to continue and/or complete an operation initiated are at another device. For example, after initiating the messaging application via the wrist-wearable device 700 and while the AR system 800 present the messaging user interface 612, the user 602 can provide an input at the HIPD 900 to prepare a response (e.g., shown by the swipe gesture performed on the HIPD 900). The user 602's gestures performed on the HIPD 900 can be provided to and/or displayed on another device. For example, the user 602's swipe gestures performed on the HIPD 900 are displayed on a virtual keyboard of the messaging user interface 612 displayed by the AR system 800.

In some embodiments, the wrist-wearable device 700, the AR system 800, the HIPD 900, and/or other communicatively coupled device presents one or more notifications to the user 602. The notification can be an indication of a new message, an incoming call, an application update, or a status update. The user 602 can select the notification via the wrist-wearable device 700, the AR system 800, or the HIPD 900, and cause presentation of an application or operation associated with the notification on at least one device. For example, the user 602 can receive a notification that a message was received at the wrist-wearable device 700, the AR system 800, the HIPD 900, and/or other communicatively coupled device and provide a user input at the wrist-wearable device 700, the AR system 800, and/or the HIPD 900 to review the notification, and the device detecting the user input can cause an application associated with the notification to be initiated and/or presented at the wrist-wearable device 700, the AR system 800, and/or the HIPD 900.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, and financial applications. For example, the AR system 800 can present to the user 602 game application data and the HIPD 900 can use a controller to provide inputs to the game. Similarly, the user 602 can use the wrist-wearable device 700 to initiate a camera of the AR system 800, and the user can use the wrist-wearable device 700, the AR system 800, and/or the HIPD 900 to manipulate the image capture (e.g., zoom in or out, apply filters, etc.) and capture image data.

Having discussed example AR systems, devices for interacting with such AR systems, and other computing systems more generally, will now be discussed in greater detail below. Some definitions of devices and components that can be included in some or all of the example devices discussed below are defined here for ease of reference. A skilled artisan will appreciate that certain types of the components described below may be more suitable for a particular set of devices, and less suitable for a different set of devices. But subsequent reference to the components defined here should be considered to be encompassed by the definitions provided.

In some embodiments discussed below, example devices and systems, including electronic devices and systems, will be discussed. Such example devices and systems are not intended to be limiting, and one of skill in the art will understand that alternative devices and systems to the example devices and systems described herein may be used to perform the operations and construct the systems and devices that are described herein.

As described herein, an electronic device is a device that uses electrical energy to perform one or more functions. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

As described herein, a processor (e.g., a central processing unit (CPU)), is an electronic component that is responsible for executing instructions and controlling the operation of an electronic device (e.g., a computer). There are various types of processors that may be used interchangeably, or may be specifically required, by embodiments described herein. For example, a processor may be: (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing, and/or can be customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, memory refers to electronic components in a computer or electronic device that store data and instructions for the processor to access and manipulate. Examples of memory can include: (i) random access memory (RAM) configured to store data and instructions temporarily; (ii) read-only memory (ROM) configured to store data and instructions permanently (e.g., one or more portions of system firmware, and/or boot loaders); (iii) flash memory, which can be configured to store data in electronic devices (e.g., universal serial bus (USB) drives, memory cards, and/or solid-state drives (SSDs); and (iv) cache memory configured to temporarily store frequently accessed data and instructions. Memory, as described herein, can include structured data (e.g., SQL databases, MongoDB databases, GraphQL data, and/or JSON data). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, controllers are electronic components that manage and coordinate the operation of other components within an electronic device (e.g., controlling inputs, processing data, and/or generating outputs). Examples of controllers can include: (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs.

As described herein, a power system of an electronic device is configured to convert incoming electrical power into a form that can be used to operate the device. A power system can include various components, including: (i) a power source, which can be an alternating current (AC) adapter or a direct current (DC) adapter power supply; (ii) a charger input, and can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and to ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals, and can provide a means for input and output of data and signals. Examples of peripheral interfaces can include: (i) USB and/or micro-USB interfaces configured for connecting devices to an electronic device; (ii) Bluetooth interfaces configured to allow devices to communicate with each other, including Bluetooth low energy (BLE); (iii) near field communication (NFC) interfaces configured to be short-range wireless interfaces for operations such as access control; (iv) POGO pins, which may be small, spring-loaded pins configured to provide a charging interface; (v) wireless charging interfaces; (vi) global positioning system (GPS) interfaces; (vii) Wi-Fi interfaces for providing a connection between a device and a wireless network; (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include: (i) imaging sensors for collecting imaging data (e.g., including one or more cameras disposed on a respective electronic device); (ii) biopotential-signal sensors; (iii) IMUs for detecting, for example, angular rate, force, magnetic field, and/or changes in acceleration; (iv) heart-rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface); and light sensors (e.g., time-of-flight sensors, infrared light sensors, visible light sensors, etc.). As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiogramhy (ECG or EKG) sensors configured to measure electrical activity of the heart to diagnose heart problems; (iii) EMG sensors configured to measure the electrical activity of muscles and to diagnose neuromuscular disorders; (iv) electrooculography (EOG) sensors configured to measure the electrical activity of eye muscles to detect eye movement and diagnose eye disorders.

As described herein, an application stored in the memory of an electronic device (e.g., software) includes instructions stored in the memory. Examples of such applications include: (i) games; (ii) word processors; messaging applications; media-streaming applications; financial applications; calendars; clocks; communication interface modules for enabling wired and/or wireless connections between different respective electronic devices (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocols.

As described herein, a communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, Bluetooth). In some embodiments, a communication interface can refer to a software layer that enables different software programs to communicate with each other (e.g., application programming interfaces (APIs) and/or protocols like HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Turning to FIGS. 4C-1 and 4C-2, the user 602 is shown wearing the wrist-wearable device 700 and the VR device 810, and holding the HIPD 900. In the third AR system 600c, the wrist-wearable device 700, the VR device 810, and/or the HIPD 900 are used to interact within an AR environment, such as a VR game or other AR application. While the VR device 810 presents a representation of a VR game (e.g., first AR game environment 620) to the user 602, the wrist-wearable device 700, the VR device 810, and/or the HIPD 900 detect and coordinate one or more user inputs to allow the user 602 to interact with the VR game.

In some embodiments, the user 602 provides a user input via the wrist-wearable device 700, the VR device 810, and/or the HIPD 900 that causes an action in a corresponding AR environment. For example, the user 602 in the third AR system 600c (shown in FIG. 4C-1) raises the HIPD 900 to prepare for a swing in the first AR game environment 620. The VR device 810, responsive to the user 602 raising the HIPD 900, causes the AR representation of the user 622 to perform a similar action (e.g., raise a virtual object, such as a virtual sword 624). In some embodiments, each device uses respective sensor data and/or image data to detect the user input and provide an accurate representation of the user 602's motion. For example, imaging sensors 826 (e.g., SLAM cameras or other cameras discussed below in FIGS. 6A and 6B) of the HIPD 900 can be used to detect a position of the HIPD 900 relative to the user 602's body such that the virtual object can be positioned appropriately within the first AR game environment 620; sensor data from the wrist-wearable device 700 can be used to detect a velocity at which the user 602 raises the HIPD 900 such that the AR representation of the user 622 and the virtual sword 624 are synchronized with the user 602's movements; and image sensors 826 of the VR device 810 can be used to represent the user 602's body, boundary conditions, or real-world objects within the first AR game environment 620.

In FIG. 4C-2, the user 602 performs a downward swing while holding the HIPD 900. The user 602's downward swing is detected by the wrist-wearable device 700, the VR device 810, and/or the HIPD 900 and a corresponding action is performed in the first AR game environment 620. In some embodiments, the data captured by each device is used to improve the user's experience within the AR environment. For example, sensor data of the wrist-wearable device 700 can be used to determine a speed and/or force at which the downward swing is performed and image sensors of the HIPD 900 and/or the VR device 810 can be used to determine a location of the swing and how it should be represented in the first AR game environment 620, which, in turn, can be used as inputs for the AR environment (e.g., game mechanics, which can use detected speed, force, locations, and/or aspects of the user 602's actions to classify a user's inputs (e.g., user performs a light strike, hard strike, critical strike, glancing strike, miss) or calculate an output (e.g., amount of damage)).

While the wrist-wearable device 700, the VR device 810, and/or the HIPD 900 are described as detecting user inputs, in some embodiments, user inputs are detected at a single device (with the single device being responsible for distributing signals to the other devices for performing the user input). For example, the HIPD 900 can operate an application for generating the first AR game environment 620 and provide the VR device 810 with corresponding data for causing the presentation of the first AR game environment 620, as well as detect the user 602's movements (while holding the HIPD 900) to cause the performance of corresponding actions within the first AR game environment 620. Additionally, or alternatively, in some embodiments, operational data (e.g., sensor data, image data, application data, device data, and/or other data) of one or more devices is provided to a single device (e.g., the HIPD 900) to process the operational data and cause respective devices to perform an action associated with processed operational data.

In FIGS. 4D-1 and 4D-2, the user 602 is shown wearing the wrist-wearable device 700, the VR device 810, and smart textile-based garments 1000. In the fourth AR system 600d, the wrist-wearable device 700, the VR device 810, and/or the smart textile-based garments 1000 are used to interact within an AR environment (e.g., any AR system described above, such as in reference to FIGS. 4A through 4C-2). While the VR device 810 presents a representation of a VR game (e.g., second AR game environment 631) to the user 602, the wrist-wearable device 700, the VR device 810, and/or the smart textile-based garments 1000 detect and coordinate one or more user inputs to allow the user 602 to interact with the AR environment.

In some embodiments, the user 602 provides a user input via the wrist-wearable device 700, the VR device 810, and/or the smart textile-based garments 1000 that causes an action in a corresponding AR environment. For example, the user 602 in the fourth AR system 600d (shown in FIG. 4D-1) raises a hand wearing the smart textile-based garments 1000 to prepare to cast a spell or throw an object within the second AR game environment 631. The VR device 810, responsive to the user 602 holding up their hand (wearing smart textile-based garments 1000), causes the AR representation of the user 622 to perform a similar action (e.g., hold a virtual object or throw a fireball 634). In some embodiments, each device uses respective sensor data and/or image data to detect the user input and provides an accurate representation of the user 602's motion.

In FIG. 4D-2, the user 602 performs a throwing motion while wearing the smart textile-based garment 1000. The user 602's throwing motion is detected by the wrist-wearable device 700, the VR device 810, and/or the smart textile-based garments 1000, and a corresponding action is performed in the second AR game environment 631. As described above, the data captured by each device is used to improve the user's experience within the AR environment. Although not shown, the smart textile-based garments 1000 can be used in conjunction with a VR device 810 and/or an HIPD 900.

Having discussed example AR systems, devices for interacting with such AR systems, and other computing systems more generally, devices and components will now be discussed in greater detail below. Some definitions of devices and components that can be included in some or all of the example devices discussed below are defined here for ease of reference. A skilled artisan will appreciate that certain types of the components described below may be more suitable for a particular set of devices and less suitable for another particular set of devices. But subsequent references to the components defined here should be considered to be encompassed by the definitions provided.

In some embodiments discussed below, example devices and systems, including electronic devices and systems, will be discussed. Such example devices and systems are not intended to be limiting, and one of skill in the art will understand that alternative devices and systems to the example devices and systems described herein may be used to perform the operations and construct the systems and devices that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices and/or a subset of components of one or more electronic devices, which facilitates communication, and/or data processing, and/or data transfer between the respective electronic devices and/or electronic components.

Example Wrist-Wearable Devices

FIGS. 5A and 5B illustrate the wrist-wearable device 700 in accordance with some embodiments. FIG. 5A illustrates components of the wrist-wearable device 700, which can be used individually or in combination, including combinations that include other electronic devices and/or electronic components.

FIG. 5A shows a wearable band 710 and a watch body 720 (or capsule) being coupled, as discussed below, to form the wrist-wearable device 700. The wrist-wearable device 700 can perform various functions and/or operations associated with navigating through user interfaces and selectively opening applications, as well as the functions and/or operations described above with reference to FIGS. 1-3.

As will be described in more detail below, operations executed by the wrist-wearable device 700 can include: (i) presenting content to a user (e.g., displaying visual content via a display 705); (ii) detecting (e.g., sensing) user input (e.g., sensing a touch on peripheral button 723 and/or at a touch screen of the display 705), a hand gesture detected by sensors (e.g., biopotential sensors); (iii) sensing biometric data via one or more sensors 713 (e.g., neuromuscular signals, heart rate, temperature, and/or sleep); messaging (e.g., text, speech, and/or video); image capture via one or more imaging devices or cameras 725; wireless communications (e.g., cellular, near field, Wi-Fi, and/or personal area network); location determination; financial transactions; providing haptic feedback; alarms; notifications; biometric authentication; health monitoring; sleep monitoring; etc.

The above-example functions can be executed independently in the watch body 720, independently in the wearable band 710, and/or via an electronic communication between the watch body 720 and the wearable band 710. In some embodiments, functions can be executed on the wrist-wearable device 700 while an AR environment is being presented (e.g., via one of the AR systems 600a to 600d). As the skilled artisan will appreciate upon reading the descriptions provided herein, the novel wearable devices described herein can be used with other types of AR environments.

The wearable band 710 can be configured to be worn by a user such that an inner surface of the wearable band 710 is in contact with the user's skin. When worn by a user, sensors 713 contact the user's skin. The sensors 713 can sense biometric data such as a user's heart rate, saturated oxygen level, temperature, sweat level, neuromuscular signal sensors, or a combination thereof. The sensors 713 can also sense data about a user's environment including a user's motion, altitude, location, orientation, gait, acceleration, position, or a combination thereof. In some embodiment, the sensors 713 are configured to track a position and/or motion of the wearable band 710. The one or more sensors 713 can include any of the sensors defined above and/or discussed below with respect to FIG. 5B.

The one or more sensors 713 can be distributed on an inside and/or an outside surface of the wearable band 710. In some embodiments, the one or more sensors 713 are uniformly spaced along the wearable band 710. Alternatively, in some embodiments, the one or more sensors 713 are positioned at distinct points along the wearable band 710. As shown in FIG. 5A, the one or more sensors 713 can be the same or distinct. For example, in some embodiments, the one or more sensors 713 (e.g., sensor 713a) can be shaped as a pill, an oval, a circle, a square, an oblong (e.g., sensor 713c) and/or any other shape that maintains contact with the user's skin (e.g., such that neuromuscular signal and/or other biometric data can be accurately measured at the user's skin). In some embodiments, the one or more sensors 713 are aligned to form pairs of sensors (e.g., for sensing neuromuscular signals based on differential sensing within each respective sensor). For example, sensor 713b is aligned with an adjacent sensor to form sensor pair 714a and sensor 713d is aligned with an adjacent sensor to form sensor pair 714b. In some embodiments, the wearable band 710 does not have a sensor pair. Alternatively, in some embodiments, the wearable band 710 has a predetermined number of sensor pairs (e.g., one pair of sensors, three pairs of sensors, four pairs of sensors, six pairs of sensors, or sixteen pairs of sensors).

The wearable band 710 can include any suitable number of sensors 713. In some embodiments, the number and arrangement of sensors 713 depend on the particular application for which the wearable band 710 is used. For instance, a wearable band 710 configured as an armband, wristband, or chestband may include a plurality of sensors 713 with a different number of sensors 713 and different arrangement for each use case, such as medical use cases as compared to gaming or general day-to-day use cases.

In accordance with some embodiments, the wearable band 710 further includes an electrical ground electrode and a shielding electrode. The electrical ground and shielding electrodes, like the sensors 713, can be distributed on the inside surface of the wearable band 710 such that they contact a portion of the user's skin. For example, the electrical ground and shielding electrodes can be at an inside surface of coupling mechanism 716 or an inside surface of a wearable structure 711. The electrical ground and shielding electrodes can be formed and/or use the same components as the sensors 713. In some embodiments, the wearable band 710 includes more than one electrical ground electrode and more than one shielding electrode.

The sensors 713 can be formed as part of the wearable structure 711 of the wearable band 710. In some embodiments, the sensors 713 are flush or substantially flush with the wearable structure 711 such that they do not extend beyond the surface of the wearable structure 711. While flush with the wearable structure 711, the sensors 713 are still configured to contact the user's skin (e.g., via a skin-contacting surface). Alternatively, in some embodiments, the sensors 713 extend beyond the wearable structure 711 at a predetermined distance (e.g., 0.1-2 mm) to make contact and depress into the user's skin. In some embodiments, the sensors 713 are coupled to an actuator (not shown) configured to adjust an extension height (e.g., a distance from the surface of the wearable structure 711) of the sensors 713 such that the sensors 713 make contact and depress into the user's skin. In some embodiments, the actuators adjust the extension height between 0.01 mm-1.2 mm. This allows the user to customize the positioning of the sensors 713 to improve the overall comfort of the wearable band 710 when worn while still allowing the sensors 713 to contact the user's skin. In some embodiments, the sensors 713 are indistinguishable from the wearable structure 711 when worn by the user.

The wearable structure 711 can be formed of an elastic material, elastomers, etc., configured to be stretched and fitted to be worn by the user. In some embodiments, the wearable structure 711 is a textile or woven fabric. As described above, the sensors 713 can be formed as part of a wearable structure 711. For example, the sensors 713 can be molded into the wearable structure 711 or be integrated into a woven fabric (e.g., the sensors 713 can be sewn into the fabric and mimic the pliability of fabric (e.g., the sensors 713 can be constructed from a series of woven strands of fabric)).

The wearable structure 711 can include flexible electronic connectors that interconnect the sensors 713, the electronic circuitry, and/or other electronic components (described below in reference to FIG. 5B) that are enclosed in the wearable band 710. In some embodiments, the flexible electronic connectors are configured to interconnect the sensors 713, the electronic circuitry, and/or other electronic components of the wearable band 710 with respective sensors and/or other electronic components of another electronic device (e.g., watch body 720). The flexible electronic connectors are configured to move with the wearable structure 711 such that the user adjustment to the wearable structure 711 (e.g., resizing, pulling, and/or folding) does not stress or strain the electrical coupling of components of the wearable band 710.

As described above, the wearable band 710 is configured to be worn by a user. In particular, the wearable band 710 can be shaped or otherwise manipulated to be worn by a user. For example, the wearable band 710 can be shaped to have a substantially circular shape such that it can be configured to be worn on the user's lower arm or wrist. Alternatively, the wearable band 710 can be shaped to be worn on another body part of the user, such as the user's upper arm (e.g., around a bicep), forearm, chest, or legs. The wearable band 710 can include a retaining mechanism 712 (e.g., a buckle or a hook-and-loop fastener) for securing the wearable band 710 to the user's wrist or other body part. While the wearable band 710 is worn by the user, the sensors 713 sense data (referred to as sensor data) from the user's skin. In particular, the sensors 713 of the wearable band 710 obtain (e.g., sense and record) neuromuscular signals.

The sensed data (e.g., sensed neuromuscular signals) can be used to detect and/or determine the user's intention to perform certain motor actions. In particular, the sensors 713 sense and record neuromuscular signals from the user as the user performs muscular activations (e.g., movements and/or gestures). The detected and/or determined motor actions (e.g., phalange (or digit) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 705 of the wrist-wearable device 700 and/or can be transmitted to a device responsible for rendering an artificial-reality environment (e.g., a head-mounted display) to perform an action in an associated artificial-reality environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifics the mapping of gestures to commands).

The sensor data sensed by the sensors 713 can be used to provide a user with an enhanced interaction with a physical object (e.g., devices communicatively coupled with the wearable band 710) and/or a virtual object in an artificial-reality application generated by an artificial-reality system (e.g., user interface objects presented on the display 705, or another computing device (e.g., a smartphone)).

In some embodiments, the wearable band 710 includes one or more haptic devices 746 (FIG. 5B, e.g., a vibratory haptic actuator) that are configured to provide haptic feedback (e.g., a cutaneous and/or kinesthetic sensation) to the user's skin. The sensors 713, and/or the haptic devices 746 can be configured to operate in conjunction with multiple applications including, without limitation, health monitoring, social media, games, and artificial reality (e.g., the applications associated with artificial reality).

The wearable band 710 can also include coupling mechanism 716 (e.g., a cradle or a shape of the coupling mechanism can correspond to shape of the watch body 720 of the wrist-wearable device 700) for detachably coupling a capsule (e.g., a computing unit) or watch body 720 (via a coupling surface of the watch body 720) to the wearable band 710. In particular, the coupling mechanism 716 can be configured to receive a coupling surface proximate to the bottom side of the watch body 720 (e.g., a side opposite to a front side of the watch body 720 where the display 705 is located), such that a user can push the watch body 720 downward into the coupling mechanism 716 to attach the watch body 720 to the coupling mechanism 716. In some embodiments, the coupling mechanism 716 is configured to receive a top side of the watch body 720 (e.g., a side proximate to the front side of the watch body 720 where the display 705 is located) that is pushed upward into the cradle, as opposed to being pushed downward into the coupling mechanism 716. In some embodiments, the coupling mechanism 716 is an integrated component of the wearable band 710 such that the wearable band 710 and the coupling mechanism 716 are a single unitary structure. In some embodiments, the coupling mechanism 716 is a type of frame or shell that allows the watch body 720 coupling surface to be retained within or on the wearable band 710 coupling mechanism 716 (e.g., a cradle, a tracker band, a support base, or a clasp).

The coupling mechanism 716 can allow for the watch body 720 to be detachably coupled to the wearable band 710 through a friction fit, magnetic coupling, a rotation-based connector, a shear-pin coupler, a retention spring, one or more magnets, a clip, a pin shaft, a hook-and-loop fastener, or a combination thereof. A user can perform any type of motion to couple the watch body 720 to the wearable band 710 and to decouple the watch body 720 from the wearable band 710. For example, a user can twist, slide, turn, push, pull, or rotate the watch body 720 relative to the wearable band 710, or a combination thereof, to attach the watch body 720 to the wearable band 710 and to detach the watch body 720 from the wearable band 710. Alternatively, as discussed below, in some embodiments, the watch body 720 can be decoupled from the wearable band 710 by actuation of the release mechanism 729.

The wearable band 710 can be coupled with a watch body 720 to increase the functionality of the wearable band 710 (e.g., converting the wearable band 710 into a wrist-wearable device 700, adding an additional computing unit and/or battery to increase computational resources and/or a battery life of the wearable band 710, adding additional sensors to improve sensed data, etc.). As described above, the wearable band 710 (and the coupling mechanism 716) is configured to operate independently (e.g., execute functions independently) from watch body 720. For example, the coupling mechanism 716 can include one or more sensors 713 that contact a user's skin when the wearable band 710 is worn by the user and provide sensor data for determining control commands.

A user can detach the watch body 720 (or capsule) from the wearable band 710 in order to reduce the encumbrance of the wrist-wearable device 700 to the user. For embodiments in which the watch body 720 is removable, the watch body 720 can be referred to as a removable structure, such that in these embodiments the wrist-wearable device 700 includes a wearable portion (e.g., the wearable band 710) and a removable structure (the watch body 720).

Turning to the watch body 720, the watch body 720 can have a substantially rectangular or circular shape. The watch body 720 is configured to be worn by the user on their wrist or on another body part. More specifically, the watch body 720 is sized to be easily carried by the user, attached on a portion of the user's clothing, and/or coupled to the wearable band 710 (forming the wrist-wearable device 700). As described above, the watch body 720 can have a shape corresponding to the coupling mechanism 716 of the wearable band 710. In some embodiments, the watch body 720 includes a single release mechanism 729 or multiple release mechanisms (e.g., two release mechanisms 729 positioned on opposing sides of the watch body 720, such as spring-loaded buttons) for decoupling the watch body 720 and the wearable band 710. The release mechanism 729 can include, without limitation, a button, a knob, a plunger, a handle, a lever, a fastener, a clasp, a dial, a latch, or a combination thereof.

A user can actuate the release mechanism 729 by pushing, turning, lifting, depressing, shifting, or performing other actions on the release mechanism 729. Actuation of the release mechanism 729 can release (e.g., decouple) the watch body 720 from the coupling mechanism 716 of the wearable band 710, allowing the user to use the watch body 720 independently from wearable band 710, and vice versa. For example, decoupling the watch body 720 from the wearable band 710 can allow the user to capture images using rear-facing camera 725B. Although the release mechanism 729 is shown positioned at a corner of watch body 720, the release mechanism 729 can be positioned anywhere on watch body 720 that is convenient for the user to actuate. In addition, in some embodiments, the wearable band 710 can also include a respective release mechanism for decoupling the watch body 720 from the coupling mechanism 716. In some embodiments, the release mechanism 729 is optional, and the watch body 720 can be decoupled from the coupling mechanism 716 as described above (e.g., via twisting or rotating).

The watch body 720 can include one or more peripheral buttons 723 and 727 for performing various operations at the watch body 720. For example, the peripheral buttons 723 and 727 can be used to turn on or wake (e.g., transition from a sleep state to an active state) the display 705, unlock the watch body 720, increase or decrease a volume, increase or decrease a brightness, interact with one or more applications, and/or interact with one or more user interfaces. Additionally, or alternatively, in some embodiments, the display 705 operates as a touch screen and allows the user to provide one or more inputs for interacting with the watch body 720.

In some embodiments, the watch body 720 includes one or more sensors 721. The sensors 721 of the watch body 720 can be the same or distinct from the sensors 713 of the wearable band 710. The sensors 721 of the watch body 720 can be distributed on an inside and/or an outside surface of the watch body 720. In some embodiments, the sensors 721 are configured to contact a user's skin when the watch body 720 is worn by the user. For example, the sensors 721 can be placed on the bottom side of the watch body 720, and the coupling mechanism 716 can be a cradle with an opening that allows the bottom side of the watch body 720 to directly contact the user's skin. Alternatively, in some embodiments, the watch body 720 does not include sensors that are configured to contact the user's skin (e.g., including sensors internal and/or external to the watch body 720 that are configured to sense data of the watch body 720 and the watch body 720's surrounding environment). In some embodiment, the sensors 713 are configured to track a position and/or motion of the watch body 720.

The watch body 720 and the wearable band 710 can share data using a wired communication method (e.g., a Universal Asynchronous Receiver/Transmitter (UART) or a USB transceiver) and/or a wireless communication method (e.g., near field communication or Bluetooth). For example, the watch body 720 and the wearable band 710 can share data sensed by the sensors 713 and 721, as well as application and device specific information (e.g., active and/or available applications), output devices (e.g., display and/or speakers), input devices (e.g., touch screen, microphone, and/or imaging sensors).

In some embodiments, the watch body 720 can include, without limitation, a front-facing camera 725A and/or a rear-facing camera 725B, sensors 721 (e.g., a biometric sensor, an IMU, a heart-rate sensor, a saturated oxygen sensor, a neuromuscular signal sensor, an altimeter sensor, a temperature sensor, a bioimpedance sensor, a pedometer sensor, an optical sensor (e.g., imaging sensor 763; FIG. 5B), a touch sensor, a sweat sensor, etc.). In some embodiments, the watch body 720 can include one or more haptic devices 776 (FIG. 5B; a vibratory haptic actuator) that is configured to provide haptic feedback (e.g., a cutaneous and/or kinesthetic sensation) to the user. The sensors 721 and/or the haptic device 776 can also be configured to operate in conjunction with multiple applications including, without limitation, health monitoring applications, social media applications, game applications, and artificial reality applications (e.g., the applications associated with artificial reality).

As described above, the watch body 720 and the wearable band 710, when coupled, can form the wrist-wearable device 700. When coupled, the watch body 720 and wearable band 710 operate as a single device to execute functions (operations, detections, and/or communications) described herein. In some embodiments, each device is provided with particular instructions for performing the one or more operations of the wrist-wearable device 700. For example, in accordance with a determination that the watch body 720 does not include neuromuscular signal sensors, the wearable band 710 can include alternative instructions for performing associated instructions (e.g., providing sensed neuromuscular signal data to the watch body 720 via a different electronic device). Operations of the wrist-wearable device 700 can be performed by the watch body 720 alone or in conjunction with the wearable band 710 (e.g., via respective processors and/or hardware components) and vice versa. In some embodiments, operations of the wrist-wearable device 700, the watch body 720, and/or the wearable band 710 can be performed in conjunction with one or more processors and/or hardware components of another communicatively coupled device (e.g., the HIPD 900; FIGS. 7A-7B).

As described below with reference to the block diagram of FIG. 5B, the wearable band 710 and/or the watch body 720 can each include independent resources required to independently execute functions. For example, the wearable band 710 and/or the watch body 720 can each include a power source (e.g., a battery), a memory, data storage, a processor (e.g., a central processing unit (CPU)), communications, a light source, and/or input/output devices.

FIG. 5B shows block diagrams of a computing system 730 corresponding to the wearable band 710, and a computing system 760 corresponding to the watch body 720, according to some embodiments. A computing system of the wrist-wearable device 700 includes a combination of components of the wearable band computing system 730 and the watch body computing system 760, in accordance with some embodiments.

The watch body 720 and/or the wearable band 710 can include one or more components shown in watch body computing system 760. In some embodiments, a single integrated circuit includes all or a substantial portion of the components of the watch body computing system 760. Alternatively, in some embodiments, components of the watch body computing system 760 are included in a plurality of integrated circuits that are communicatively coupled. In some embodiments, the watch body computing system 760 is configured to couple (e.g., via a wired or wireless connection) with the wearable band computing system 730, which allows the computing systems to share components, distribute tasks, and/or perform other operations described herein (individually or as a single device).

The watch body computing system 760 can include one or more processors 779, a controller 777, a peripherals interface 761, a power system 795, and memory (e.g., a memory 780), each of which is defined above and described in more detail below.

The power system 795 can include a charger input 796, a power-management integrated circuit (PMIC) 797, and a battery 798, each are which is defined above. In some embodiments, a watch body 720 and a wearable band 710 can have respective batteries (e.g., battery 798 and 759) and can share power with each other. The watch body 720 and the wearable band 710 can receive a charge using a variety of techniques. In some embodiments, the watch body 720 and the wearable band 710 can use a wired charging assembly (e.g., power cords) to receive the charge. Alternatively, or in addition, the watch body 720 and/or the wearable band 710 can be configured for wireless charging. For example, a portable charging device can be designed to mate with a portion of watch body 720 and/or wearable band 710 and wirelessly deliver usable power to a battery of watch body 720 and/or wearable band 710. The watch body 720 and the wearable band 710 can have independent power systems (e.g., power systems 795 and 756) to enable each to operate independently. The watch body 720 and wearable band 710 can also share power (e.g., one can charge the other) via respective PMICs (e.g., PMICs 797 and 758) that can share power over power and ground conductors and/or over wireless charging antennas.

In some embodiments, the peripherals interface 761 can include one or more sensors 721, many of which listed below are defined above. The sensors 721 can include one or more coupling sensors 762 for detecting when the watch body 720 is coupled with another electronic device (e.g., a wearable band 710). The sensors 721 can include imaging sensors 763 (one or more of the cameras 725, and/or separate imaging sensors 763 (e.g., thermal-imaging sensors)). In some embodiments, the sensors 721 include one or more SpO2 sensors 764. In some embodiments, the sensors 721 include one or more biopotential-signal sensors (e.g., EMG sensors 765, which may be disposed on a user-facing portion of the watch body 720 and/or the wearable band 710). In some embodiments, the sensors 721 include one or more capacitive sensors 766. In some embodiments, the sensors 721 include one or more heart rate sensors 767. In some embodiments, the sensors 721 include one or more IMU sensors 768. In some embodiments, one or more IMU sensors 768 can be configured to detect movement of a user's hand or other location that the watch body 720 is placed or held.

In some embodiments, the peripherals interface 761 includes a near-field communication (NFC) component 769, a global-position system (GPS) component 770, a long-term evolution (LTE) component 771, and/or a Wi-Fi and/or Bluetooth communication component 772. In some embodiments, the peripherals interface 761 includes one or more buttons 773 (e.g., the peripheral buttons 723 and 727 in FIG. 5A), which, when selected by a user, cause operation to be performed at the watch body 720. In some embodiments, the peripherals interface 761 includes one or more indicators, such as a light emitting diode (LED), to provide a user with visual indicators (e.g., message received, low battery, active microphone and/or camera).

The watch body 720 can include at least one display 705, for displaying visual representations of information or data to the user, including user-interface elements and/or three-dimensional virtual objects. The display can also include a touch screen for inputting user inputs, such as touch gestures, swipe gestures, and the like. The watch body 720 can include at least one speaker 774 and at least one microphone 775 for providing audio signals to the user and receiving audio input from the user. The user can provide user inputs through the microphone 775 and can also receive audio output from the speaker 774 as part of a haptic event provided by the haptic controller 778. The watch body 720 can include at least one camera 725, including a front camera 725A and a rear camera 725B. The cameras 725 can include ultra-wide-angle cameras, wide-angle cameras, fisheye cameras, spherical cameras, telephoto cameras, a depth-sensing cameras, or other types of cameras.

The watch body computing system 760 can include one or more haptic controllers 777 and associated componentry (e.g., haptic devices 776) for providing haptic events at the watch body 720 (e.g., a vibrating sensation or audio output in response to an event at the watch body 720). The haptic controllers 778 can communicate with one or more haptic devices 776, such as electroacoustic devices, including a speaker of the one or more speakers 774 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 778 can provide haptic events to that are capable of being sensed by a user of the watch body 720. In some embodiments, the one or more haptic controllers 778 can receive input signals from an application of the applications 782.

In some embodiments, the computer system 730 and/or the computing system 760 can include memory 780, which can be controlled by a memory controller of the one or more controllers 777. In some embodiments, software components stored in the memory 780 include one or more applications 782 configured to perform operations at the watch body 720. In some embodiments, the one or more applications 782 include games, word processors, messaging applications, calling applications, web browsers, social media applications, media streaming applications, financial applications, calendars, and/or clocks. In some embodiments, software components stored in the memory 780 include one or more communication interface modules 783 as defined above. In some embodiments, software components stored in the memory 780 include one or more graphics modules 784 for rendering, encoding, and/or decoding audio and/or visual data; and one or more data management modules 785 for collecting, organizing, and/or providing access to the data 787 stored in memory 780. In some embodiments, one or more of applications 782 and/or one or more modules can work in conjunction with one another to perform various tasks at the watch body 720. In some embodiments, the memory 780 includes a machine-learning module 7100. In some embodiments, the machine-learning module 7100 includes one or more models (e.g., language models). In some embodiments, the machine-learning (ML) module 7100 is configured for reinforcement learning. In some embodiments, the machine-learning module 7100 is configured to determine text suggestions (e.g., text corrections and/or text completions). In some embodiments, the machine-learning module 7100 is configured to estimate a cognitive load of a user (e.g., based on user attention (e.g., focus), user context information, and/or other information).

In some embodiments, software components stored in the memory 780 can include one or more operating systems 781 (e.g., a Linux-based operating system or an Android operating system). The memory 780 can also include data 787. The data 787 can include profile data 788A, sensor data 789A, media content data 790, and application data 791. In some embodiments, the data 787 includes machine-learning data (e.g., model states, model parameter values, model training data, and/or model validation data).

It should be appreciated that the watch body computing system 760 is an example of a computing system within the watch body 720, and that the watch body 720 can have more or fewer components than shown in the watch body computing system 760, combine two or more components, and/or have a different configuration and/or arrangement of the components. The various components shown in watch body computing system 760 are implemented in hardware, software, firmware, or a combination thereof, including one or more signal processing and/or application-specific integrated circuits.

Turning to the wearable band computing system 730, one or more components that can be included in the wearable band 710 are shown. The wearable band computing system 730 can include more or fewer components than shown in the watch body computing system 760, combine two or more components, and/or have a different configuration and/or arrangement of some or all of the components. In some embodiments, all, or a substantial portion of, the components of the wearable band computing system 730 are included in a single integrated circuit. Alternatively, in some embodiments, components of the wearable band computing system 730 are included in a plurality of integrated circuits that are communicatively coupled. As described above, in some embodiments, the wearable band computing system 730 is configured to couple (e.g., via a wired or wireless connection) with the watch body computing system 760, which allows the computing systems to share components, distribute tasks, and/or perform other operations described herein (individually or as a single device).

The wearable band computing system 730, similar to the watch body computing system 760, can include one or more processors 749; one or more controllers 747 (including one or more haptics controllers 748); a peripherals interface 731 that can include one or more sensors 713; and other peripheral devices, power source (e.g., a power system 756), and memory (e.g., a memory 750) that includes an operating system (e.g., an operating system 751), data (e.g., data 754 including profile data 788B and/or sensor data 789B), and one or more modules (e.g., a communications interface module 752 and/or a data management module 753). In some embodiments, the data 754 includes machine-learning data (e.g., model states, model parameter values, model training data, and/or model validation data).

The one or more sensors 713 can be analogous to sensors 721 of the computing system 760 and in light of the definitions above. For example, sensors 713 can include one or more coupling sensors 732, one or more SpO2 sensors 734, one or more EMG sensors 735, one or more capacitive sensors 736, one or more heart rate sensors 737, and one or more IMU sensors 738.

The peripherals interface 731 can also include other components analogous to those included in the peripheral interface 761 of the computing system 760, including an NFC component 739, a GPS component 740, an LTE component 741, a Wi-Fi and/or Bluetooth communication component 742, and/or one or more haptic devices 776 as described above in reference to peripherals interface 761. In some embodiments, the peripherals interface 761 includes one or more buttons 743, a display 733, a speaker 744, a microphone 745, and a camera 755. In some embodiments, the peripherals interface 761 includes one or more indicators such as an LED.

It should be appreciated that the wearable band computing system 730 is an example of a computing system within the wearable band 710, and that the wearable band 710 can have more or fewer components than shown in the wearable band computing system 730, combine two or more components, and/or have a different configuration and/or arrangement of the components. The various components shown in wearable band computing system 730 can be implemented in one or a combination of hardware, software, or firmware, including one or more signal processing and/or application-specific integrated circuits.

The wrist-wearable device 700 with respect to FIG. 5A is an example of the wearable band 710 and the watch body 720 coupled, so the wrist-wearable device 700 will be understood to include the components shown and described for the wearable band computing system 730 and the watch body computing system 760. In some embodiments, wrist-wearable device 700 has a split architecture (e.g., a split mechanical architecture, a split electrical architecture) between the watch body 720 and the wearable band 710. In other words, all of the components shown in the wearable band computing system 730 and the watch body computing system 760 can be housed or otherwise disposed in a combined watch device 700, or within individual components of the watch body 720, wearable band 710, and/or portions thereof (e.g., a coupling mechanism 716 of the wearable band 710).

The techniques described above can be used with any device for sensing neuromuscular signals, including the arm-wearable devices of FIGS. 5A-5B, but could also be used with other types of wearable devices for sensing neuromuscular signals (such as body-wearable or head-wearable devices that might have neuromuscular sensors closer to the brain or spinal column).

In some embodiments, a wrist-wearable device 700 can be used in conjunction with a head-wearable device described below (e.g., AR system 800 and VR headset 810) and/or an HIPD 900; and the wrist-wearable device 700 can also be configured to be used to allow a user to control an aspect of the artificial reality (e.g., by using EMG-based gestures to control user interface objects in the artificial reality and/or by allowing a user to interact with the touchscreen on the wrist-wearable device to also control aspects of the artificial reality). In some embodiments, a wrist-wearable device 700 can also be used in conjunction with a wearable garment, such as the wearable gloves described below in reference to FIGS. 8A-8C. Having thus described example wrist-wearable device, attention will now be turned to example head-wearable devices, such AR system 800 and VR headset 810.

Example Head-Wearable Devices

Figure 6A:
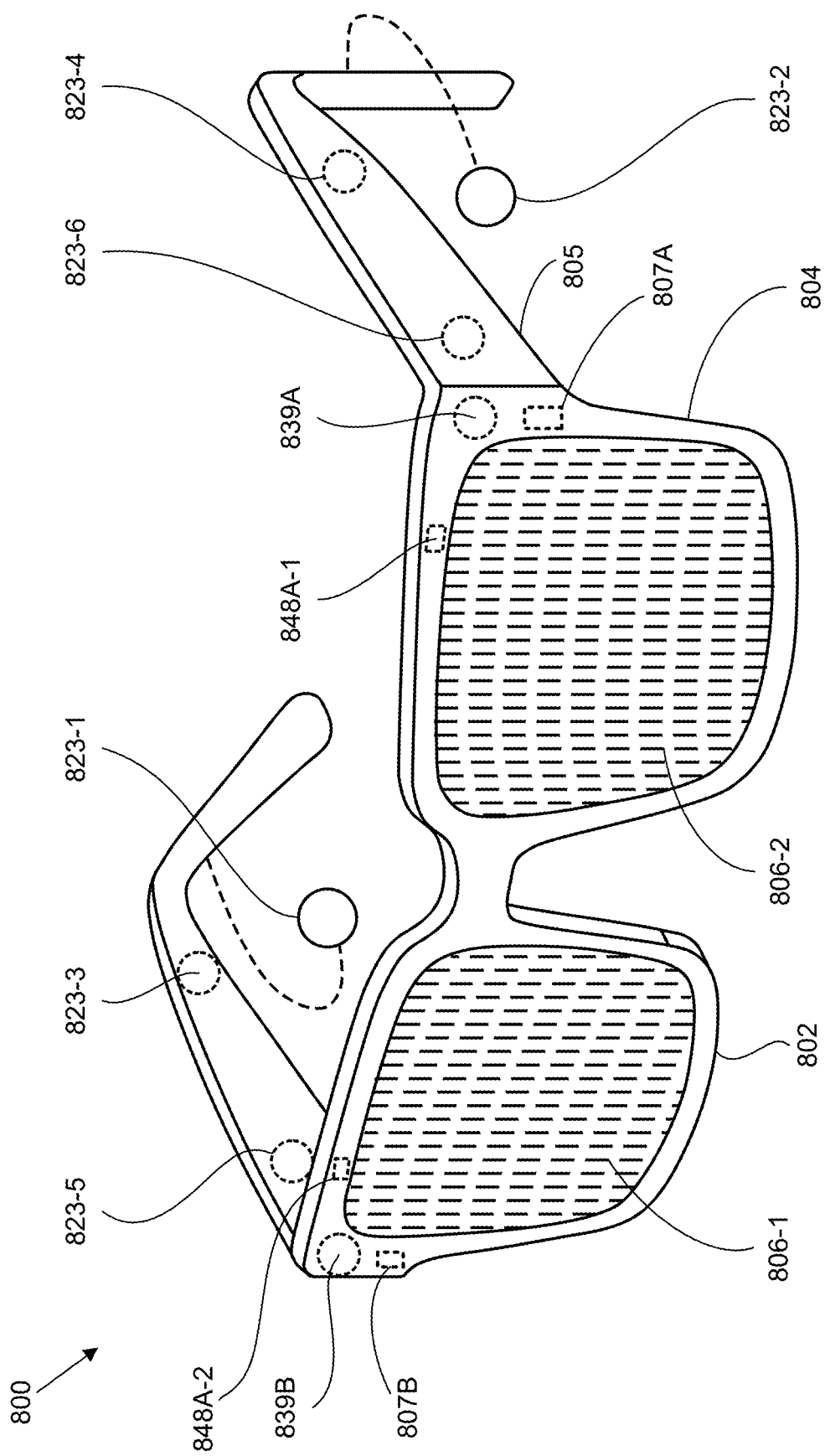
Figures 1, 6B:
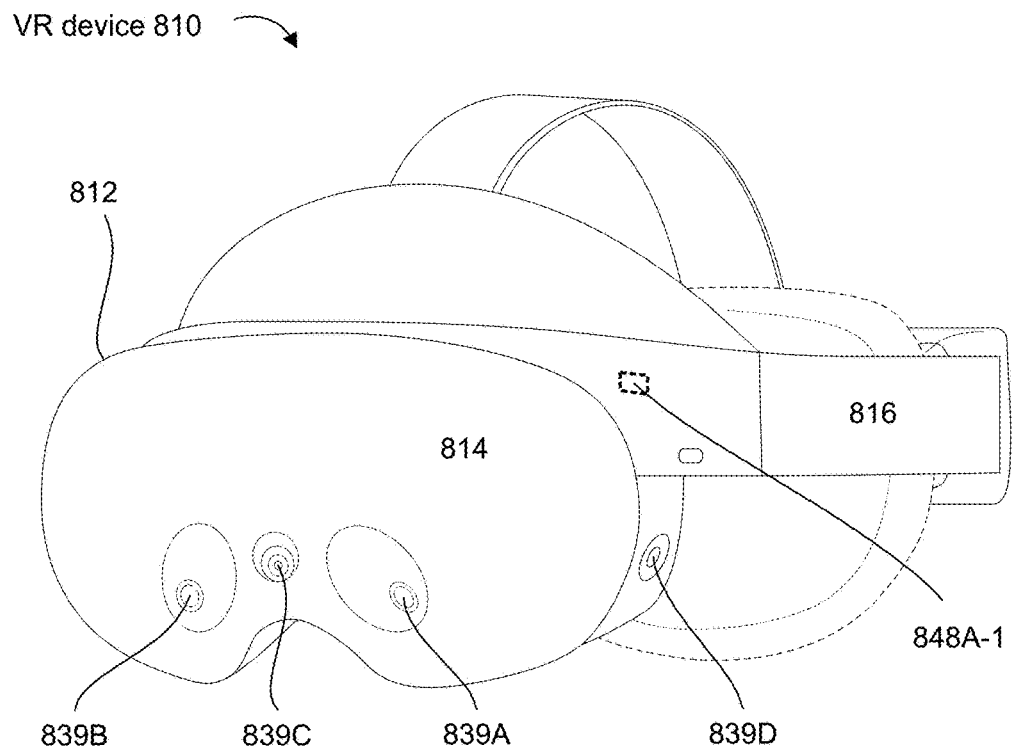
Figures 2, 6B:
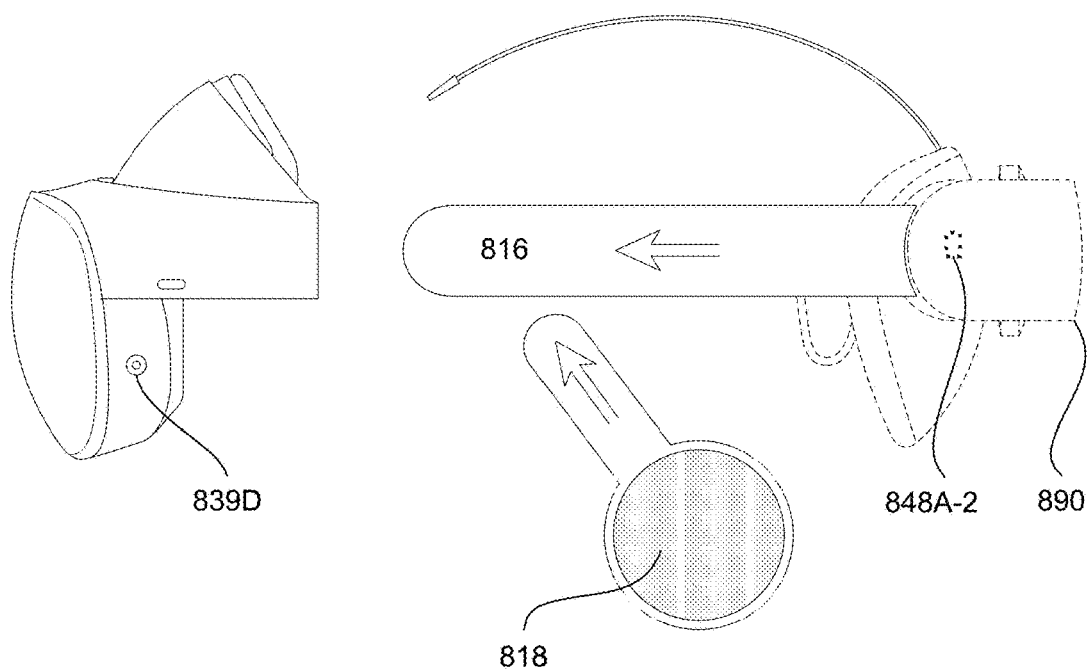
Figure 6C:
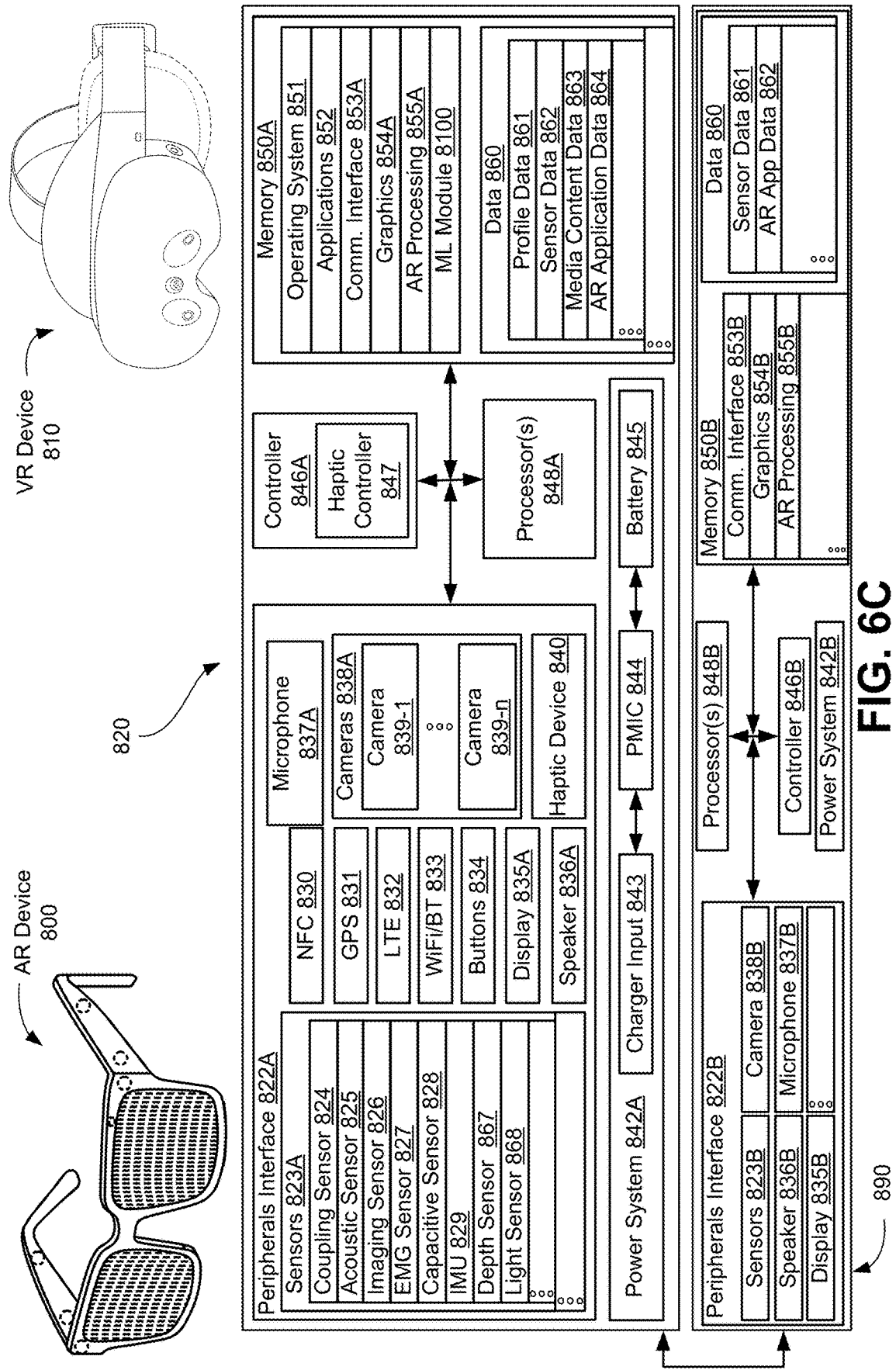

FIGS. 6A-6C show example artificial-reality systems, including the AR system 800. In some embodiments, the AR system 800 is an eyewear device as shown in FIG. 6A. In some embodiments, the VR system 810 includes a head-mounted display (HMD) 812, as shown in FIGS. 6B-1 and 6B-2. In some embodiments, the AR system 800 and the VR system 810 include one or more analogous components (e.g., components for presenting interactive artificial-reality environments, such as processors, memory, and/or presentation devices, including one or more displays and/or one or more waveguides), some of which are described in more detail with respect to FIG. 6C. As described herein, a head-wearable device can include components of the eyewear device 802, and/or the head-mounted display 812. Some embodiments of head-wearable devices do not include any displays, such as any of the displays described with respect to the AR system 800 and/or the VR system 810. While the example artificial-reality systems are respectively described herein as the AR system 800 and the VR system 810, either or both of the example AR systems described herein can be configured to present fully immersive VR scenes presented in substantially all of a user's field of view, additionally or alternatively to subtler augmented-reality scenes that are presented within a portion, less than all, of the user's field of view.

FIG. 6A shows an example visual depiction of the AR system 800 (which may also be described herein as augmented-reality glasses, and/or smart glasses). The AR system 800 can include additional electronic components that are not shown in FIG. 6A, such as a wearable accessory device and/or an intermediary processing device, in electronic communication or otherwise configured to be used in conjunction with the eyewear device. In some embodiments, the wearable accessory device and/or the intermediary processing device may be configured to couple with the eyewear device via a coupling mechanism in electronic communication with a coupling sensor 824, where the coupling sensor 824 can detect when an electronic device becomes physically or electronically coupled with the eyewear device. In some embodiments, the eyewear device is configured to couple to a housing 890, which may include one or more additional coupling mechanisms configured to couple with additional accessory devices. The components shown in FIG. 6A can be implemented in hardware, software, firmware, or a combination thereof, including one or more signal-processing components and/or application-specific integrated circuits (ASICs).

The eyewear device includes mechanical glasses components, including a frame 804 configured to hold one or more lenses (e.g., one or both lenses 806-1 and 806-2). One of ordinary skill in the art will appreciate that the eyewear device can include additional mechanical components, such as hinges configured to allow portions of the frame 804 of the eyewear device 802 to be folded and unfolded, a bridge configured to span the gap between the lenses 806-1 and 806-2 and rest on the user's nose, nose pads configured to rest on the bridge of the nose and provide support for the eyewear device, earpieces configured to rest on the user's ears and provide additional support for the eyewear device, temple arms configured to extend from the hinges to the earpieces of the eyewear device, and the like. One of ordinary skill in the art will further appreciate that some examples of the AR system 800 can include none of the mechanical components described herein. For example, smart contact lenses configured to present artificial reality to users may not include any components of the eyewear device.

The eyewear device includes electronic components, many of which will be described in more detail below with respect to FIG. 6C. Some example electronic components are illustrated in FIG. 6A, including sensors 825-1, 825-2, 825-3, 825-4, 825-5, and 825-6, which can be distributed along a substantial portion of the frame 804 of the eyewear device. The eyewear device also includes a left camera 839A and a right camera 839B, which are located on different sides of the frame 804. And the eyewear device includes a processor 848 (e.g., an integral microprocessor, such as an ASIC) that is embedded into a portion of the frame 804.

FIGS. 6B-1 and 6B-2 show a VR system 810 that includes a head-mounted display (HMD) 812 (e.g., also referred to herein as an artificial-reality headset, a head-wearable device, or a VR headset), in accordance with some embodiments. As noted, some artificial-reality systems may (e.g., the AR system 800), instead of blending an artificial reality with actual reality, substantially replace one or more of a user's sensory perceptions of the real world with a virtual experience (e.g., the AR systems 600c and 600d).

The HMD 812 includes a front body 814 and a frame 816 (e.g., a strap or band) shaped to fit around a user's head. In some embodiments, the front body 814 and/or the frame 816 includes one or more electronic elements for facilitating presentation of and/or interactions with an AR and/or VR system (e.g., displays, IMUs, tracking emitter or detectors). In some embodiments, the HMD 812 includes output audio transducers (e.g., an audio transducer 818-1), as shown in FIG. 6B-2. In some embodiments, one or more components, such as the output audio transducer(s) 818-1 and the frame 816, can be configured to attach and detach (e.g., are detachably attachable) to the HMD 812 (e.g., a portion or all of the frame 816, and/or the audio transducer 818-1), as shown in FIG. 6B-2. In some embodiments, coupling a detachable component to the HMD 812 causes the detachable component to come into electronic communication with the HMD 812.

FIGS. 6B-1 and 6B-2 also show that the VR system 810 has one or more cameras, such as the left camera 839A and the right camera 839B, which can be analogous to the left and right cameras on the frame 804 of the eyewear device 802. In some embodiments, the VR system 810 includes one or more additional cameras (e.g., cameras 839C and 839D), which can be configured to augment image data obtained by the cameras 839A and 839B by providing more information. For example, the camera 839C can be used to supply color information that is not discerned by cameras 839A and 839B. In some embodiments, one or more of the cameras 839A to 839D can include an optional infrared (IR) cut filter configured to remove IR light from being received at the respective camera sensors.

FIG. 6C illustrates a computing system 820 and an optional housing 890, each of which shows components that can be included in the AR system 800 and/or the VR system 810. In some embodiments, more or fewer components can be included in the optional housing 890 depending on practical restraints of the respective AR system being described.

In some embodiments, the computing system 820 and/or the optional housing 890 can include one or more peripheral interfaces 822, one or more power systems 842, one or more controllers 846 (including one or more haptic controllers 847), one or more processors 848 (as defined above, including any of the examples provided), and memory 850 (e.g., memory 850A and memory 850B), which can all be in electronic communication with each other. For example, the one or more processors 848 can be configured to execute instructions stored in the memory 850, which can cause a controller of the one or more controllers 846 to cause operations to be performed at one or more peripheral devices of the peripherals interface 822. In some embodiments, each operation described can occur based on electrical power provided by the power system 842.

In some embodiments, the peripherals interface 822 can include one or more devices configured to be part of the computing system 820, many of which have been defined above and/or described with respect to wrist-wearable devices shown in FIGS. 5A and 5B. For example, the peripherals interface can include one or more sensors 823. Some example sensors include: one or more coupling sensors 824, one or more acoustic sensors 825, one or more imaging sensors 826, one or more EMG sensors 827, one or more capacitive sensors 828, and/or one or more IMU sensors 829, and/or any other types of sensors defined above or described with respect to any other embodiments discussed herein.

In some embodiments, the peripherals interface can include one or more additional peripheral devices, including one or more NFC devices 830, one or more GPS devices 831, one or more LTE devices 832, one or more Wi-Fi and/or Bluetooth devices 833, one or more buttons 834 (e.g., including buttons that are slidable or otherwise adjustable), one or more displays 835, one or more speakers 836, one or more microphones 837, one or more cameras 838 (e.g., including the left camera 839A and/or a right camera 839B), and/or one or more haptic devices 840, and/or any other types of peripheral devices defined above or described with respect to any other embodiments discussed herein.

AR systems can include a variety of types of visual feedback mechanisms (e.g., presentation devices). For example, display devices in the AR system 800 and/or the VR system 810 can include one or more liquid-crystal displays (LCDs), LED displays, organic LED (OLED) displays, and/or any other suitable types of display screens. Artificial-reality systems can include a single display screen (e.g., configured to be seen by both eyes), and/or can provide separate display screens for each eye, which can allow for additional flexibility for varifocal adjustments and/or for correcting a refractive error associated with the user's vision. Some embodiments of AR systems also include optical subsystems having one or more lenses (e.g., conventional concave or convex lenses, Fresnel lenses, or adjustable liquid lenses) through which a user can view a display screen.

For example, respective displays can be coupled to each of the lenses 806-1 and 806-2 of the AR system 800. The displays coupled to each of the lenses 806-1 and 806-2 can act together or independently to present an image or series of images to a user. In some embodiments, the AR system 800 includes a single display (e.g., a near-eye display) or more than two displays. In some embodiments, a first set of one or more displays can be used to present an augmented-reality environment, and a second set of one or more display devices can be used to present a virtual-reality environment. In some embodiments, one or more waveguides are used in conjunction with presenting artificial-reality content to the user of the AR system 800 (e.g., as a means of delivering light from one or more displays to the user's eyes). In some embodiments, one or more waveguides are fully or partially integrated into the eyewear device 802. Additionally, or alternatively to display screens, some artificial-reality systems include one or more projection systems. For example, display devices in the AR system 800 and/or the virtual-reality system 810 can include micro-LED projectors that project light (e.g., using a waveguide) into display devices, such as clear combiner lenses that allow ambient light to pass through. The display devices can refract the projected light toward a user's pupil and can enable a user to simultaneously view both artificial-reality content and the real world. Artificial-reality systems can also be configured with any other suitable type or form of image projection system. In some embodiments, one or more waveguides are provided additionally or alternatively to the one or more display(s).

The computing system 820 and/or the optional housing 890 of the AR system 800 or the VR system 810 can include some or all of the components of a power system 842. The power system 842 can include one or more charger inputs 843, one or more PMICs 844, and/or one or more batteries 845.

The memory 850 includes instructions and data, some or all of which may be stored as non-transitory computer-readable storage media within the memory 850. For example, the memory 850 can include one or more operating systems 851, one or more applications 852, one or more communication interface applications 853, one or more graphics applications 854, one or more AR processing applications 855, and/or any other types of data defined above or described with respect to any other embodiments discussed herein. In some embodiments, the memory 850 (e.g., memory 850A) includes a machine-learning module 8100. In some embodiments, the machine-learning module 8100 includes one or more models (e.g., language models). In some embodiments, the machine-learning module 8100 is configured for reinforcement learning. In some embodiments, the machine-learning module 8100 is configured to determine text suggestions (e.g., text corrections and/or text completions). In some embodiments, the machine-learning module 8100 is configured to estimate a cognitive load of a user (e.g., based on user attention (e.g., focus), user context information, and/or other information).

The memory 850 also includes data 860 that can be used in conjunction with one or more of the applications discussed above. The data 860 can include: profile data 861, sensor data 862, media content data 863, AR application data 864, and/or any other types of data defined above or described with respect to any other embodiments discussed herein. In some embodiments, the data 860 includes machine-learning data (e.g., model states, model parameter values, model training data, and/or model validation data).

In some embodiments, the controller 846 of the eyewear device 802 processes information generated by the sensors 823 on the eyewear device 802 and/or another electronic device within the AR system 800. For example, the controller 846 can process information from the acoustic sensors 825-1 and 825-2. For each detected sound, the controller 846 can perform a direction-of-arrival (DOA) estimation to estimate a direction from which the detected sound arrived at the eyewear device 802 of the AR system 800. As one or more of the acoustic sensors 825 detects sounds, the controller 846 can populate an audio data set with the information (e.g., represented in FIG. 6C as sensor data 862).

In some embodiments, a physical electronic connector can convey information between the eyewear device and another electronic device, and/or between one or more processors of the AR system 800 or the VR system 810 and the controller 846. The information can be in the form of optical data, electrical data, wireless data, or any other transmittable data form. Moving the processing of information generated by the eyewear device to an intermediary processing device can reduce weight and heat in the eyewear device, making it more comfortable and safer for a user. In some embodiments, an optional wearable accessory device (e.g., an electronic neckband) is coupled to the eyewear device via one or more connectors. The connectors can be wired or wireless connectors and can include electrical and/or non-electrical (e.g., structural) components. In some embodiments, the eyewear device and the wearable accessory device can operate independently without any wired or wireless connection between them.

In some situations, pairing external devices, such as an intermediary processing device (e.g., the HIPD 900) with the eyewear device 802 (e.g., as part of the AR system 800), enables the eyewear device 802 to achieve a similar form factor of a pair of glasses while still providing sufficient battery and computation power for expanded capabilities. Some, or all, of the battery power, computational resources, and/or additional features of the AR system 800 can be provided by a paired device or shared between a paired device and the eyewear device 802, thus reducing the weight, heat profile, and form factor of the eyewear device 802 overall while allowing the eyewear device 802 to retain its desired functionality. For example, the wearable accessory device can allow components that would otherwise be included on an eyewear device 802 to be included in the wearable accessory device and/or intermediary processing device, thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on the eyewear device 802, standing alone. Because weight carried in the wearable accessory device can be less invasive to a user than weight carried in the eyewear device 802, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

AR systems can include various types of computer vision components and subsystems. For example, the AR system 800 and/or the VR system 810 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An AR system can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate digital twins (e.g., interactable virtual objects), among a variety of other functions. For example, FIGS. 6B-1 and 6B-2 show the VR system 810 having cameras 839A to 839D, which can be used to provide depth information for creating a voxel field and a two-dimensional mesh to provide object information to the user to avoid collisions.

In some embodiments, the AR system 800 and/or the VR system 810 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices (e.g., the haptic feedback system described with respect to FIGS. 8A to 8C).

In some embodiments of an AR system, such as the AR system 800 and/or the VR system 810, ambient light (e.g., a live feed of the surrounding environment that a user would normally see) can be passed through a display element of a respective head-wearable device presenting aspects of the AR system. In some embodiments, ambient light can be passed through a portion less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable device, and an amount of ambient light (e.g., 15%-50% of the ambient light) can be passed through the user interface element such that the user can distinguish at least a portion of the physical environment over which the user interface element is being displayed.

Example Handheld Intermediary Processing Devices

Figure 7A:
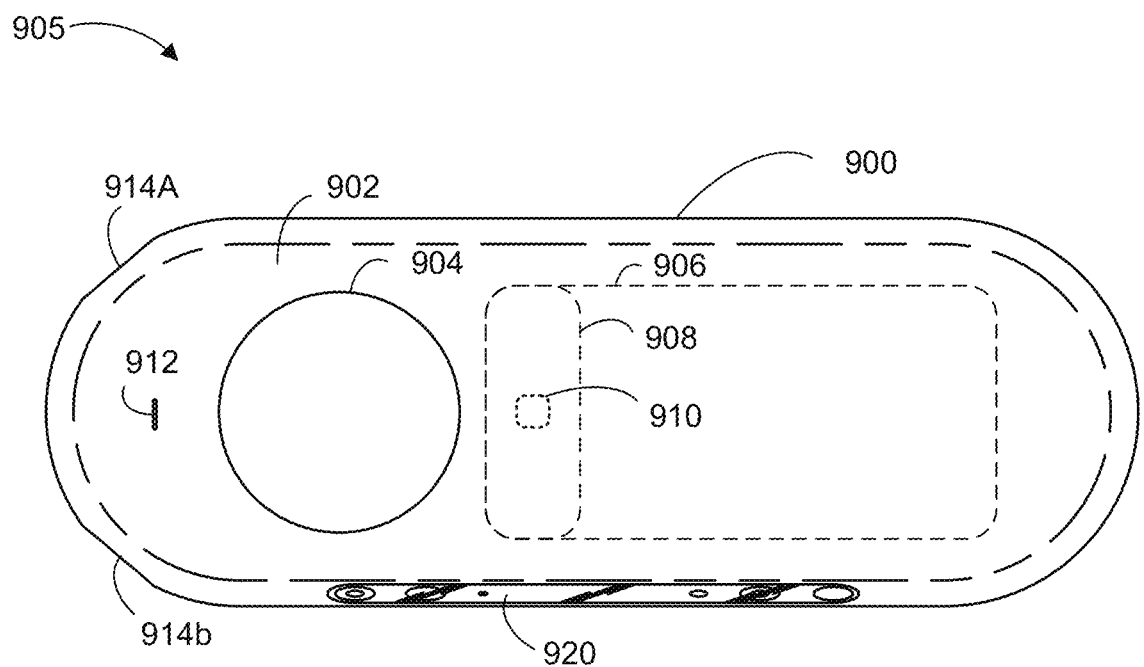
FIGS. 7A-7B illustrate an example handheld device in accordance with some embodiments.
Figure 7A:
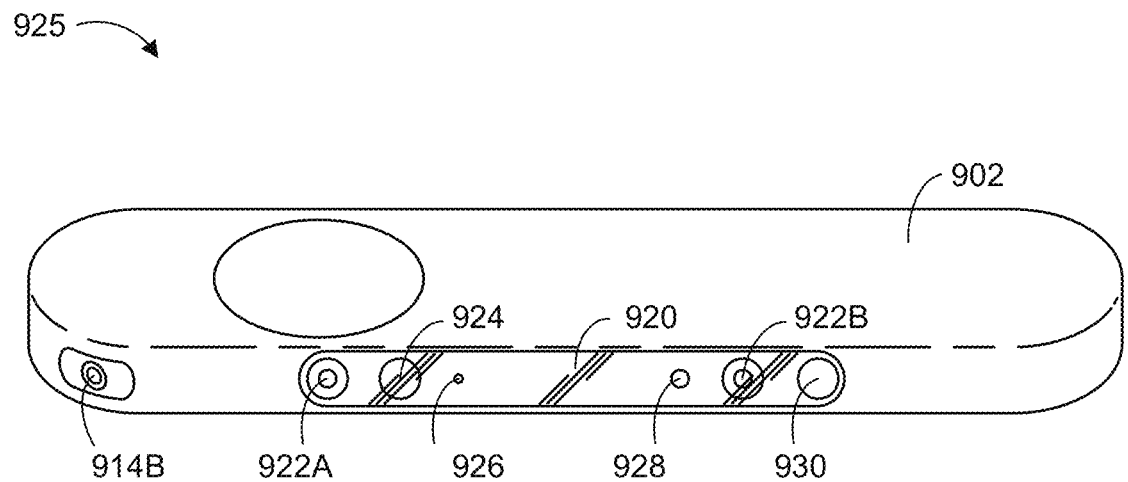
Figure 7B:
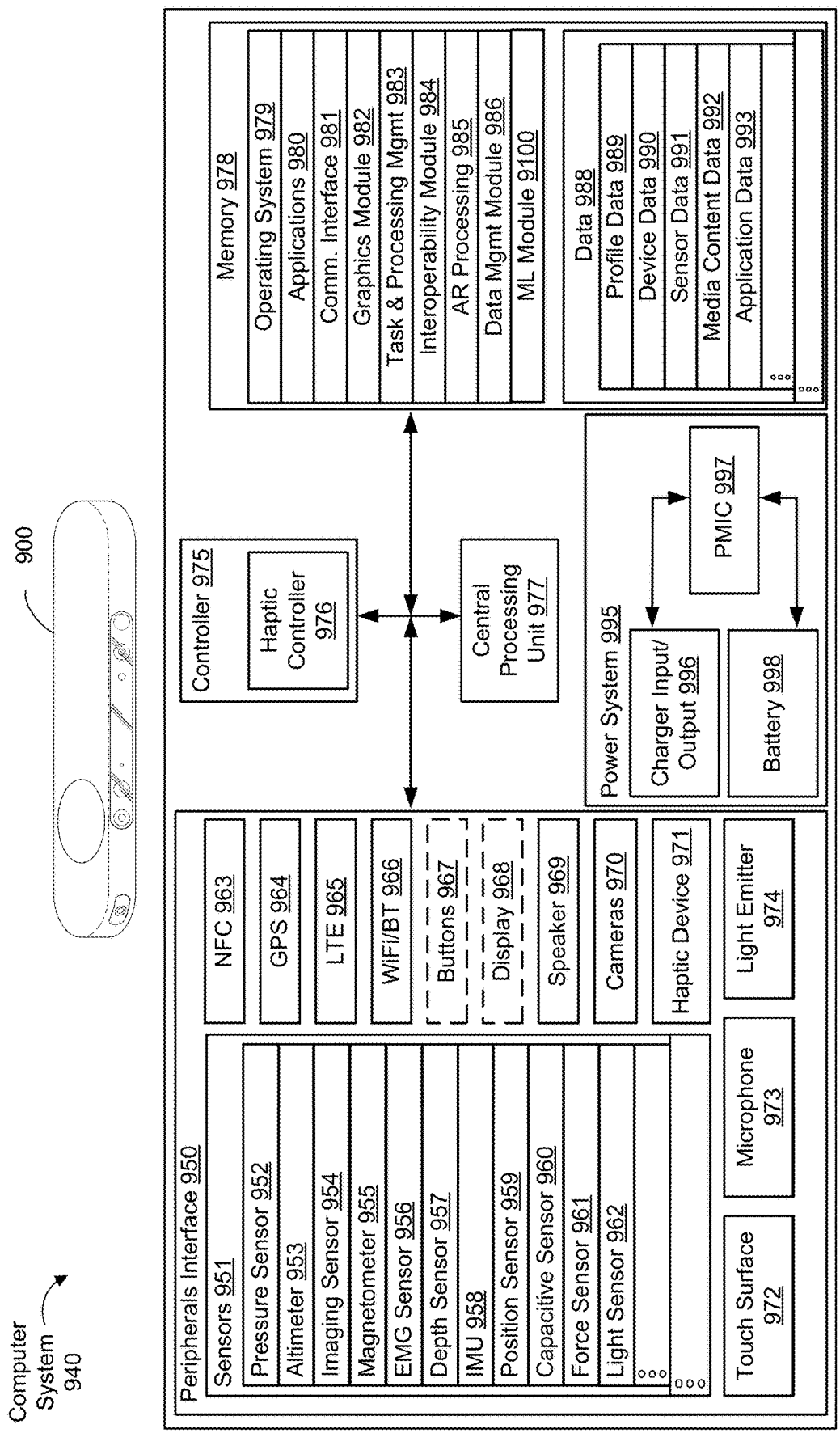

FIGS. 7A and 7B illustrate an example handheld intermediary processing device (HIPD) 900, in accordance with some embodiments. The HIPD 900 is an instance of the intermediary device described herein, such that the HIPD 900 should be understood to have the features described with respect to any intermediary device defined above or otherwise described herein, and vice versa. FIG. 7A shows a top view 905 and a side view 925 of the HIPD 900. The HIPD 900 is configured to communicatively couple with one or more wearable devices (or other electronic devices) associated with a user. For example, the HIPD 900 is configured to communicatively couple with a user's wrist-wearable device 700 (or components thereof, such as the watch body 720 and the wearable band 710), AR system 800, and/or VR headset 810. The HIPD 900 can be configured to be held by a user (e.g., as a handheld controller), carried on the user's person (e.g., in their pocket, in their bag, etc.), placed in proximity of the user (e.g., placed on their desk while seated at the desk, on a charging dock, etc.), and/or placed at or within a predetermined distance from a wearable device or other electronic device (e.g., where, in some embodiments, the predetermined distance is the maximum distance (e.g., 10 meters) at which the HIPD 900 can successfully be communicatively coupled with an electronic device, such as a wearable device).

The HIPD 900 can perform various functions independently and/or in conjunction with one or more wearable devices (e.g., wrist-wearable device 700, AR system 800, and/or VR headset 810). The HIPD 900 is configured to increase and/or improve the functionality of communicatively coupled devices, such as the wearable devices. The HIPD 900 is configured to perform one or more functions or operations associated with interacting with user interfaces and applications of communicatively coupled devices, interacting with an AR environment, interacting with VR environment, and/or operating as a human-machine interface controller. Additionally, as will be described in more detail below, functionality and/or operations of the HIPD 900 can include, without limitation, task offloading and/or handoffs; thermals offloading and/or handoffs; 6 degrees of freedom (6DoF) raycasting and/or gaming (e.g., using imaging devices or cameras 914, which can be used for simultaneous localization and mapping (SLAM) and/or with other image processing techniques); portable charging; messaging; image capturing via one or more imaging devices or cameras 922; sensing user input (e.g., sensing a touch on a touch input surface 902); wireless communications and/or interlining (e.g., cellular, near field, Wi-Fi, personal area network, etc.); location determination; financial transactions; providing haptic feedback; alarms; notifications; biometric authentication; health monitoring; sleep monitoring; etc. The above-example functions can be executed independently in the HIPD 900 and/or in communication between the HIPD 900 and another wearable device described herein. In some embodiments, functions can be executed on the HIPD 900 in conjunction with an AR environment. As the skilled artisan will appreciate upon reading the descriptions provided herein, the novel the HIPD 900 described herein can be used with any type of suitable AR environment.

While the HIPD 900 is communicatively coupled with a wearable device and/or other electronic device, the HIPD 900 is configured to perform one or more operations initiated at the wearable device and/or the other electronic device. In particular, one or more operations of the wearable device and/or the other electronic device can be offloaded to the HIPD 900 to be performed. The HIPD 900 performs the one or more operations of the wearable device and/or the other electronic device and provides to data corresponded to the completed operations to the wearable device and/or the other electronic device. For example, a user can initiate a video stream using AR system 800 and back-end tasks associated with performing the video stream (e.g., video rendering) can be offloaded to the HIPD 900, and the HIPD 900 performs those back-end tasks and provides corresponding data to the AR system 800 to perform remaining front-end tasks associated with the video stream (e.g., presenting the rendered video data via a display of the AR system 800). In this way, the HIPD 900, which has more computational resources and greater thermal headroom than a wearable device, can perform computationally intensive tasks for the wearable device to improve performance of an operation performed by the wearable device.

The HIPD 900 includes a multi-touch input surface 902 on a first side (e.g., a front surface) that is configured to detect one or more user inputs. In particular, the multi-touch input surface 902 can detect single-tap inputs, multi-tap inputs, swipe gestures and/or inputs, force-based and/or pressure-based touch inputs, held taps, and the like. The multi-touch input surface 902 is configured to detect capacitive touch inputs and/or force (and/or pressure) touch inputs. The multi-touch input surface 902 includes a touch-input surface 904 defined by a surface depression, and a touch-input surface 906 defined by a substantially planar portion. The touch-input surface 904 can be disposed adjacent to the touch-input surface 906. In some embodiments, the touch-input surface 904 and the touch-input surface 906 can be different dimensions or shapes, and/or cover different portions of the multi-touch input surface 902. For example, the touch-input surface 904 can be substantially circular and the touch-input surface 906 is substantially rectangular. In some embodiments, the surface depression of the multi-touch input surface 902 is configured to guide user handling of the HIPD 900. In particular, the surface depression is configured such that the user holds the HIPD 900 upright when held in a single hand (e.g., such that the using imaging devices or cameras 914A and 914B are pointed toward a ceiling or the sky). Additionally, the surface depression is configured such that the user's thumb rests within the touch-input surface 904.

In some embodiments, the different touch-input surfaces include a plurality of touch-input zones. For example, the touch-input surface 906 includes at least a touch-input zone 908 within a touch-input zone 906 and a touch-input zone 910 within the touch-input zone 908. In some embodiments, one or more of the touch-input zones are optional and/or user defined (e.g., a user can specify a touch-input zone based on their preferences). In some embodiments, each touch-input surface and/or touch-input zone is associated with a predetermined set of commands. For example, a user input detected within the touch-input zone 908 causes the HIPD 900 to perform a first command, and a user input detected within the touch-input zone 906 causes the HIPD 900 to perform a second command distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the touch-input zone 908 can be configured to detect force touch inputs (e.g., a magnitude at which the user presses down) and capacitive touch inputs, and the touch-input zone 906 can be configured to detect capacitive touch inputs.

The HIPD 900 includes one or more sensors 951 for sensing data used in the performance of one or more operations and/or functions. For example, the HIPD 900 can include an IMU sensor that is used in conjunction with cameras 914 for three-dimensional object manipulation (e.g., enlarging, moving, or destroying an object) in an AR or VR environment. Non-limiting examples of the sensors 951 included in the HIPD 900 include a light sensor, a magnetometer, a depth sensor, a pressure sensor, and a force sensor. Additional examples of the sensors 951 are provided below in reference to FIG. 7B.

The HIPD 900 can include one or more light indicators 912 to provide one or more notifications to the user. In some embodiments, the light indicators are LEDs or other types of illumination devices. The light indicators 912 can operate as a privacy light to notify the user and/or others near the user that an imaging device and/or microphone is active. In some embodiments, a light indicator is positioned adjacent to one or more touch-input surfaces. For example, a light indicator can be positioned around the touch-input surface 904. The light indicators can be illuminated in different colors and/or patterns to provide the user with one or more notifications and/or information about the device. For example, a light indicator positioned around the touch-input surface 904 can flash when the user receives a notification (e.g., a message), change red when the HIPD 900 is out of power, operate as a progress bar (e.g., a light ring that is closed when a task is completed (e.g., 0% to 100%)), and/or operates as a volume indicator, etc.

In some embodiments, the HIPD 900 includes one or more additional sensors on another surface. For example, as shown FIG. 7A, HIPD 900 includes a set of one or more sensors (e.g., sensor set 920) on an edge of the HIPD 900. The sensor set 920, when positioned on an edge of the of the HIPD 900, can be pre positioned at a predetermined tilt angle (e.g., 26 degrees) that allows the sensor set 920 to be angled toward the user when placed on a desk or other flat surface. Alternatively, in some embodiments, the sensor set 920 is positioned on a surface opposite the multi-touch input surface 902 (e.g., a back surface). The one or more sensors of the sensor set 920 are discussed in detail below.

The side view 925 of the of the HIPD 900 shows the sensor set 920 and camera 914B. The sensor set 920 includes one or more cameras 922A and 922B, a depth projector 924, an ambient light sensor 928, and a depth receiver 930. In some embodiments, the sensor set 920 includes a light indicator 926. The light indicator 926 can operate as a privacy indicator to let the user and/or those around the user know that a camera and/or microphone is active. The sensor set 920 is configured to capture a user's facial expression such that the user can puppet a custom avatar (e.g., showing emotions, such as smiles and/or laughter on the avatar or a digital representation of the user). The sensor set 920 can be configured as a side stereo RGB system, a rear indirect Time-of-Flight (iToF) system, or a rear stereo RGB system. As the skilled artisan will appreciate upon reading the descriptions provided herein, the HIPD 900 described herein can use different sensor set 920 configurations and/or sensor set 920 placements.

In some embodiments, the HIPD 900 includes one or more haptic devices 971 (e.g., a vibratory haptic actuator) that are configured to provide haptic feedback (e.g., kinesthetic sensation). The sensors 951, and/or the haptic devices 971, can be configured to operate in conjunction with multiple applications and/or communicatively coupled devices including, without limitation, wearable devices, health monitoring applications, social media applications, game applications, and artificial reality applications (e.g., the applications associated with artificial reality).

The HIPD 900 is configured to operate without a display. However, in optional embodiments, the HIPD 900 can include a display 968 (FIG. 7B). The HIPD 900 can also include one or more optional peripheral buttons 967 (FIG. 7B). For example, the peripheral buttons 967 can be used to turn on or turn off the HIPD 900. Further, the HIPD 900 housing can be formed of polymers and/or elastomer elastomers. The HIPD 900 can be configured to have a non-slip surface to allow the HIPD 900 to be placed on a surface without requiring a user to watch over the HIPD 900. In other words, the HIPD 900 is designed such that it would not easily slide off surfaces. In some embodiments, the HIPD 900 include one or more magnets to couple the HIPD 900 to another surface. This allows the user to mount the HIPD 900 to different surfaces and provide the user with greater flexibility in use of the HIPD 900.

As described above, the HIPD 900 can distribute and/or provide instructions for performing the one or more tasks at the HIPD 900 and/or a communicatively coupled device. For example, the HIPD 900 can identify one or more back-end tasks to be performed by the HIPD 900 and one or more front-end tasks to be performed by a communicatively coupled device. While the HIPD 900 is configured to offload and/or hand off tasks of a communicatively coupled device, the HIPD 900 can perform both back-end and front-end tasks (e.g., via one or more processors, such as CPU 977; FIG. 7B). The HIPD 900 can, without limitation, be used to perform augmented calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 900 can perform the above operations alone or in conjunction with a wearable device (or other communicatively coupled electronic device).

FIG. 7B shows block diagrams of a computing system 940 of the HIPD 900, in accordance with some embodiments. The HIPD 900, described in detail above, can include one or more components shown in HIPD computing system 940. The HIPD 900 will be understood to include the components shown and described below for the HIPD computing system 940. In some embodiments, all, or a substantial portion, of the components of the HIPD computing system 940 are included in a single integrated circuit. Alternatively, in some embodiments, components of the HIPD computing system 940 are included in a plurality of integrated circuits that are communicatively coupled.

The HIPD computing system 940 can include a processor (e.g., a CPU 977, a GPU, and/or a CPU with integrated graphics), a controller 975, a peripherals interface 950 that includes one or more sensors 951 and other peripheral devices, a power source (e.g., a power system 995), and memory (e.g., a memory 978) that includes an operating system (e.g., an operating system 979), data (e.g., data 988), one or more applications (e.g., applications 980), and one or more modules (e.g., a communications interface module 981, a graphics module 982, a task and processing management module 983, an interoperability module 984, an AR processing module 985, and/or a data management module 986). The HIPD computing system 940 further includes a power system 995 that includes a charger input and output 996, a PMIC 997, and a battery 998, all of which are defined above.

In some embodiments, the peripherals interface 950 can include one or more sensors 951. The sensors 951 can include analogous sensors to those described above in reference to FIG. 5B. For example, the sensors 951 can include imaging sensors 954, (optional) EMG sensors 956, IMU sensors 958, and capacitive sensors 960. In some embodiments, the sensors 951 can include one or more pressure sensors 952 for sensing pressure data, an altimeter 953 for sensing an altitude of the HIPD 900, a magnetometer 955 for sensing a magnetic field, a depth sensor 957 (or a time-of flight sensor) for determining a difference between the camera and the subject of an image, a position sensor 959 (e.g., a flexible position sensor) for sensing a relative displacement or position change of a portion of the HIPD 900, a force sensor 961 for sensing a force applied to a portion of the HIPD 900, and a light sensor 962 (e.g., an ambient light sensor) for detecting an amount of lighting. The sensors 951 can include one or more sensors not shown in FIG. 7B.

Analogous to the peripherals described above in reference to FIGS. 5B, the peripherals interface 950 can also include an NFC component 963, a GPS component 964, an LTE component 965, a Wi-Fi and/or Bluetooth communication component 966, a speaker 969, a haptic device 971, and a microphone 973. As described above in reference to FIG. 7A, the HIPD 900 can optionally include a display 968 and/or one or more buttons 967. The peripherals interface 950 can further include one or more cameras 970, touch surfaces 972, and/or one or more light emitters 974. The multi-touch input surface 902 described above in reference to FIG. 7A is an example of touch surface 972. The light emitters 974 can be one or more LEDs, lasers, etc., and can be used to project or present information to a user. For example, the light emitters 974 can include light indicators 912 and 926 described above in reference to FIG. 7A. The cameras 970 (e.g., cameras 914 and 922 described above in FIG. 7A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 970 can be used for SLAM; 6 DoF ray casting, gaming, object manipulation, and/or other rendering; and facial recognition and facial expression recognition, etc.

Similar to the watch body computing system 760 and the wearable band computing system 730 described above in reference to FIG. 5B, the HIPD computing system 940 can include one or more haptic controllers 976 and associated componentry (e.g., haptic devices 971) for providing haptic events at the HIPD 900.

Memory 978 can include high-speed, random-access memory and/or non-volatile memory, such as one or more magnetic disk storage devices, flash memory devices, or other non-volatile, solid-state memory devices. Access to the memory 978 by other components of the HIPD 900, such as the one or more processors and the peripherals interface 950, can be controlled by a memory controller of the controllers 975. In some embodiments, the memory 978 includes a machine-learning module 9100. In some embodiments, the machine-learning module 9100 includes one or more models (e.g., language models). In some embodiments, the machine-learning module 9100 is configured for reinforcement learning. In some embodiments, the machine-learning module 9100 is configured to determine text suggestions (e.g., text corrections and/or text completions). In some embodiments, the machine-learning module 9100 is configured to estimate a cognitive load of a user (e.g., based on user attention (e.g., focus), user context information, and/or other information).

In some embodiments, software components stored in the memory 978 include one or more operating systems 979, one or more applications 980, one or more communication interface modules 981, one or more graphics modules 982, one or more data management modules 986, which are analogous to the software components described above in reference to FIG. 5B.

In some embodiments, software components stored in the memory 978 include a task and processing management module 983 for identifying one or more front-end and back-end tasks associated with an operation performed by the user, performing one or more front-end and/or back-end tasks and/or providing instructions to one or more communicatively coupled devices that cause performance of the one or more front-end and/or back-end tasks. In some embodiments, the task and processing management module 983 uses data 988 (e.g., device data 990) to distribute the one or more front-end and/or back-end tasks based on communicatively coupled devices' computing resources, available power, thermal headroom, ongoing operations, and/or other factors. For example, the task and processing management module 983 can cause the performance of one or more back-end tasks (of an operation performed at communicatively coupled AR system 800) at the HIPD 900 in accordance with a determination that the operation is utilizing a predetermined amount (e.g., at least 70%) of computing resources available at the AR system 800.

In some embodiments, software components stored in the memory 978 include an interoperability module 984 for exchanging and utilizing information received and/or provided to distinct communicatively coupled devices. The interoperability module 984 allows for different systems, devices, and/or applications to connect and communicate in a coordinated way without user input. In some embodiments, software components stored in the memory 978 include an AR module 985 that is configured to process signals based at least on sensor data for use in an AR and/or VR environment. For example, the AR module 985 can be used for 3D object manipulation, gesture recognition, facial and facial expression, and/or recognition.

The memory 978 can also include data 988, including structured data. In some embodiments, the data 988 includes profile data 989, device data 990 (including device data of one or more devices communicatively coupled with the HIPD 900, such as device type, hardware, software, and/or configurations), sensor data 991, media content data 992, and application data 993. In some embodiments, the data 988 includes machine-learning data (e.g., model states, model parameter values, model training data, and/or model validation data).

It should be appreciated that the HIPD computing system 940 is an example of a computing system within the HIPD 900, and that the HIPD 900 can have more or fewer components than shown in the HIPD computing system 940, combine two or more components, and/or have a different configuration and/or arrangement of the components. The various components shown in HIPD computing system 940 are implemented in hardware, software, firmware, or a combination thereof, including one or more signal-processing and/or application-specific integrated circuits.

The techniques described above in FIG. 7A-7B can be used with any device used as a human-machine interface controller. In some embodiments, an HIPD 900 can be used in conjunction with one or more wearable devices such as a head-wearable device (e.g., AR system 800 and VR system 810) and/or a wrist-wearable device 700 (or components thereof). In some embodiments, an HIPD 900 is used in conjunction with a wearable garment, such as the wearable gloves of FIGS. 8A-8C. Having thus described example HIPD 900, attention will now be turned to example feedback devices such as device 1000.

Example Feedback Devices

FIGS. 8A and 8B show example haptic feedback systems (e.g., hand-wearable devices) for providing feedback to a user regarding the user's interactions with a computing system (e.g., an artificial-reality environment presented by the AR system 800 or the VR system 810). In some embodiments, a computing system (e.g., the AR system 600d) may also provide feedback to one or more users based on an action that was performed within the computing system and/or an interaction provided by the AR system (e.g., which may be based on instructions that are executed in conjunction with performing operations of an application of the computing system). Such feedback may include visual and/or audio feedback and may also include haptic feedback provided by a haptic assembly, such as one or more haptic assemblies 1062 of the device 1000 (e.g., haptic assemblies 1062-1, 1062-2, and 1062-3). For example, the haptic feedback may prevent (or, at a minimum, hinder/resist movement of) one or more fingers of a user from bending past a certain point to simulate the sensation of touching a solid coffee mug. In actuating such haptic effects, the device 1000 can change (either directly or indirectly) a pressurized state of one or more of the haptic assemblies 1062.

Each of the haptic assemblies 1062 includes a mechanism that, at a minimum, provides resistance when the respective haptic assembly 1062 is transitioned from a first pressurized state (e.g., atmospheric pressure or deflated) to a second pressurized state (e.g., inflated to a threshold pressure). Structures of haptic assemblies 1062 can be integrated into various devices configured to be in contact or proximity to a user's skin, including, but not limited to devices such as glove worn devices, body-worn clothing devices, and headset devices.

As noted above, the haptic assemblies 1062 described herein can be configured to transition between a first pressurized state and a second pressurized state to provide haptic feedback to the user. Due to the ever-changing nature of artificial reality, the haptic assemblies 1062 may be required to transition between the two states hundreds, or perhaps thousands, of times during a single use. Thus, the haptic assemblies 1062 described herein are durable and designed to quickly transition from state to state. To provide some context, in the first pressurized state, the haptic assemblies 1062 do not impede free movement of a portion of the wearer's body. For example, one or more haptic assemblies 1062 incorporated into a glove are made from flexible materials that do not impede free movement of the wearer's hand and fingers (e.g., an electrostatic-zipping actuator). The haptic assemblies 1062 are configured to conform to a shape of the portion of the wearer's body when in the first pressurized state. However, once in the second pressurized state, the haptic assemblies 1062 can be configured to restrict and/or impede free movement of the portion of the wearer's body (e.g., appendages of the user's hand). For example, the respective haptic assembly 1062 (or multiple respective haptic assemblies) can restrict movement of a wearer's finger (e.g., prevent the finger from curling or extending) when the haptic assembly 1062 is in the second pressurized state. Moreover, once in the second pressurized state, the haptic assemblies 1062 may take different shapes, with some haptic assemblies 1062 configured to take a planar, rigid shape (e.g., flat and rigid) while some other haptic assemblies 1062 are configured to curve or bend, at least partially.

As a non-limiting example, the device 1000 includes a plurality of haptic devices (e.g., a pair of haptic gloves, and a haptics component of a wrist-wearable device (e.g., any of the wrist-wearable devices described with respect to FIGS. 5A-5B. Each of them can include a garment component (e.g., a garment 1004) and one or more haptic assemblies coupled (e.g., physically coupled) to the garment component. For example, each of the haptic assemblies 1062-1, 1062-2, 1062-3, . . . 1062-N is physically coupled to the garment 1004 and configured to contact respective phalanges of a user's thumb and fingers. As explained above, the haptic assemblies 1062 are configured to provide haptic simulations to a wearer of the device 1000. The garment 1004 of each device 1000 can be one of various articles of clothing (e.g., gloves, socks, shirts, or pants). Thus, a user may wear multiple devices 1000 that are each configured to provide haptic stimulations to respective parts of the body where the devices 1000 are being worn.

Figure 8C:
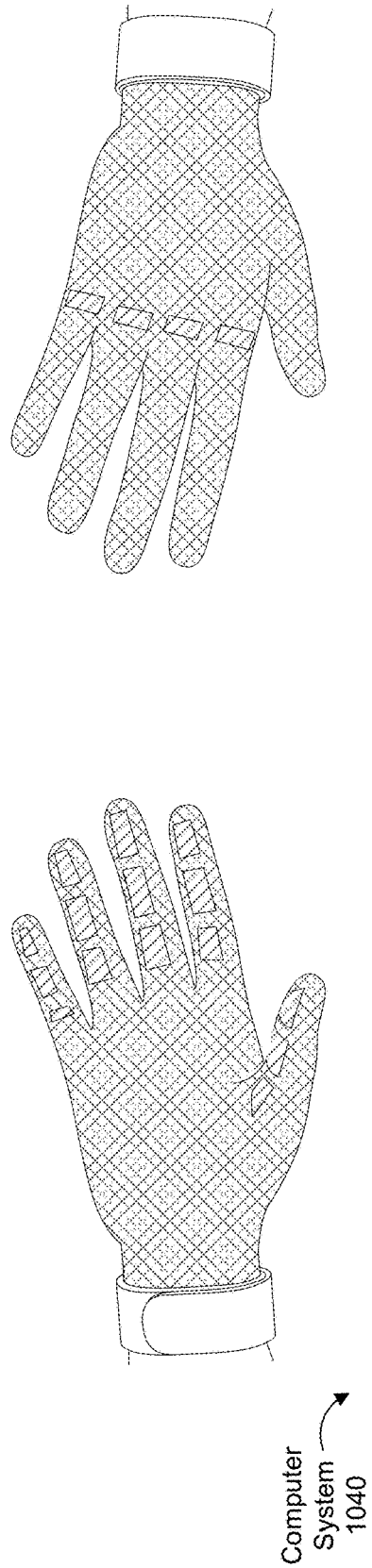
Figure 8C:
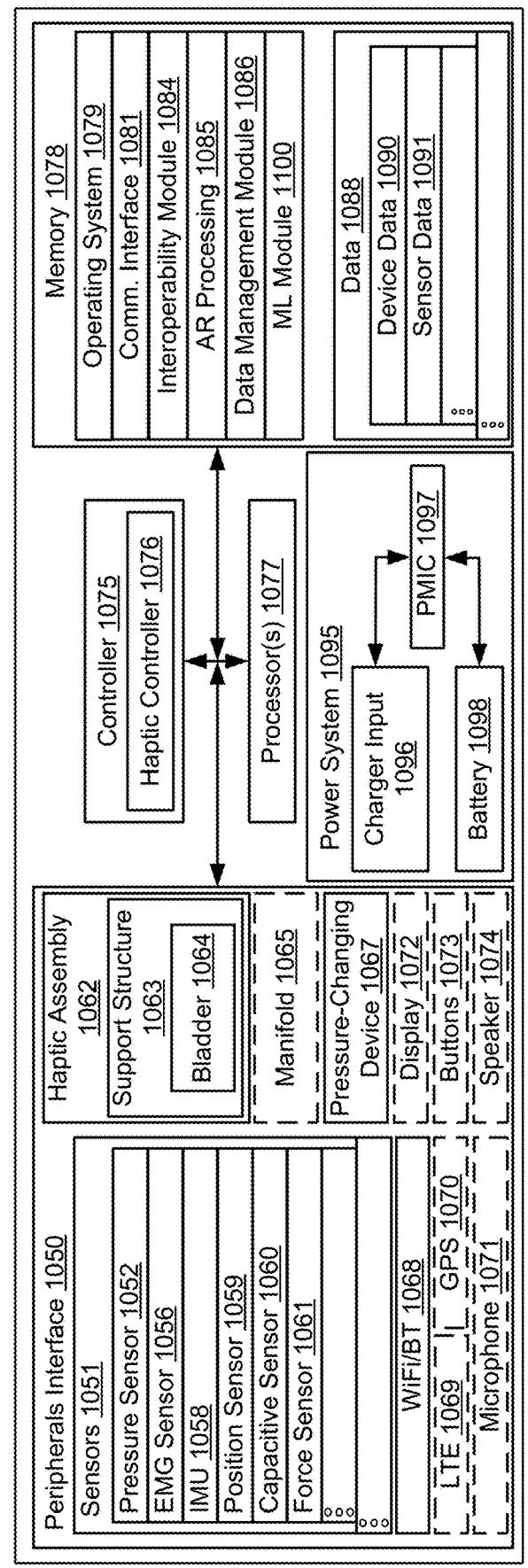

FIG. 8C shows block diagrams of a computing system 1040 of the device 1000, in accordance with some embodiments. The computing system 1040 can include one or more peripheral interfaces 1050, one or more power systems 1095, one or more controllers 1075 (including one or more haptic controllers 1076), one or more processors 1077 (as defined above, including any of the examples provided), and memory 1078, which can all be in electronic communication with each other. For example, the one or more processors 1077 can be configured to execute instructions stored in the memory 1078, which can cause a controller of the one or more controllers 1075 to cause operations to be performed at one or more peripheral devices of the peripherals interface 1050. In some embodiments, each operation described can occur based on electrical power provided by the power system 1095. The power system 1095 includes a charger input 1096, a PMIC 1097, and a battery 1098.

In some embodiments, the peripherals interface 1050 includes one or more devices configured to be part of the computing system 1040, many of which have been defined above and/or described with respect to wrist-wearable devices shown in FIGS. 5A-BB. For example, the peripherals interface 1050 can include one or more sensors 1051, such as one or more pressure sensors 1052, one or more EMG sensors 1056, one or more IMUs 1058, one or more position sensors 1059, one or more capacitive sensors 1060, one or more force sensors 1061, and/or any other types of sensors defined above or described with respect to any other embodiments discussed herein. In some embodiments, the peripherals interface can include one or more additional peripheral devices, including one or more Wi-Fi and/or Bluetooth devices 1068, an LTE component 1069, a GPS component 1070, a microphone 1071, one or more haptic assemblies 1062, one or more support structures 1063 (which can include one or more bladders 1064), one or more manifolds 1065, one or more pressure-changing devices 1067, one or more displays 1072, one or more buttons 1073, one or more speakers 1074, and/or any other types of peripheral devices defined above or described with respect to any other embodiments discussed herein. In some embodiments, computing system 1040 includes more or fewer components than those shown in FIG. 8C.

In some embodiments, the peripherals interface can include one or more additional peripheral devices, including one or more Wi-Fi and/or Bluetooth devices 1068, one or more haptic assemblies 1062, one or more support structures 1063 (which can include one or more bladders 1064), one or more manifolds 1065, one or more pressure-changing devices 1067, and/or any other types of peripheral devices defined above or described with respect to any other embodiments discussed herein.

In some embodiments, each haptic assembly 1062 includes a support structure 1063, and at least one bladder 1064. The bladder 1064 (e.g., a membrane) is a sealed, inflatable pocket made from a durable and puncture-resistant material such as thermoplastic polyurethane (TPU), a flexible polymer, or the like. The bladder 1064 contains a medium (e.g., a fluid such as air, inert gas, or even a liquid) that can be added to or removed from the bladder 1064 to change a pressure (e.g., fluid pressure) inside the bladder 1064. The support structure 1063 is made from a material that is stronger and stiffer than the material of the bladder 1064. A respective support structure 1063 coupled to a respective bladder 1064 is configured to reinforce the respective bladder 1064 as the respective bladder changes shape and size due to changes in pressure (e.g., fluid pressure) inside the bladder.

The device 1000 also includes a haptic controller 1076 and a pressure-changing device 1067. In some embodiments, the haptic controller 1076 is part of the computer system 1040 (e.g., in electronic communication with one or more processors 1077 of the computer system 1040). The haptic controller 1076 is configured to control operation of the pressure-changing device 1067 and, in turn, operation of the device 1000. For example, the controller 1076 sends one or more signals to the pressure-changing device 1067 to activate the pressure-changing device 1067 (e.g., turn it on and off). The one or more signals may specify a desired pressure (e.g., pounds-per-square inch) to be output by the pressure-changing device 1067. Generation of the one or more signals, and in turn the pressure output by the pressure-changing device 1067, may be based on information collected by the sensors in FIGS. 5A and 5B. For example, the one or more signals may cause the pressure-changing device 1067 to increase the pressure (e.g., fluid pressure) inside a haptic assembly 1062 at a first time, based on the information collected by the sensors in FIGS. 5A and 5B (e.g., the user makes contact with an artificial coffee mug). Then, the controller may send one or more additional signals to the pressure-changing device 1067 that cause the pressure-changing device 1067 to further increase the pressure inside the haptic assembly 1062 at a second time after the first time, based on additional information collected by the sensors 1051. Further, the one or more signals may cause the pressure-changing device 1067 to inflate one or more bladders 1064 in a device 1000-A, while one or more bladders 1064 in a device 1000-B remain unchanged. Additionally, the one or more signals may cause the pressure-changing device 1067 to inflate one or more bladders 1064 in a device 1000-A to a first pressure and inflate one or more other bladders 1064 in the device 1000-A to a second pressure different from the first pressure. Depending on the number of devices 1000 serviced by the pressure-changing device 1067, and the number of bladders therein, many different inflation configurations can be achieved through the one or more signals and the examples above are not meant to be limiting.

The device 1000 may include an optional manifold 1065 between the pressure-changing device 1067 and the devices 1000. The manifold 1065 may include one or more valves (not shown) that pneumatically couple each of the haptic assemblies 1062 with the pressure-changing device 1067 via tubing. In some embodiments, the manifold 1065 is in communication with the controller 1075, and the controller 1075 controls the one or more valves of the manifold 1065 (e.g., the controller generates one or more control signals). The manifold 1065 is configured to switchably couple the pressure-changing device 1067 with one or more haptic assemblies 1062 of the same or different devices 1000 based on one or more control signals from the controller 1075. In some embodiments, one or more smart textile-based garments 1000 or other haptic devices can be coupled in a network of haptic devices, and the manifold 1065 can distribute the fluid between the coupled smart textile-based garments 1000.

In some embodiments, instead of using the manifold 1065 to pneumatically couple the pressure-changing device 1067 with the haptic assemblies 1062, the smart textile-based garment 1000 may include multiple pressure-changing devices 1067 where each pressure-changing device 1067 is pneumatically coupled directly with a single (or multiple) haptic assembly 1062. In some embodiments, the pressure-changing device 1067 and the optional manifold 1065 can be configured as part of one or more of the smart textile-based garments 1000 (not illustrated), while, in other embodiments, the pressure-changing device 1067 and the optional manifold 1065 can be configured as external to the smart textile-based garments 1000. In some embodiments, a single pressure-changing device 1067 can be shared by multiple smart textile-based garments 1000 or other haptic devices. In some embodiments, the pressure-changing device 1067 is a pneumatic device, hydraulic device, a pneudraulic device, or some other device capable of adding and removing a medium (e.g., fluid, liquid, or gas) from the one or more haptic assemblies 1062.

The memory 1078 includes instructions and data, some or all of which may be stored as non-transitory computer-readable storage media within the memory 1078. For example, the memory 1078 can include one or more operating systems 1079; one or more communication interface applications 1081, one or more interoperability modules 1084, one or more AR processing applications 1085, one or more data management modules 1086, and/or any other types of data defined above or described with respect to any other embodiments discussed herein. In some embodiments, the memory 1078 includes a machine-learning module 1100. In some embodiments, the machine-learning module 1100 includes one or more models (e.g., language models). In some embodiments, the machine-learning module 1100 is configured for reinforcement learning. In some embodiments, the machine-learning module 1100 is configured to determine text suggestions (e.g., text corrections and/or text completions). In some embodiments, the machine-learning module 1100 is configured to estimate a cognitive load of a user (e.g., based on user attention (e.g., focus), user context information, and/or other information).

The memory 1078 also includes data 1088 that can be used in conjunction with one or more of the applications discussed above. The data 1088 can include: device data 1090, sensor data 1091, and/or any other types of data defined above or described with respect to any other embodiments discussed herein. In some embodiments, the data 1088 includes machine-learning data (e.g., model states, model parameter values, model training data, and/or model validation data).

The devices shown in FIGS. 8A to 8C may be coupled via a wired connection (e.g., via busing). Alternatively, one or more of the devices shown in FIGS. 8A to 8C may be wirelessly connected (e.g., via short-range communication signals).

Having thus described system-block diagrams and then example devices, attention will now be directed to certain example processes and embodiments.

EXAMPLE ASPECTS AND EMBODIMENTS (A1) In one aspect, a method (e.g., the method 300) of providing suggestions is disclosed. The method is performed at a computing system (e.g., the AR system 600 shown in FIGS. 4A-4D). In some embodiments, the computing system includes one or more processors (e.g., CPU(s), GPU(s), and/or NPU(s)) and memory. In some embodiments, the computing system includes one or more wearable devices (e.g., the wrist-wearable device 106 and/or the head-wearable device 104). In some embodiments, the computing system includes one or more intermediary devices (e.g., a smartphone, laptop, or gaming console). In some embodiments, the computing system includes one or more handheld devices (e.g., a controller and/or the HIPD 900). In some embodiments, the method includes (i) detecting a user gesture (e.g., the user gesture 216) associated with a user task based on data from one or more neuromuscular sensors (e.g., the EMG sensor 765); (ii) identifying a set of text characters (e.g., the text 220) corresponding to the user gesture; (iii) causing display, via a display device (e.g., the display 705 or the display 835A), of the set of text terms in a user interface (e.g., a message/document user interface); (iv) estimating, based on context information, a cognitive load of the user (e.g., the estimated cognitive load 226) corresponding to performing the user task at the computing system; (v) determining whether the estimated cognitive load meets one or more predefined criteria (e.g., is less than a preset load threshold); (vi) in accordance with a determination that the estimated cognitive load meets the one or more predefined criteria, providing a text suggestion to the user based on the set of text characters (e.g., displaying the text suggestion 230); and (vii) in accordance with a determination that the estimated cognitive load does not meet the one or more predefined criteria, forgoing providing the text suggestion to the user based on the set of text characters (e.g., no suggestion is provided to the user 102 in FIG. 1B in accordance with the estimated cognitive load 116 not meeting one or more criteria). In some embodiments, the user gesture is performed by a user of the computing system. In some embodiments, one or more partial characters are detected based on the data from the one or more neuromuscular sensors (e.g., one or more strokes or ballistic movements). In some embodiments, the text suggestion is further based on the one or more partial characters. In some embodiments, providing the text suggestion to the user includes displaying the text suggestion via the display device. In some embodiments, the text suggestion is visually distinguished from the set of text characters (e.g., a different color, size, font, and/or with different emphasis).

(A2) In some embodiments of A1, the user gesture includes a handwriting motion. For example, the user gesture may correspond to the user writing one or more characters in a cursive or block (print) style. In some embodiments, the handwriting motion is performed as an in-air gesture. In some embodiments, the handwriting motion is performed as a surface gesture (e.g., performed while the user's hand is in contact with a surface).

(A3) In some embodiments of A1 or A2, the set of text characters is appended to a set of pre-existing text in a document, and the text suggestion is based on the set of text characters and the set of pre-existing text. In some embodiments, the text suggestion is based on one or more phrases and/or one or more sentences of text. For example, the text suggestion may be based on a full-sentence context. For example, the top suggestions 124 in FIG. 1B may be based on the text 120 and pre-existing text of the message 112 (e.g., the name "Alex").

(A4) In some embodiments of any of A1-A3, the text suggestion is generated based on the set of text characters and information about the user. For example, the text suggestion may include user information (e.g., contact information for the user). As another example, the text suggestion may be based on calendar information, location information, context information, and/or historical information of the user. For example, the first suggestion of the top suggestions 124 in FIG. 1B may be generated using calendar information of the user 102.

(A5) In some embodiments of any of A1-A4, the text suggestion is provided by a machine-learning component (e.g., the ML modules 7100, 8100, 9100, and/or 1100). In some embodiments, the machine-learning component includes one or more machine-learning models (e.g., one or more large language models). In some embodiments, the system utilizes a Markov decision process (MDP) to determine whether/when to provide text suggestions. In some embodiments, the MDP action is obtained using reinforcement learning (RL). For example, the RL can be performed in an offline manner (e.g., offline training to produce a new model version for production) or an online manner (e.g., training the model while in the model is production). In some embodiments, the machine-learning component includes an embedder configured to generate embeddings from the neuromuscular sensor data. In some embodiments, the machine-learning component is configured to predict an intent of the user.

(A6) In some embodiments of A5, the machine-learning component is trained based on the data from the one or more neuromuscular sensors (e.g., the sensor data 789A and/or 789B). For example, EMG data and character errors are simulated using offline data. In some embodiments, character suggestions are generated based on sample sentences in the target domain (e.g., text messaging, letter writing, and/or other writing domains). In some embodiments, the machine-learning model is trained to leverage additional EMG signals to narrow down a current word prediction with potential suggestions trailing it. For example, the EMG signal is discretize based on a predefined time window (e.g., 40 ms, 20 ms, 10 ms, or 5 ms) and the EMG embeddings are input into the model. In some embodiments, a first model is used to identify characters based on EMG data and a second model is used to provide text suggestions based on the identified characters.

(A7) In some embodiments of A5 or A6, a set of suggestions, including the text suggestion, is obtained from the machine-learning component. In some embodiments, the set of suggestions consists of the top K suggestions obtained from the machine-learning component. In some embodiments, an option to forgo providing a suggestion is included in the set of suggestions (or compared to the set of suggestions to determine whether to provide a suggestion at a given time). In some embodiments, an RL policy is trained to choose among K possible completions or a no-op action. In some embodiments, the no-op action is weighted based on the user's sensitivity to cognitive load.

(A8) In some embodiments of any of A5-A7, the method further includes: (i) in accordance with the user accepting of the text suggestion, providing a reward to the machine-learning component; and (ii) in accordance with the user forgoing accepting the text suggestion, forgoing providing the reward to the machine-learning component. In some embodiments, (i) in accordance with the user accepting of the text suggestion, the system provides a positive reward to the machine-learning component; and (ii) in accordance with the user forgoing accepting the text suggestion, the system provides a negative reward to the machine-learning component. In some embodiments, the machine-learning component includes a reinforcement learning component. In some embodiments, the machine-learning component is trained using data from a plurality of users. In some embodiments, the machine-learning component is personalized (e.g., fine-tuned) to the particular user. In some embodiments, forgoing accepting the text suggestion includes rejecting or ignoring the text suggestion. In some embodiments, the system provides a reward to the machine-learning component in response to explicit user feedback (e.g., the user rates the quality of the text suggestion). For example, the machine-learning component is configured to update based on implicit user feedback (e.g., selection of a suggestion) and explicit user feedback (e.g., a user rating the usefulness of the test suggestion).

(A9) In some embodiments of A8, the reward is proportional to a length of the text suggestion. For example, a per-step reward function has a penalty for each suggestion proportional to the length of the suggestion α*len(a) representing the cognitive load. In this example, accepted suggestions are rewarded based on the length of suggestion. In this example, when no suggestion is provided the reward is zero. In some embodiments, the reward is scaled based on suggestion length and/or sentence length. In some embodiments, a scaled reward is obtained by dividing an initial reward value by a corresponding sentence length. In some embodiments, the amount of the reward is based on an estimated impact of the text suggestion on the user's writing speed (e.g., aWPM). In some embodiments, the aWPM is calculated using Equation 1:

Equation 1 – Adjusted Words Per Minute $$aWPM = \frac{1}{5}(1 - CharacterErrorRate) * (CharacterPerMinute)$$

In some embodiments, the amount of the reward is based on an estimated cognitive load of the text suggestion. In some embodiments, the amount of the reward is based on an estimated user satisfaction with the text suggestion (e.g., based on gaze, muscle tension, posture, and/or other behavioral responses of the user).

(A10) In some embodiments of any of A1-A9, the estimated cognitive load is determined based on context information for the user. For example, the context information includes information about the environs of the user (e.g., a private or public setting), a speed at which the user is gesturing (e.g., a writing/typing speed), an amount of time elapsed since the user's gesture (e.g., has the user paused after gesturing), an amount of time elapsed since a prior text suggestion, and/or a user history (e.g., data about whether a user has accepted text suggestions in similar circumstances in the past). For example, the elapsed time since the prior text suggestion may be composed of both thinking time and writing time. The thinking time may be composed of thinking about both what the next character should be and the time to consider the shown suggestion (if one is shown), which corresponds to a cognitive load. In some embodiments, the system is trained on the user's historical elapsed time between characters and/or between suggestions. In some embodiments, the estimated cognitive load is determined based on active applications and/or devices for the user. In some embodiments, the estimated cognitive load is determined based on an adjusted words per minute (aWPM) for the user (e.g., a comparison of a current aWPM and a historical aWPM for the user). In some embodiments, the estimated cognitive load is determined based on a gesture flow (e.g., a handwriting flow) of the user. In some embodiments, the estimated cognitive load is, or includes, a cognitive load associated with considering the text suggestion. In some embodiments, the cognitive load is estimated based on a determined user focus with performing the user gesture. In some embodiments, the cognitive load is estimated based on a determination of user attention (e.g., whether the user is focused on the task and/or has divided attention between tasks). For example, the computing system may determine whether the user is looking at the display or paying attention to something else (e.g., looking at the keyboard instead of the display).

(A11) In some embodiments of any of A1-A10, the estimated cognitive load is determined based on context information regarding the set of text characters. In some embodiments, the context information regarding the set of text characters includes a confidence level associated with providing the text suggestion based on the set of text characters, a predicted confidence level associated with providing a different text suggestion at a later time, a length of the text suggestion, and/or a predicted length associated with providing the different text suggestion at the later time. For example, the system may forgo providing a text suggestion corresponding to a single term (e.g., a single-word suggestion) in favor of providing a subsequent text suggestion corresponding to multiple terms (e.g., a sentence-completion suggestion).

(A12) In some embodiments of any of A1-A11, providing the text suggestion includes displaying the text suggestion, and the method further includes: (i) while displaying the text suggestion, detecting a user input; (ii) in accordance with a determination that the user input corresponds to a command to accept the text suggestion, applying the text suggestion to the user interface; and (iii) in accordance with a determination that the user input does not correspond to the command to accept the text suggestion, ceasing to display the text suggestion. In some embodiments, applying the text suggestion includes adding/storing text (e.g., one or more characters, words, and/or other text) to the user interface. For example, the user gesture 130 detected while the text suggestion 128 is displayed in FIG. 1C causes the text suggestion 128 to be accepted, and the user gesture 216 detected while the text suggestion 214 is displayed in FIG. 2B causes the text suggestion 214 to be rejected (e.g., ceased to be displayed). For example, the text suggestion characters are shown but not added/stored to the user interface until accepted. In some embodiments, applying the text suggestion includes replacing at least a subset of the set of text characters with text of the text suggestion. In some embodiments, the user input includes a hand gesture (e.g., an in-air hand gesture). In some embodiments, the user input includes activation of a button (e.g., a virtual or physical button).

(A13) In some embodiments of A12, applying the text suggestion includes executing a function of the computing system in accordance with the text suggestion. For example, applying the text suggestion may include inserting text into a message and sending the message. As another example, applying the text suggestion may include opening an application and inserting the text into the application. In some embodiments, applying the text suggestion includes selecting a button, menu option, or other affordance in the user interface. For example, the user may write "msg Matt hey, where" and the text suggestion may be "msg <contact: Matt>: 'Hey, where are you?'". In this example, accepting the text suggestion causes a messaging application to open and the message "Hey, where are you?" to be sent to a contact named "Matt" via the messaging application.

(A14) In some embodiments of A12 or A13, applying the text suggestion includes activating one or more sensors. For example, one or more sensors for gaze tracking or gesture detection may be activated. In some embodiments, the one or more sensors correspond to location data, pose data, eye tracking, and/or other limb tracking (e.g., arm, hand, and/or leg tracking).

(A15) In some embodiments of any of A12-A14, applying the text suggestion includes deactivating one or more sensors. In some embodiments, deactivating the one or more sensors includes switching the sensors to a low-power mode, switching the sensors off, and/or discarding data from the sensors.

(A16) In some embodiments of any of A12-A15, applying the text suggestion includes executing an application at the computing system (e.g., executing a messenger application, a calendar application, and/or a digital assistant application).

(A17) In some embodiments of any of A12-A16, applying the text suggestion includes switching the computing system from a first mode (e.g., a data input mode) to a second mode (e.g., a data display mode). In some embodiments, switching modes includes activating and/or deactivating one or more sensors. In some embodiments, switching modes includes adding and/or removing available commands. In some embodiments, switching modes includes adjusting a power consumption of the computing system.

(A18) In some embodiments of any of A1-A17, the text suggestion is, or includes, a text-completion suggestion. For example, the text suggestion includes a suggestion for completing a current word and/or suggesting subsequent words. In some embodiments, the text suggestion includes a word completion.

(A19) In some embodiments of any of A1-A18, the text suggestion is, or includes, a text-correction suggestion. For example, the text suggestion includes a spelling correction and/or a grammar correction. In some embodiments, the set of text characters includes a set of shorthand terms and the text suggestion includes a corresponding set of longhand terms. For example, the user writes "thx" and the text suggestion is "thanks".

(A20) In some embodiments of any of A1-A19, the user gesture is, or includes, an in-air hand gesture. In some embodiments, the user gesture is, or includes, a surface hand gesture (e.g., the user traces characters on a table or wall). In some embodiments, the user gesture is performed by moving one or more digits of the user's hand. In some embodiments, the user gesture is performed while the user is holding an object (e.g., a stylus or controller, such as the stylus 108).

(A21) In some embodiments of any of A1-A20, the user gesture is detected based on the data from the one or more neuromuscular sensors and data from one or more imaging sensors (e.g., the imaging sensor 826). For example, the user gesture is detected based on fusion of data from the one or more neuromuscular sensors and data from the one or more imaging sensors. In some embodiments, the user gesture is detected by one or more non-neuromuscular sensors (e.g., image sensors, motion sensors, and/or other types of sensors) in addition to, or alternatively to, detecting the user gesture with the one or more neuromuscular sensors.

(A22) In some embodiments of any of A1-A21, the display device is a component of the computing system (e.g., is a component of the head-wearable device 104). In some embodiments, the display device is distinct from the computing system (e.g., the computing system is communicatively coupled to the display device). In some embodiments, the display device is, or includes, an augmented-reality device.

(A23) In some embodiments of any of A1-A22, the one or more neuromuscular sensors are components of the computing system (e.g., are components of the wrist-wearable device 106). In some embodiments, the one or more neuromuscular sensors are communicatively coupled to the computing system. In some embodiments, the one or more neuromuscular sensors include one or more EMG sensors.

(A24) In some embodiments of any of A1-A23, the computing system is or includes a wearable device (e.g., the head-wearable device 104 and/or the wrist-wearable device 106). In some embodiments, the wearable device is a head-wearable device (e.g., an artificial-reality device). In some embodiments, the wearable device is a wrist-wearable device (e.g., a smartwatch or bracelet). In some embodiments, the wearable device is a piece of clothing (e.g., a glove, a sleeve, or other article of clothing).

In another aspect, some embodiments include a computing system with one or more processors and memory coupled to the one or more processors, the memory storing one or more programs configured to be executed by the one or more processors, and the one or more programs including instructions for performing any of the methods described herein (e.g., methods 300 and A1-A24 above).

In yet another aspect, some embodiments include a non-transitory, computer-readable storage medium storing one or more programs for execution by one or more processors of a computing system, the one or more programs including instructions for performing any of the methods described herein (e.g., methods 300 and A1-A24 above).

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt in or opt out of any data collection at any time. Further, users are given the option to request the removal of any collected data.

It will be understood that, although the terms "first," "second," etc., may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrases "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments.

However, the illustrative discussions above are not intended to be exhaustive or to limit the claims to the precise forms disclosed. Many modifications and variations are possible in view of the above teachings. The embodiments were chosen and described in order to best explain principles of operation and practical applications to thereby enable others skilled in the art.

What is claimed is:

1. A method performed at a computing system having memory and one or more processors, the method comprising:
   detecting a user gesture associated with a user task based on data from one or more neuromuscular sensors, the user gesture performed by a user of the computing system;
   identifying a set of text characters corresponding to the user gesture;
   causing display, via a display device, of the set of text terms in a user interface;
   estimating, based on context information, a cognitive load of the user corresponding to performing the user task at the computing system;
   determining whether the estimated cognitive load meets one or more predefined criteria;
   in accordance with a determination that the estimated cognitive load meets the one or more predefined criteria, providing a text suggestion to the user based on the set of text characters; and
   in accordance with a determination that the estimated cognitive load does not meet the one or more predefined criteria, forgoing providing the text suggestion to the user based on the set of text characters.

2. The method of claim 1, wherein the user gesture comprises a handwriting motion.

3. The method of claim 1, wherein the set of text characters is appended to a set of pre-existing text in a document, and wherein the text suggestion is based on the set of text characters and the set of pre-existing text.

4. The method of claim 1, wherein the text suggestion is generated based on the set of text characters and information about the user.

5. The method of claim 1, wherein the text suggestion is provided by a machine-learning component trained based on the data from the one or more neuromuscular sensors.

6. The method of claim 5, wherein a set of suggestions, including the text suggestion, is obtained from the machine-learning component.

7. The method of claim 5, further comprising:
   in accordance with the user accepting of the text suggestion, providing a reward to the machine-learning component; and
   in accordance with the user forgoing accepting the text suggestion, forgoing providing the reward to the machine-learning component.

8. The method of claim 7, wherein the reward is proportional to a length of the text suggestion.

9. The method of claim 1, wherein the estimated cognitive load is determined based on context information for the user.

10. The method of claim 1, wherein the estimated cognitive load is determined based on context information regarding the set of text characters.

11. A computing system, comprising:
    control circuitry;
    memory; and
    one or more sets of instructions stored in the memory and configured for execution by the control circuitry, the one or more sets of instructions comprising instructions for:
       detecting a user gesture associated with a user task based on data from one or more neuromuscular sensors, the user gesture performed by a user of the computing system;
       identifying a set of text characters corresponding to the user gesture;
       causing display, via a display device, of the set of text terms in a user interface;
       estimating, based on context information, a cognitive load of the user corresponding to performing the user task at the computing system;
       determining whether the estimated cognitive load meets one or more predefined criteria;
       in accordance with a determination that the estimated cognitive load meets the one or more predefined criteria, providing a text suggestion to the user based on the set of text characters; and
       in accordance with a determination that the estimated cognitive load does not meet the one or more predefined criteria, forgoing providing the text suggestion to the user based on the set of text characters.

12. The computing system of claim 11, wherein the user gesture comprises a handwriting motion.

13. The computing system of claim 11, wherein the set of text characters is appended to a set of pre-existing text in a document, and wherein the text suggestion is based on the set of text characters and the set of pre-existing text.

14. The computing system of claim 11, wherein the text suggestion is generated based on the set of text characters and information about the user.

15. The computing system of claim 11, wherein the text suggestion is provided by a machine-learning component trained based on the data from the one or more neuromuscular sensors.

16. A non-transitory computer-readable storage medium storing one or more sets of instructions configured for execution by a computing device having control circuitry and memory, the one or more sets of instructions comprising instructions for:
    detecting a user gesture associated with a user task based on data from one or more neuromuscular sensors, the user gesture performed by a user of the computing system;
    identifying a set of text characters corresponding to the user gesture;
    causing display, via a display device, of the set of text terms in a user interface;
    estimating, based on context information, a cognitive load of the user corresponding to performing the user task at the computing system;
    determining whether the estimated cognitive load meets one or more predefined criteria;
    in accordance with a determination that the estimated cognitive load meets the one or more predefined criteria, providing a text suggestion to the user based on the set of text characters; and
    in accordance with a determination that the estimated cognitive load does not meet the one or more predefined criteria, forgoing providing the text suggestion to the user based on the set of text characters.

17. The non-transitory computer-readable storage medium of claim 16, wherein the user gesture comprises a handwriting motion.

18. The non-transitory computer-readable storage medium of claim 16, wherein the set of text characters is appended to a set of pre-existing text in a document, and wherein the text suggestion is based on the set of text characters and the set of pre-existing text.

19. The non-transitory computer-readable storage medium of claim 16, wherein the text suggestion is generated based on the set of text characters and information about the user.

20. The non-transitory computer-readable storage medium of claim 16, wherein the text suggestion is provided by a machine-learning component trained based on the data from the one or more neuromuscular sensors.

\* \* \* \* \*